(12) United States Patent
Mead et al.

(10) Patent No.: US 9,885,876 B2
(45) Date of Patent: *Feb. 6, 2018

(54) POLARIZED ENHANCED CONFIDENTIALITY

(71) Applicant: Steelcase Inc., Grand Rapids, MI (US)

(72) Inventors: Matthew Mead, Grand Rapids, MI (US); Paul Noll, Grand Rapids, MI (US); Lisa Mead, Grand Rapids, MI (US); Rémi Marcel Louis Casal, Lampertheim (FR); Joel Stanfield, Kentwood, MI (US)

(73) Assignee: Steelcase, Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/366,479

(22) Filed: Dec. 1, 2016

(65) Prior Publication Data

US 2017/0082865 A1    Mar. 23, 2017

Related U.S. Application Data

(63) Continuation of application No. 14/696,614, filed on Apr. 27, 2015, now Pat. No. 9,547,112, which is a
(Continued)

(51) Int. Cl.
*G06F 19/00* (2011.01)
*G02B 27/28* (2006.01)
(Continued)

(52) U.S. Cl.
CPC .......... *G02B 27/281* (2013.01); *B25J 9/1697* (2013.01); *E06B 9/24* (2013.01); *G02B 5/20* (2013.01);
(Continued)

(58) Field of Classification Search
CPC .... G06F 3/011; G05D 1/0246; G05D 1/0255; G05D 1/0251; G05D 2201/0207;
(Continued)

(56) References Cited

U.S. PATENT DOCUMENTS 1,610,423 A    12/1926 Cawley
2,018,963 A    10/1935 Land
(Continued)

FOREIGN PATENT DOCUMENTS

DE    102011014615 A1    9/2012
EP       1725916 A2    11/2006
(Continued)

*Primary Examiner* — Ronnie Mancho
(74) *Attorney, Agent, or Firm* — Brinks Gilson & Lione

(57) ABSTRACT

A system for selectively controlling visibility of information in a work environment is provided. The system includes one or more polarized emissive screens located within the work environment. The screens have a first direction of polarization. Information displayed on the screens are visible to a person inside the work environment. The work environment includes at least one window which permits viewing of the polarized emissive screens from outside of the work environment. A polarizing filter having a second direction of polarization arranged at an angle to the first direction of polarization is positioned proximate to the window. A person outside the work environment can see inside the environment through the window, but has an altered view of the information on the displays.

20 Claims, 38 Drawing Sheets

Related U.S. Application Data continuation of application No. 14/173,989, filed on Feb. 6, 2014, now Pat. No. 9,044,863.

(60) Provisional application No. 61/905,497, filed on Nov. 18, 2013, provisional application No. 61/905,490, filed on Nov. 18, 2013, provisional application No. 61/875,199, filed on Sep. 9, 2013, provisional application No. 61/761,391, filed on Feb. 6, 2013.

(51) Int. Cl.
| | |
|---|---|
| *B25J 9/16* | (2006.01) |
| *G02B 5/20* | (2006.01) |
| *G02B 5/30* | (2006.01) |
| *G02B 13/00* | (2006.01) |
| *H04N 7/15* | (2006.01) |
| *H04N 7/14* | (2006.01) |
| *E06B 9/24* | (2006.01) |
| *H04N 5/225* | (2006.01) |

(52) U.S. Cl.
CPC ........... *G02B 5/30* (2013.01); *G02B 13/0015* (2013.01); *H04N 7/142* (2013.01); *H04N 7/15* (2013.01); *E06B 2009/2417* (2013.01); *H04N 5/2254* (2013.01)

(58) Field of Classification Search
CPC .... G05D 1/024; G05D 1/0038; Y10S 901/01; Y10S 901/47; B25J 9/1697; B25J 19/023; B25J 9/1689; G06T 11/00; G06T 7/204; G06K 9/00664
USPC .................................................. 700/245, 259
See application file for complete search history.

(56) References Cited

U.S. PATENT DOCUMENTS

| | | | |
|---|---|---|---|
| 2,031,045 A | 2/1936 | Land | |
| 2,099,694 A | 11/1937 | Land | |
| 2,230,262 A | 2/1941 | Leon | |
| 2,285,792 A | 6/1942 | Dudley Bailey | |
| 2,286,570 A | 6/1942 | Leon | |
| 2,301,126 A | 11/1942 | Kriebel | |
| 2,617,329 A | 11/1952 | Dreyer | |
| 2,832,821 A | 4/1958 | Du Mont | |
| 3,840,731 A | 10/1974 | Saufferer | |
| 4,486,694 A | 12/1984 | Ohba et al. | |
| 4,875,172 A | 10/1989 | Kanayama | |
| 5,033,829 A | 7/1991 | Faroughy | |
| 5,073,749 A | 12/1991 | Kanayama | |
| 5,158,348 A | 10/1992 | Sakamoto et al. | |
| 5,165,064 A | 11/1992 | Mattaboni | |
| 5,251,065 A | 10/1993 | Uetsuki | |
| 5,287,130 A | 2/1994 | Umeda | |
| 5,378,969 A | 1/1995 | Haikawa | |
| 5,400,069 A | 3/1995 | Braun et al. | |
| 5,444,570 A | 8/1995 | Uetsuki et al. | |
| 5,488,496 A | 1/1996 | Pine | |
| 5,503,513 A | 4/1996 | Detriche | |
| 5,543,917 A | 8/1996 | Bushman | |
| 5,619,219 A | 4/1997 | Coteus | |
| 5,652,489 A | 7/1997 | Kawakami | |
| 5,758,298 A | 5/1998 | Guldner | |
| 5,793,470 A | 8/1998 | Haseltine | |
| 5,999,316 A | 12/1999 | Alien et al. | |
| 6,028,303 A | 2/2000 | Suzuki | |
| 6,038,493 A | 3/2000 | Tow | |
| 6,088,541 A | 7/2000 | Meyer | |
| 6,148,100 A | 11/2000 | Anderson et al. | |
| 6,232,735 B1 | 5/2001 | Baba et al. | |
| 6,262,843 B1 | 7/2001 | Marx | |
| 6,292,713 B1 | 9/2001 | Jouppi et al. | |
| 6,430,471 B1 | 8/2002 | Kintou et al. | |
| 6,438,456 B1 | 8/2002 | Feddema et al. | |
| 6,463,360 B1 | 10/2002 | Terada et al. | |
| 6,505,096 B2 | 1/2003 | Takenaka et al. | |
| 6,507,773 B2 | 1/2003 | Parker et al. | |
| 6,535,793 B2 | 3/2003 | Allard | |
| 6,539,284 B2 | 3/2003 | Nourbakhsh et al. | |
| 6,542,788 B2 | 4/2003 | Hosonuma et al. | |
| 6,552,850 B1 | 4/2003 | Dudasik | |
| 6,564,888 B1 | 5/2003 | Gomi et al. | |
| 6,604,021 B2 | 8/2003 | Imai et al. | |
| 6,646,801 B1 | 11/2003 | Sley | |
| 6,690,134 B1 | 2/2004 | Jones et al. | |
| 6,710,797 B1 | 3/2004 | McNelley | |
| 6,718,232 B2 | 4/2004 | Fujita et al. | |
| 6,760,646 B2 | 7/2004 | Osawa | |
| 6,760,647 B2 | 7/2004 | Nourbakhsh et al. | |
| 6,781,338 B2 | 8/2004 | Jones et al. | |
| 6,845,297 B2 | 1/2005 | Allard | |
| 6,879,879 B2 | 4/2005 | Jouppi et al. | |
| 6,909,544 B2 | 6/2005 | Kolosowsky | |
| 6,914,622 B1 | 7/2005 | Smith et al. | |
| 6,920,376 B2 | 7/2005 | Jouppi et al. | |
| 6,925,357 B2 | 8/2005 | Wang et al. | |
| 6,965,209 B2 | 11/2005 | Jones et al. | |
| 6,974,356 B2 | 12/2005 | Hobson et al. | |
| 7,092,792 B2 | 8/2006 | Hayashi et al. | |
| 7,123,285 B2 | 10/2006 | Smith et al. | |
| 7,136,090 B1 | 11/2006 | McDuffie White | |
| 7,142,945 B2 | 11/2006 | Wang et al. | |
| 7,158,861 B2 | 1/2007 | Wang et al. | |
| 7,190,392 B1 | 3/2007 | Maguire, Jr. | |
| 7,196,487 B2 | 3/2007 | Jones et al. | |
| 7,198,360 B2 | 4/2007 | Watanabe et al. | |
| 7,200,427 B2 | 4/2007 | Morita et al. | |
| 7,209,160 B2 | 4/2007 | McNelly et al. | |
| 7,222,000 B2 | 5/2007 | Wang et al. | |
| 7,228,203 B2 | 6/2007 | Koselka et al. | |
| 7,296,835 B2 | 11/2007 | Blackwell et al. | |
| 7,324,872 B2 | 1/2008 | Nagasaka | |
| 7,388,343 B2 | 6/2008 | Jones et al. | |
| 7,388,879 B2 | 6/2008 | Sabe et al. | |
| 7,467,026 B2 | 12/2008 | Sakagami et al. | |
| 7,561,312 B1 | 7/2009 | Proudfoot et al. | |
| 7,570,005 B2 | 8/2009 | Hashimoto et al. | |
| 7,587,747 B2 | 9/2009 | Maguire, Jr. | |
| 7,593,030 B2 | 9/2009 | Wang et al. | |
| 7,593,546 B2 | 9/2009 | Jouppi | |
| 7,613,544 B2 | 11/2009 | Park et al. | |
| 7,613,999 B2 | 11/2009 | Weber et al. | |
| 7,643,051 B2 | 1/2010 | Sandberg et al. | |
| 7,649,331 B2 | 1/2010 | Hosoda et al. | |
| 7,677,345 B2 | 3/2010 | Hosoda | |
| 7,706,917 B1 | 4/2010 | Chiappetta et al. | |
| 7,720,554 B2 | 5/2010 | DiBernardo et al. | |
| 7,720,572 B2 | 5/2010 | Ziegler et al. | |
| 7,729,607 B2 | 6/2010 | Karim | |
| 7,756,614 B2 | 7/2010 | Jouppi | |
| 7,761,185 B2 | 7/2010 | Wang et al. | |
| 7,769,491 B2 | 8/2010 | Fukuchi et al. | |
| 7,769,492 B2 | 8/2010 | Wang et al. | |
| 7,773,299 B2 | 8/2010 | Martin | |
| 7,872,666 B2 | 1/2011 | Van Schaik et al. | |
| 7,873,448 B2 | 1/2011 | Takeda et al. | |
| 7,877,165 B2 | 1/2011 | Sugiyama et al. | |
| 7,889,283 B2 | 2/2011 | Yoshimi et al. | |
| 7,916,165 B2 | 3/2011 | Ferren et al. | |
| 7,949,616 B2 | 5/2011 | Levy et al. | |
| 7,957,837 B2 | 6/2011 | Ziegler et al. | |
| 7,965,443 B2 | 6/2011 | Martin | |
| 8,010,231 B2 | 8/2011 | Sumida et al. | |
| 8,014,901 B2 | 9/2011 | Matsushima et al. | |
| 8,040,104 B2 | 10/2011 | Teng et al. | |
| 8,041,456 B1 | 10/2011 | Blackwell et al. | |
| 8,072,481 B1 | 12/2011 | McNelley et al. | |
| 8,073,564 B2 | 12/2011 | Bruemmer et al. | |
| 8,077,963 B2 | 12/2011 | Wang et al. | |
| 8,083,013 B2 | 12/2011 | Bewley et al. | |
| 8,090,193 B2 | 1/2012 | Higaki et al. | |
| 8,095,238 B2 | 1/2012 | Jones et al. | |

(56) References Cited

U.S. PATENT DOCUMENTS

| | | | |
|---|---|---|---|
| 8,096,660 B2 | 1/2012 | Vertegaal et al. |
| 8,103,383 B2 | 1/2012 | Nakamura |
| 8,106,616 B1 | 1/2012 | Theobald |
| 8,116,010 B2 | 2/2012 | Walters et al. |
| 8,121,728 B2 | 2/2012 | Chiang |
| 8,144,181 B2 | 3/2012 | Gladstone |
| 8,160,746 B2 | 4/2012 | Wang et al. |
| 8,160,747 B1 | 4/2012 | Blackwell et al. |
| 8,170,241 B2 | 5/2012 | Roe et al. |
| 8,174,739 B2 | 5/2012 | Proudfoot et al. |
| 8,179,418 B2 | 5/2012 | Wright et al. |
| 8,180,486 B2 | 5/2012 | Saito et al. |
| 8,190,295 B1 | 5/2012 | Garretson et al. |
| 8,195,333 B2 | 6/2012 | Ziegler et al. |
| 8,199,109 B2 | 6/2012 | Robbins et al. |
| 8,199,185 B2 | 6/2012 | McNelley et al. |
| 8,209,051 B2 | 6/2012 | Wang et al. |
| 8,209,055 B2 | 6/2012 | Shu |
| 8,265,793 B2 | 9/2012 | Cross et al. |
| 8,285,482 B2 | 10/2012 | Kong et al. |
| 8,339,456 B2 | 12/2012 | Eledath et al. |
| 8,340,819 B2 | 12/2012 | Mangaser et al. |
| 8,359,122 B2 | 1/2013 | Koselka |
| 8,451,537 B2 | 5/2013 | Yoshimi et al. |
| 8,463,435 B2 | 6/2013 | Herzog et al. |
| 8,565,922 B2 | 10/2013 | Kidd |
| 8,634,960 B2 | 1/2014 | Sandin et al. |
| 8,700,197 B2 | 4/2014 | Plociennik et al. |
| 8,721,543 B2 | 5/2014 | Saffarian |
| 8,909,370 B2 | 12/2014 | Stiehl et al. |
| 8,918,209 B2 | 12/2014 | Rosenstein et al. |
| 8,930,019 B2 | 1/2015 | Allen et al. |
| 8,935,005 B2 | 1/2015 | Rosenstein et al. |
| 8,935,006 B2 | 1/2015 | Vu et al. |
| 9,014,848 B2 | 4/2015 | Farlow et al. |
| 9,044,862 B2 | 6/2015 | Mead et al. |
| 9,164,512 B2 | 10/2015 | Oobayashi et al. |
| 9,375,843 B2 | 6/2016 | Wang et al. |
| 9,400,503 B2 | 7/2016 | Kearns et al. |
| 2002/0128746 A1 | 9/2002 | Boies et al. |
| 2003/0103261 A1 | 6/2003 | Hay |
| 2005/0091684 A1 | 4/2005 | Kawabata et al. |
| 2006/0052676 A1 | 3/2006 | Wang et al. |
| 2006/0056026 A1 | 3/2006 | Kolosowsky |
| 2006/0196127 A1 | 9/2006 | Tillman |
| 2006/0259193 A1 | 11/2006 | Wang et al. |
| 2008/0134801 A1 | 6/2008 | Tseng et al. |
| 2008/0310021 A1 | 12/2008 | Tillman |
| 2009/0030552 A1 | 1/2009 | Nakadai et al. |
| 2009/0109648 A1 | 4/2009 | Hay |
| 2010/0217435 A1 | 8/2010 | Rodemann |
| 2011/0071702 A1 | 3/2011 | Wang et al. |
| 2011/0074915 A1 | 3/2011 | Ferren et al. |
| 2011/0077802 A1 | 3/2011 | Halloran et al. |
| 2011/0170189 A1 | 7/2011 | Jackson, II |
| 2011/0190930 A1 | 8/2011 | Hanrahan et al. |
| 2011/0288417 A1 | 11/2011 | Pinter et al. |
| 2011/0288682 A1 | 11/2011 | Pinter et al. |
| 2011/0298885 A1 | 12/2011 | Root |
| 2012/0038738 A1 | 2/2012 | Matthews |
| 2012/0061155 A1 | 3/2012 | Berger et al. |
| 2012/0156655 A1 | 6/2012 | Goldberg |

FOREIGN PATENT DOCUMENTS

| | | |
|---|---|---|
| EP | 1414362 B1 | 1/2012 |
| EP | 1855607 A4 | 11/2013 |
| JP | 6138429 A | 5/1994 |
| JP | 9106008 A | 4/1997 |
| JP | 10049063 A | 2/1998 |
| JP | 10051764 A | 2/1998 |
| JP | 2001222004 A | 8/2001 |
| JP | 2007308970 A | 11/2007 |
| JP | 5225806 B2 | 7/2013 |
| WO | 1997027422 A1 | 7/1997 |
| WO | 2001038926 A1 | 5/2001 |
| WO | 2005093512 A1 | 10/2005 |
| WO | 2006001497 A2 | 1/2006 |
| WO | 20100222230 A3 | 4/2010 |
| WO | 2010064234 A2 | 6/2010 |

POLARIZED ENHANCED CONFIDENTIALITY

CROSS-REFERENCE TO RELATED APPLICATIONS

This application is a continuation of pending U.S. patent application Ser. No. 14/696,614, which was filed on Apr. 27, 2015 and entitled POLARIZED ENHANCED CONFIDENTIALITY, which is a continuation of U.S. patent application Ser. No. 14/173,989, which was filed on Feb. 6, 2014, now U.S. Pat. No. 9,044,863 which issued on Jun. 2, 2015 and entitled POLARIZED ENHANCED CONFIDENTIALITY IN MOBILE CAMERA APPLICATIONS, which claims priority to co-assigned provisional U.S. Provisional Patent Application Ser. No. 61/761,391, filed Feb. 6, 2013, entitled ENHANCED VIDEO CONFERENCING USING POLARIZED FILTERS; Ser. No. 61/875,199, filed Sep. 9, 2013, entitled ROBOTIC TELEPRESENCE SYSTEM; Ser. No. 61/905,490, filed Nov. 18, 2013, entitled POLARIZED ENHANCED MOBILE APPLICATIONS; and Ser. No. 61/905,497, filed Nov. 18, 2013, entitled POLARIZED ENHANCED CONFIDENTIALITY IN ROBOTIC TELEPRESENCE, each of which are incorporated by reference herein.

STATEMENT REGARDING FEDERALLY SPONSORED RESEARCH OR DEVELOPMENT

Not applicable.

BACKGROUND

The present invention relates to a conferencing system generally, and more particularly to a mobile communication system with applied polarized filters and surfaces to control visibility of information or provide augmentation of information in a viewing area.

Many businesses today are global and distribute work around the world. This requires companies to search for ways to stay connected, solve problems, make decisions, and develop new ideas, while at the same time reduce travel and time costs. Various technologies are used to help companies with this problem including teleconferencing, video conferencing or telepresence, and web conferencing. However, experience using these technologies has been marred by problems such as poor sound, inappropriate lighting, distracting backgrounds and visual obstruction.

More recently, companies are using video conferencing or telepresence as an approach to solving the problem. Telepresence is a type of video conferencing and refers to a combination of technologies which allow participants at two or more locations to feel and appear to be in the same physical space. Video conferencing is gaining in significance and use. It is common today for people to use high definition systems to gain the feeling of being in the same room with the parties located physically separate. Rooms and other areas are frequently dedicated to provide a better experience when using the video conferencing equipment.

Using robotic telepresence, a person can interact through a robotic device with others at a distant location. Such a robotic telepresence system generally includes a robot and a controller through which the robot is operated, usually through a network typically located in a remote location or station. However, robotic telepresence has an unpredictable camera field of view due to its mobile nature.

A basic robotic telepresence system will facilitate videoconferencing interaction between the person operating the robot from the remote location (a "driver" or "pilot") and one or more persons co-located in a physical environment with the robot. The basic system provides the robot and the pilot each with a speaker-microphone arrangement and a video display-camera arrangement, so that the driver can interact audibly and visually. In some circumstances, artifacts or information need to be hidden from the pilot for security reasons. Existing robots in a robotic telepresence system are not configurable to achieve selective control over the visibility of information accessible to a robot in the work environment.

Depending upon the configuration and capabilities of the station and the robotic device, the driver at the station experiences varying degrees of "presence" at the location of the robotic device. Persons co-located with the robotic device may also perceive the effect of "presence" of the driver at the station. The quality of the audio-visual interchange between the driver and persons interacting with the robot is a product of multiple considerations including, but not limited to, the type, number and configuration of cameras, displays, microphones and speakers on the robot and at the station.

In a robotic telepresence system there are a number of considerations and trade-offs primarily relating to the robotic device, including for example, capability, performance, size, weight, maneuverability, mobility, flexibility, adaptability, controllability, autonomy, robustness, durability, power management, complexity and cost. Also, optimum configurations of a robotic telepresence system may vary between different work environments, including the remote pilot environment.

Existing robots in a robotic telepresence system may not be configurable to achieve an optimum balance of considerations for suitably effective use in an office work environment. For example, a low-cost robot may not include suitable audio-visual capability to allow the pilot to function productively in meetings in an office environment. A robot having a high-end audio-visual capability may be too large or bulky for the environment, may lack mobility, or may cost more than is justified. A robot loaded with capabilities to facilitate higher-quality interactions for the pilot also may be difficult to operate and control or maneuver in the environment and may require substantial power or resources to maintain; such a robot may also be cost-inefficient for many applications.

In addition, the presence of one or more robots in a work environment may make people in the office work environment uncomfortable. Humans are accustomed to dealing exclusively with humans and not with robots functioning as mechanized representatives of humans. A robot that cannot effectively express non-verbal, human-like communications is not able to communicate fully and effectively; but a robot that is very human-like may make humans uncomfortable during interactions.

Uncontrolled light in the room can impair the experience for the individuals at the remote end of the video conference. Typically, cameras used in video conferencing systems include an electronically controlled, or "auto" iris lens which allows the lens to adjust to changing light levels. Light or other distractions coming through the windows can interfere with the auto iris lens of the camera resulting in participants appearing washed out or overly dark. Similarly, glare from lamps, background or surrounding display screens or other visible items in the video conferencing environment can be distracting to a remote viewer. Also in some circumstances, artifacts or information needs to be hidden from a remote viewer for security reasons.

Polarizing filters are often used in photography to control the intensity of light and thereby reduce bright lights or glare to an acceptable level. In particular, the emerging light intensity from two overlapping polarizers can be varied by rotation of the polarizers. Specifically, maximum light transmission occurs when the relative angle between the molecular orientations of two polarizing filters is zero. Likewise, minimum transmission occurs when the relative angle is ninety degrees. However, polarizing filters have not been used in robotic telepresence systems.

A system for selectively reducing unwanted light, glare and other distractions in a video conferencing environment to enhance both participant experience and technology performance is desired. Also, a robotic telepresence system which provides a robot that is both functionally effective and comfortable for humans who will interact with the robot in the work environment is desired. Further, a robotic telepresence system which provides selective control over the visibility of information accessible to a robot in the work environment is desired.

SUMMARY

In one aspect, a system for controlling visibility of information in a work environment includes a robotic device connected to a network and having a camera, a pilot at a remote workspace, a user interface at a station configured to allow the pilot to operate the robotic device, a primary polarizing filter adjustably attached to the camera, at least one light source remote from the robotic device and at least one secondary polarizing filter positioned between the at least one light source and the camera. The pilot interacts in the work environment through the robotic device and shares privileges and permissions for interactions in the work environment with the robotic device. The primary polarizing filter can be adjusted to selectively prevent or encourage transmission of specific images in the work environment to the pilot.

In another aspect, a system for selectively preventing visibility of information in a work environment includes a robotic device having a camera which is connected to a network and configured to operate and interact in the work environment, a pilot at a workspace remote from the work environment, a station providing a user interface configured to allow the pilot to operate the robotic device from the remote workspace, a primary polarizing filter adjustably attached to the camera, a light source remote from the robotic device, and a secondary polarizing filter positioned between the at least one light source and the camera. The interaction of the pilot in the work environment is through the robotic device and the pilot and the robotic device share privileges and permissions for interactions in the work environment. Information in the work environment is proximate the at least one light source and at least one secondary polarizing filter. The network is configured to store the physical location of information in the work environment and the primary polarizing filter can be adjusted to prevent transmission of selected information in the work environment to the pilot.

In yet another aspect, a system for controlling visibility of information in a work environment includes a robotic device which is connected to a network and includes a camera, a pilot at a remote workspace, a user interface at a station configured to allow the pilot to operate the robotic device, at least one person co-located with the robotic device, a primary polarizing filter adjustably attached to the camera, at least one light source remote from the robotic device and at least one secondary polarizing filter positioned between the at least one light source and the camera. The pilot interacts in the work environment through the robotic device and shares privileges and permissions for interactions in the work environment with the robotic device. A person co-located with the robotic device in the work environment can adjust the primary polarizing filter to selectively prevent transmission of information in the work environment to the pilot.

FIGURES

The foregoing and other items and advantages of the present invention will be appreciated more fully from the following figures, where like reference characters designate like features in which.

Figure 22:
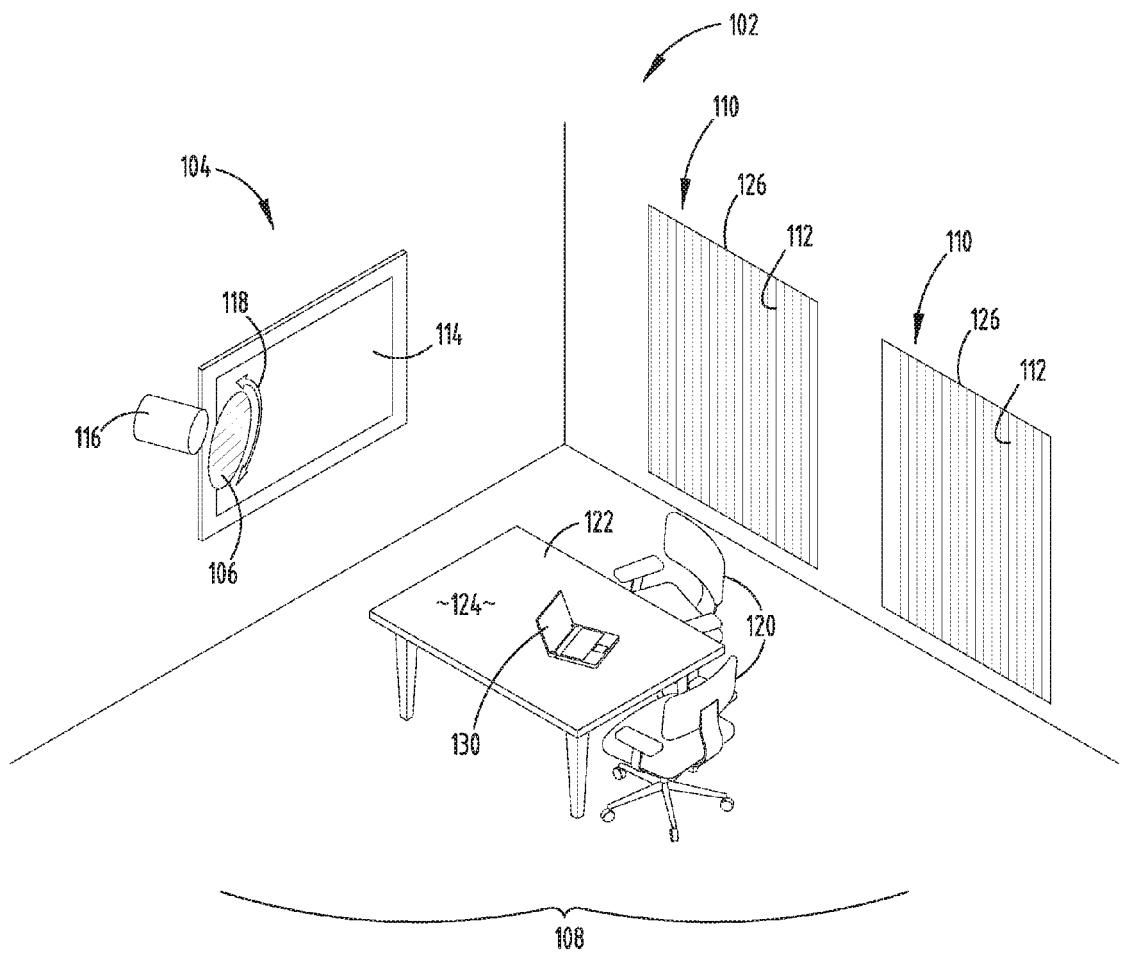
FIG. 22 is a top perspective view of a video conferencing environment or meeting room according to an exemplary embodiment of the invention.
Figure 22A:
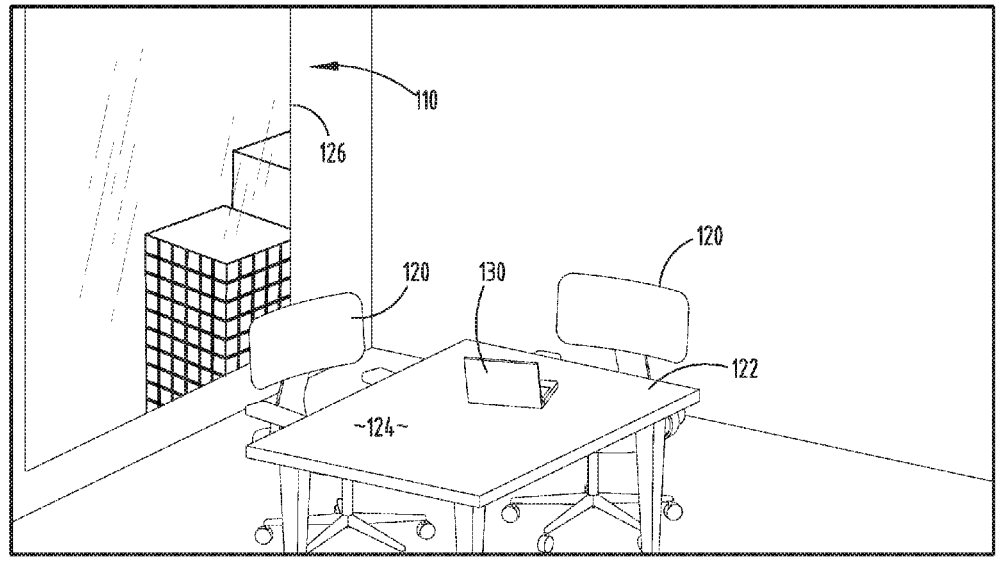
FIG. 22A is a side perspective view of a portion of the video conferencing environment or meeting room of FIG. 22, where a relative angle between the molecular orientation of two polarizing filters is zero.
Figure 22B:
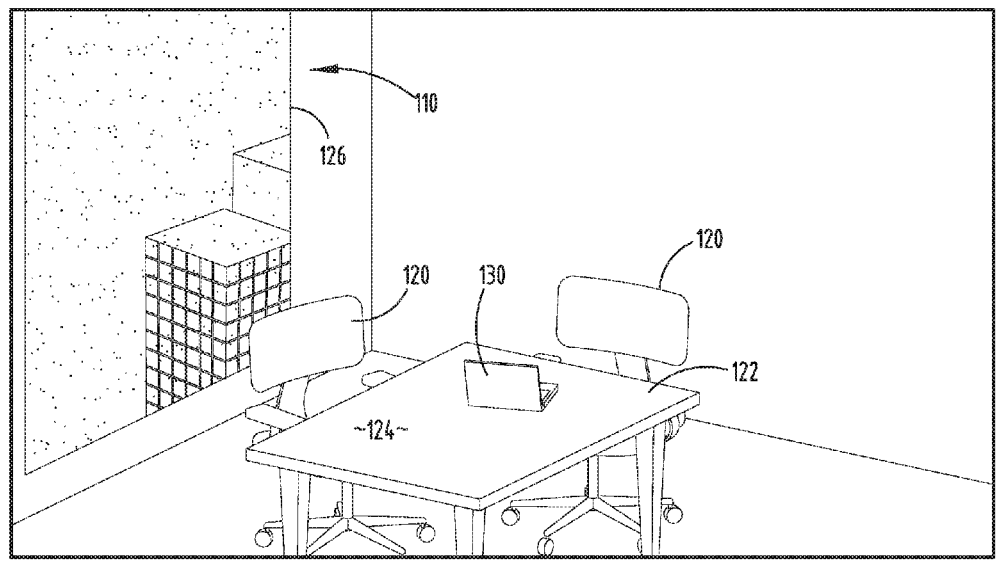
FIG. 22B is a side perspective view of a portion of the video conferencing environment or meeting room of FIG.
Figure 22C:
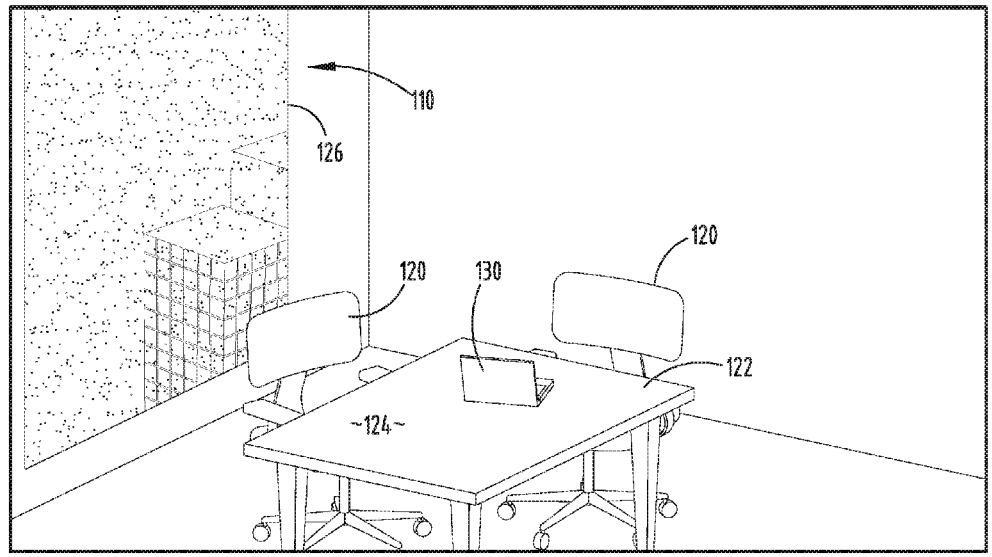
Figure 22D:
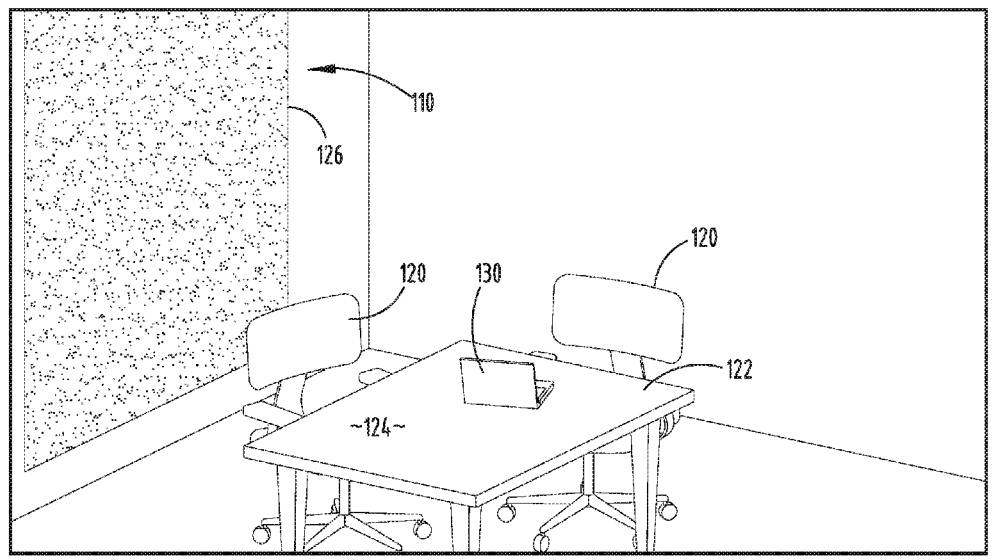
Figure 23:
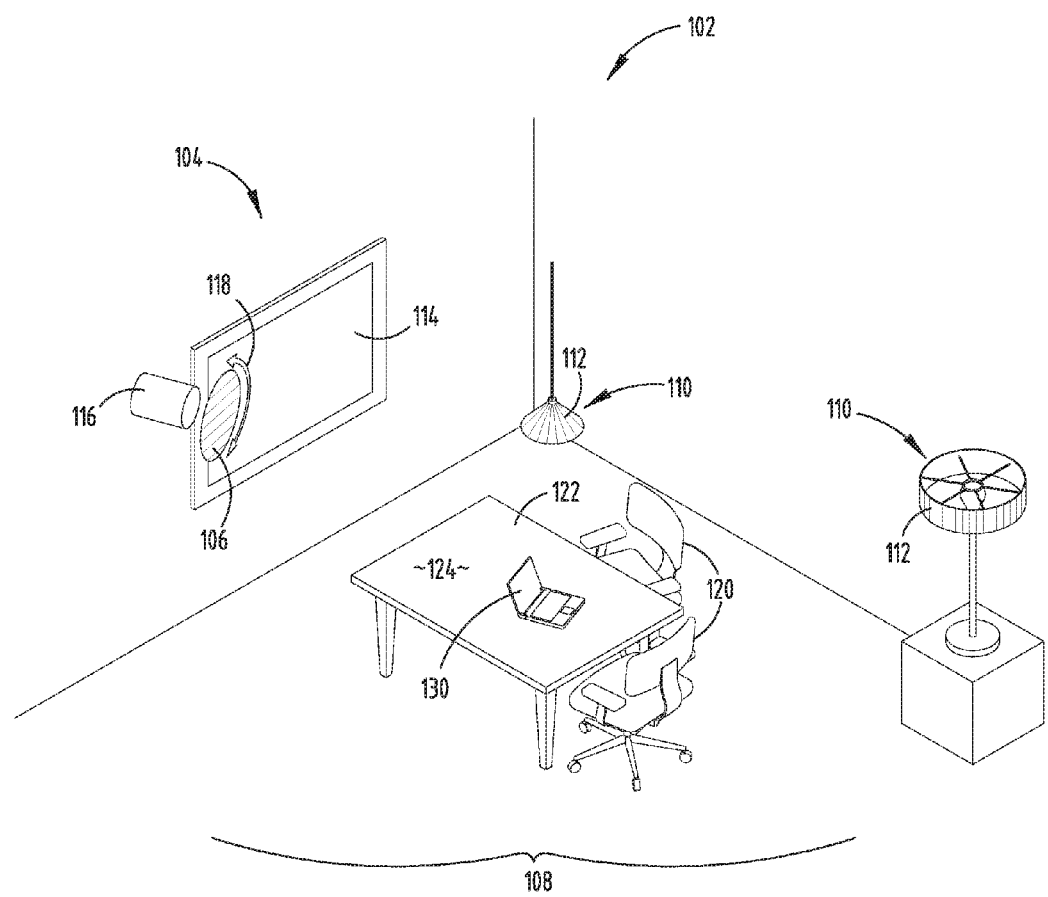
Figure 23A:
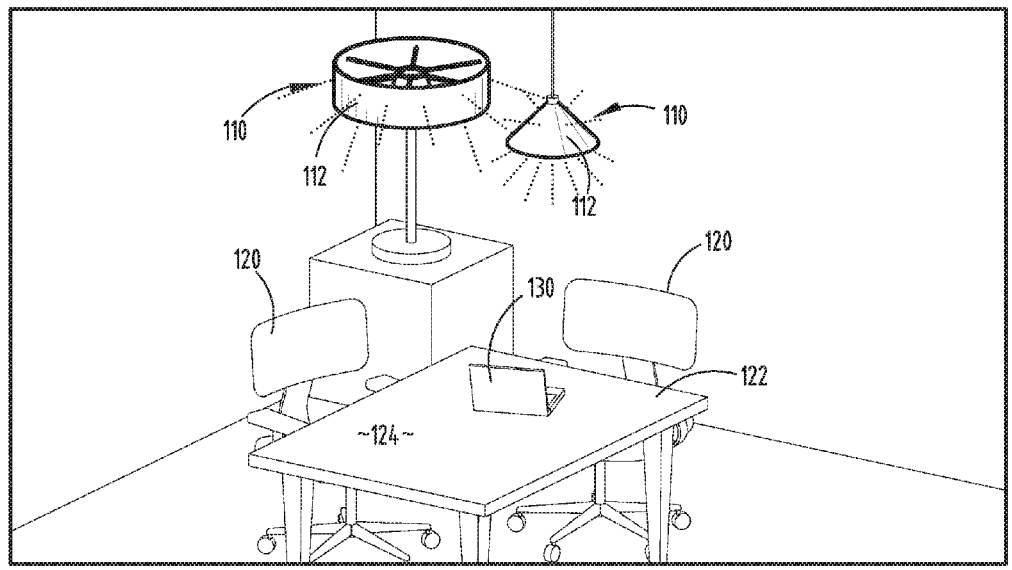
Figure 23B:
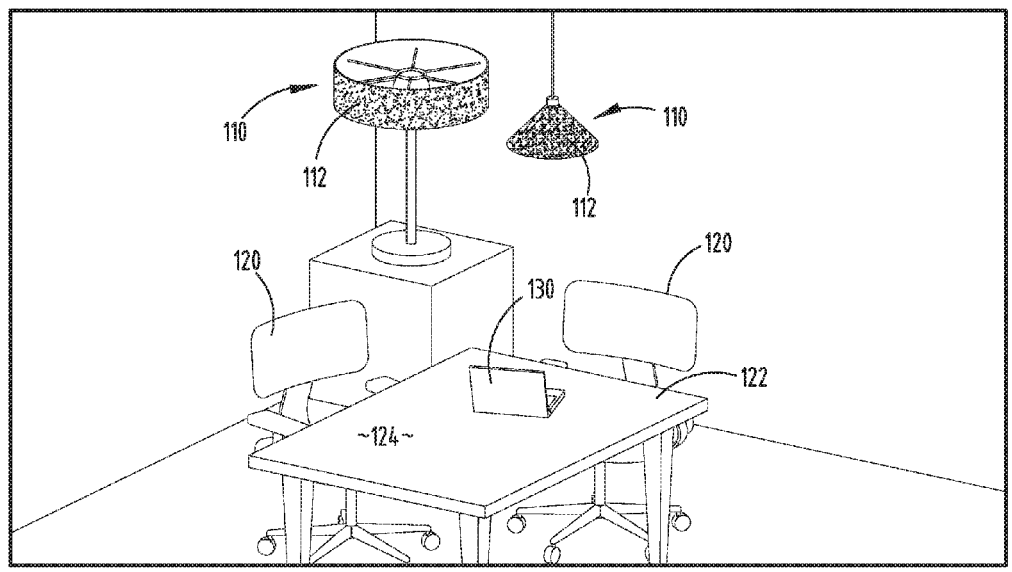
Figure 24:
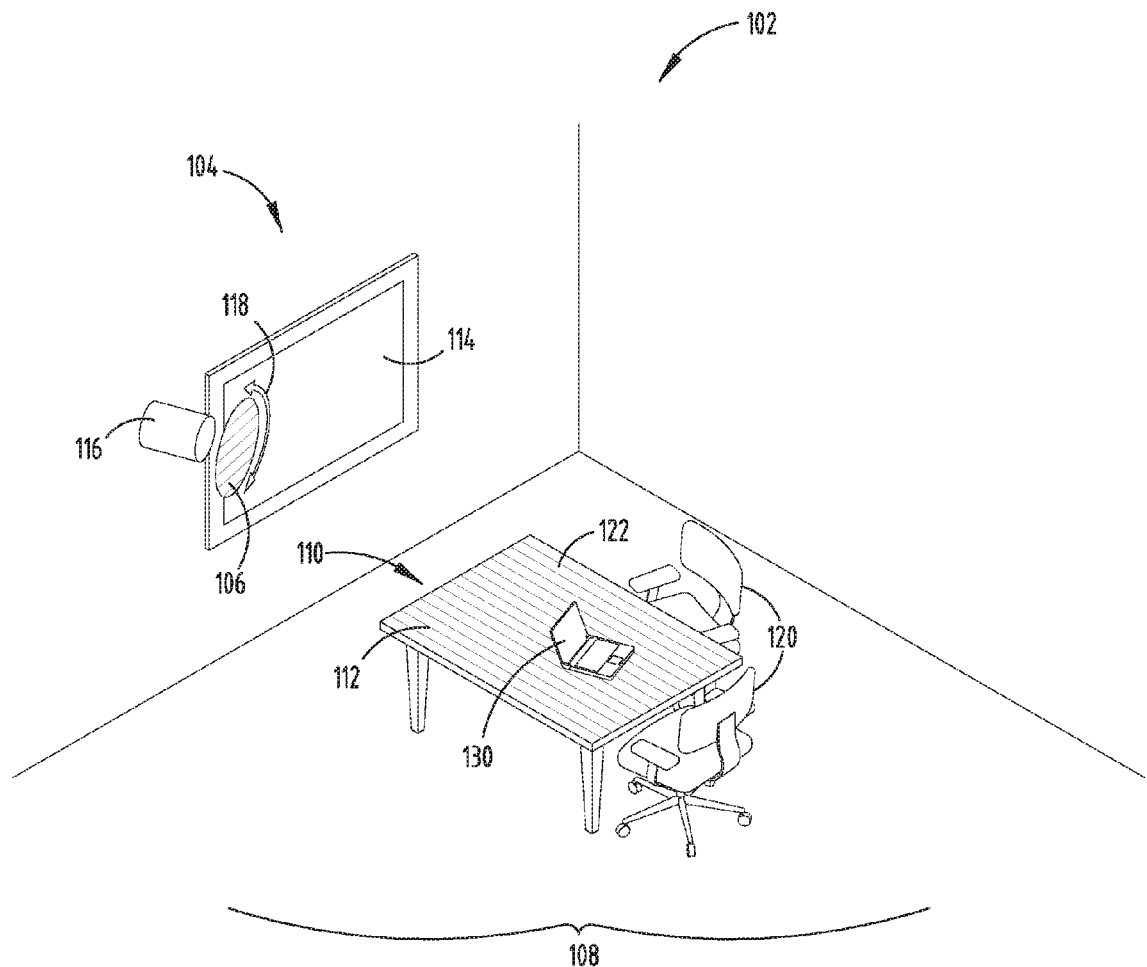
Figure 24A:
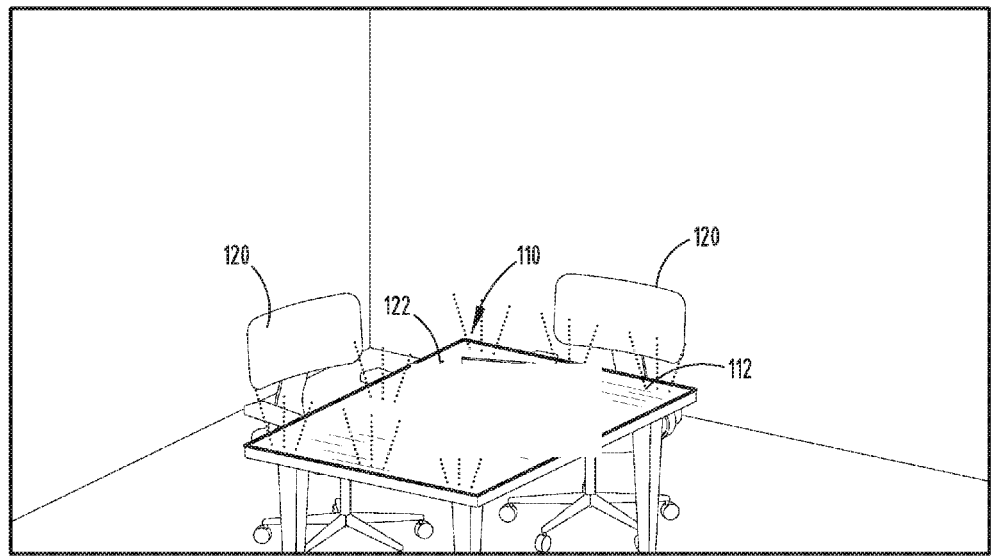
Figure 24B:
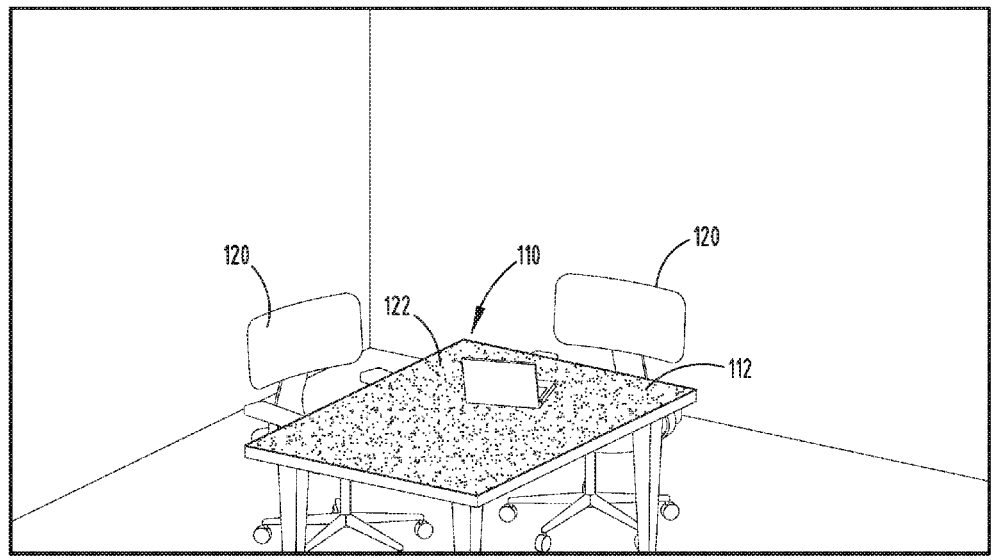
Figure 25:
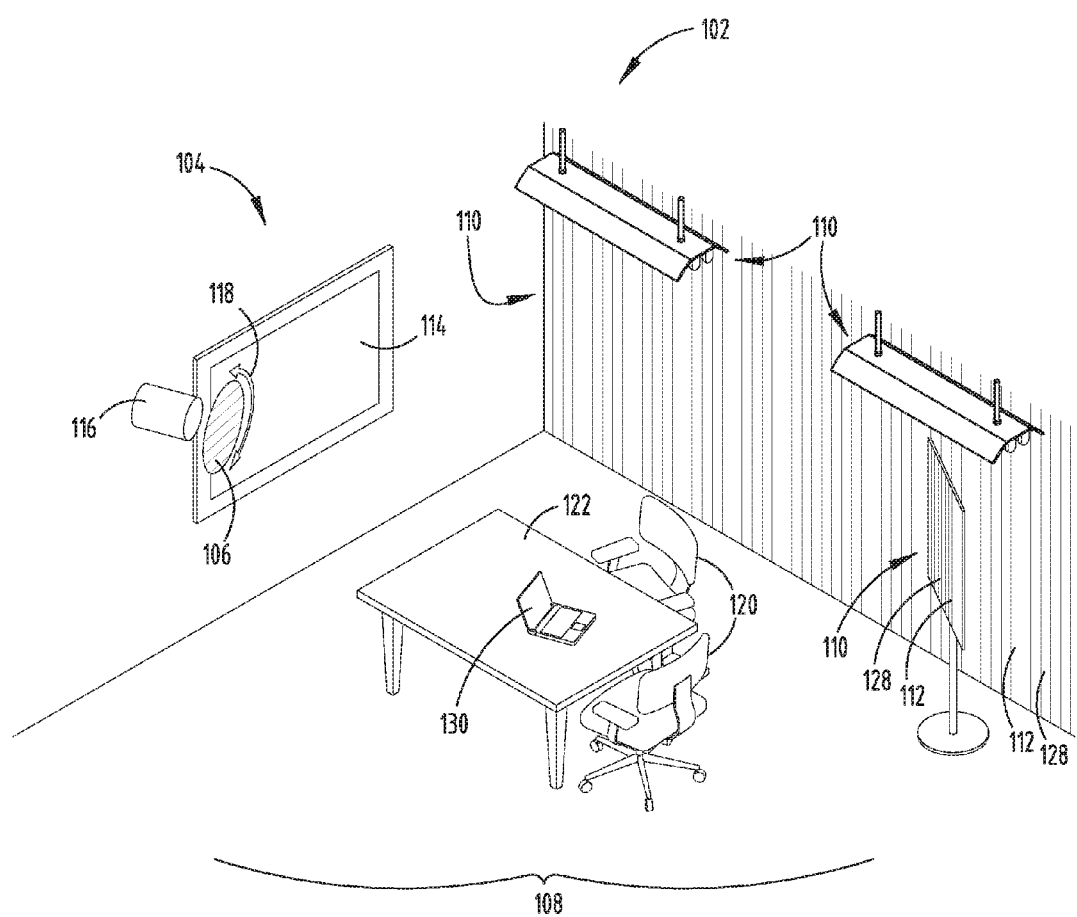
Figure 25A:
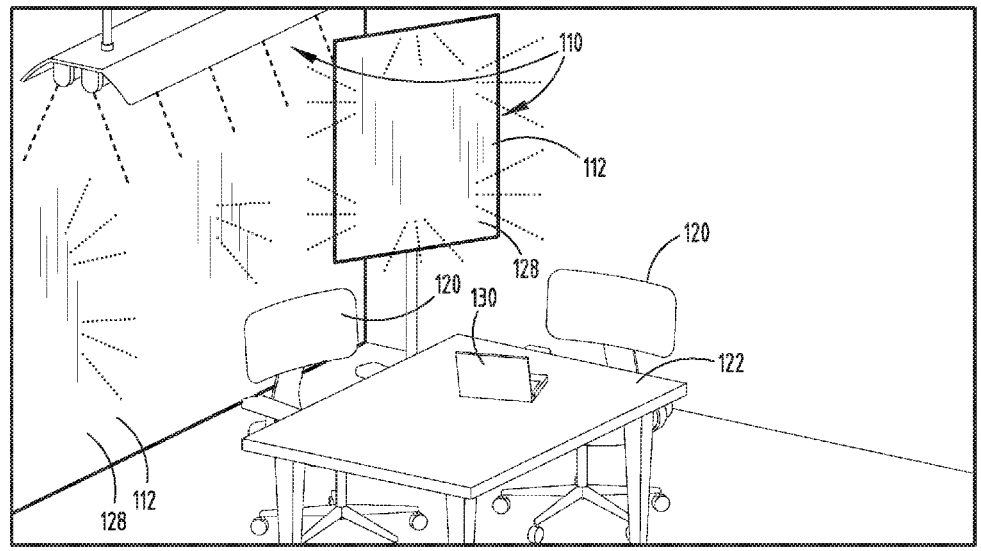
Figure 25B:
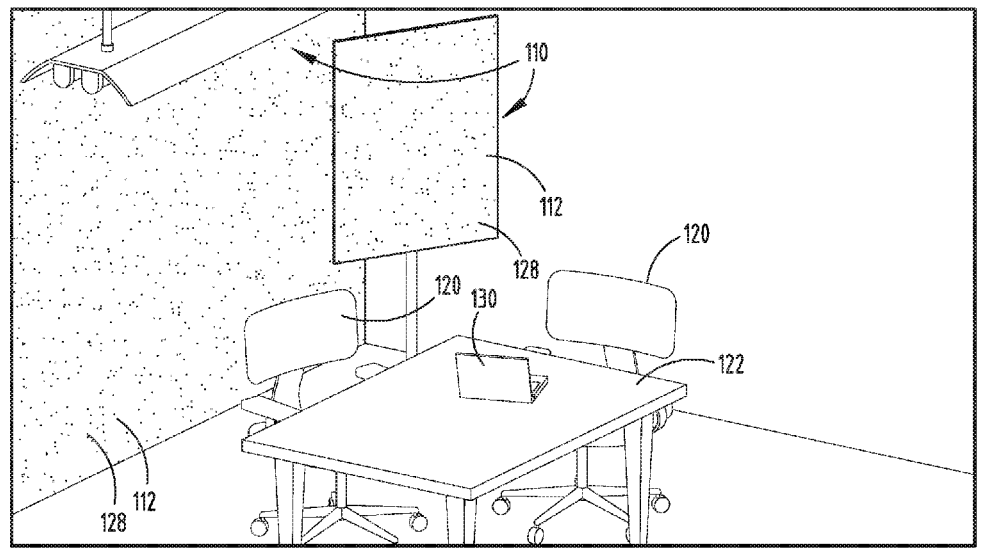
Figure 26:
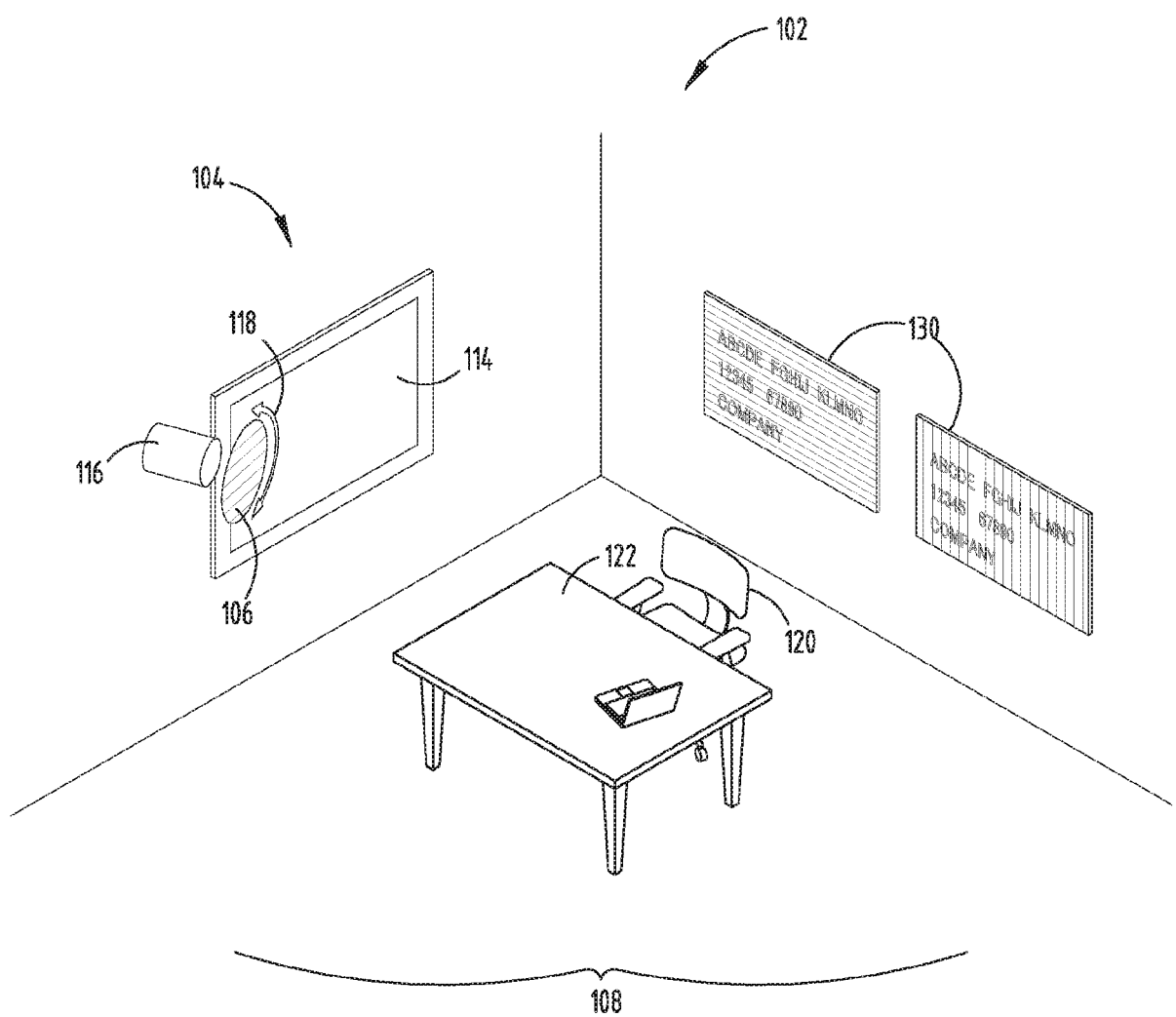
Figure 26A:
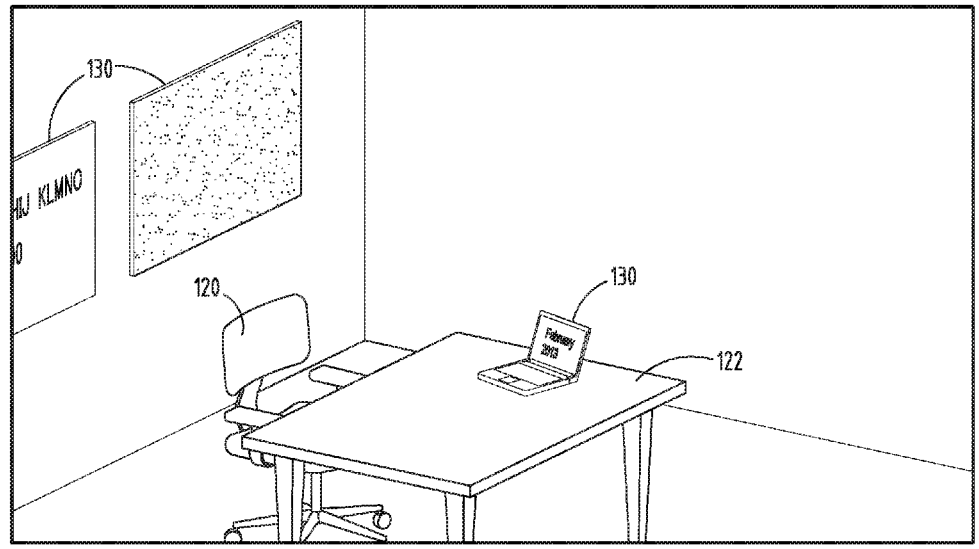
Figure 26B:
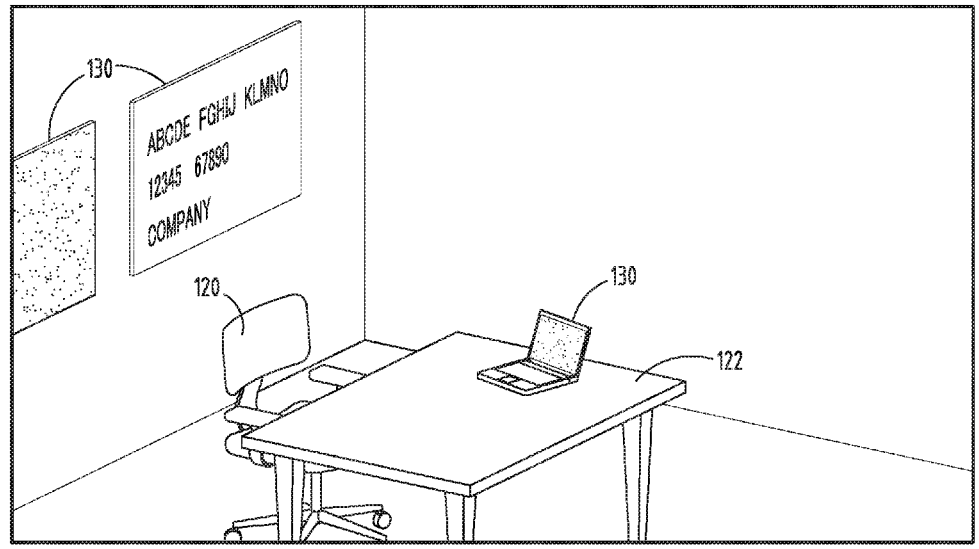
Figure 26C:
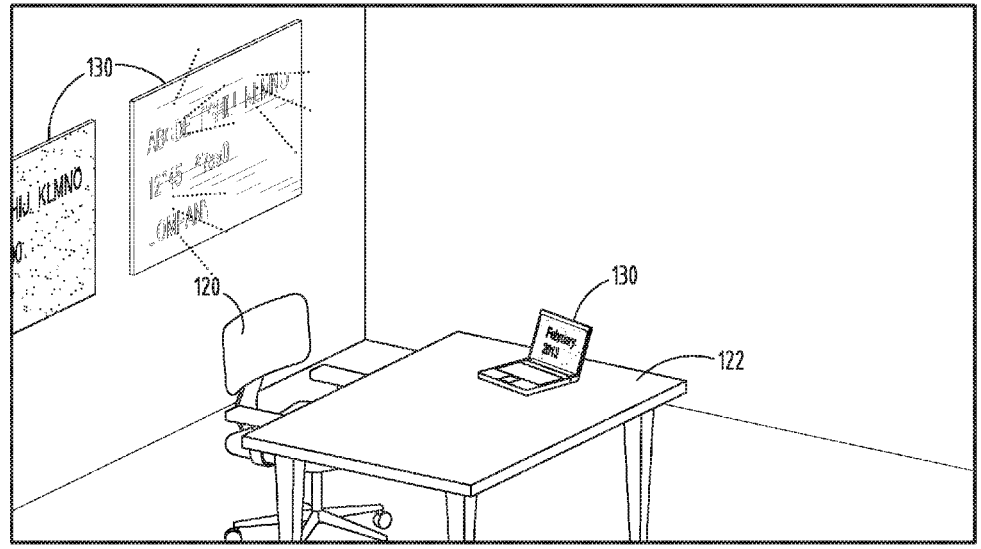
Figure 26D:
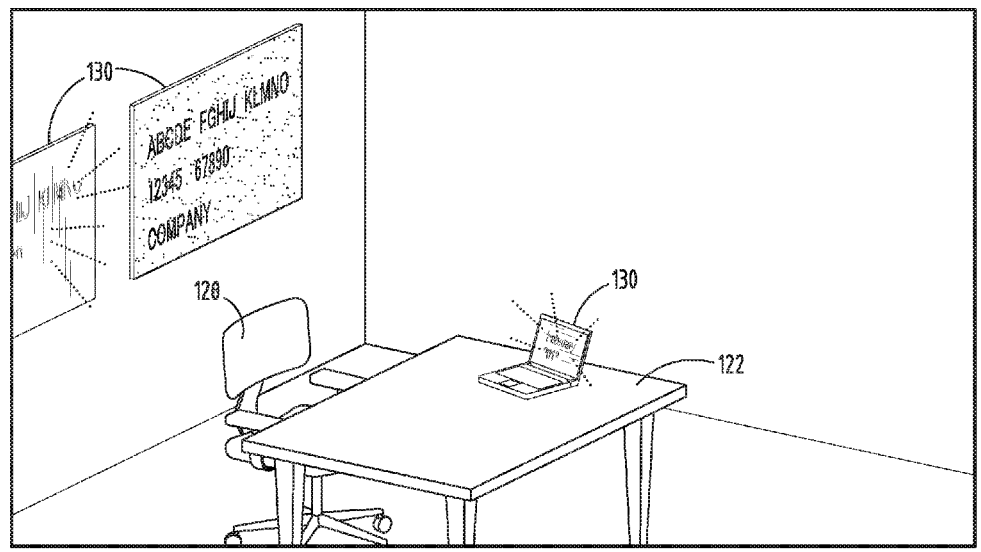
Figure 27:
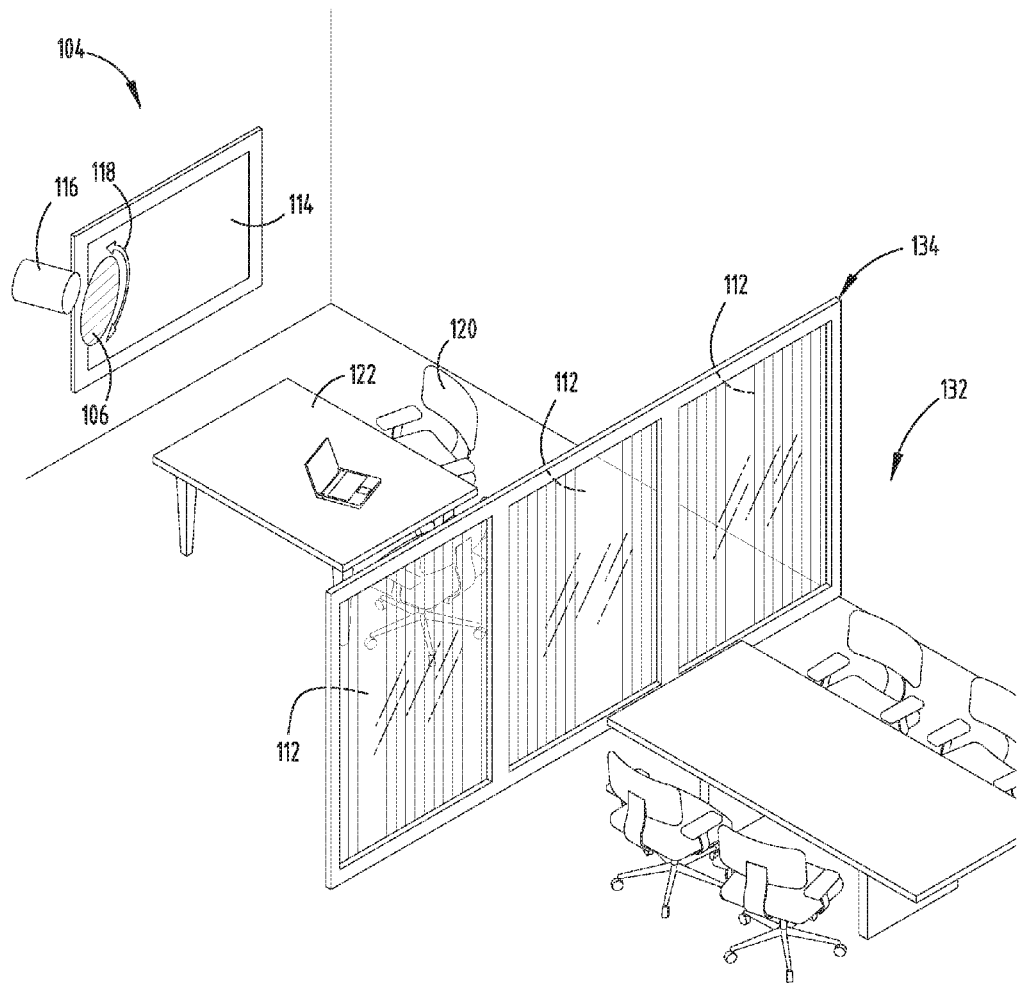
Figure 27A:
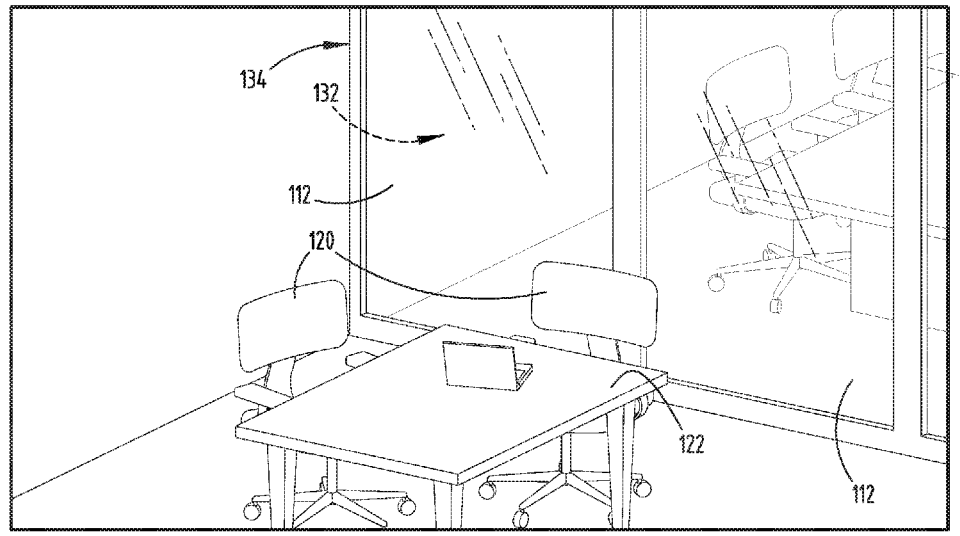
Figure 27B:
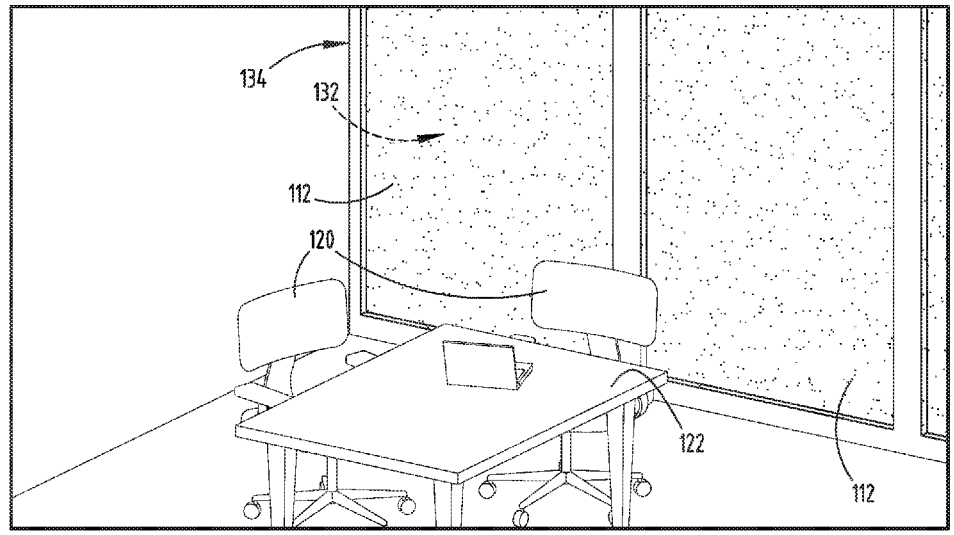
Figure 28:
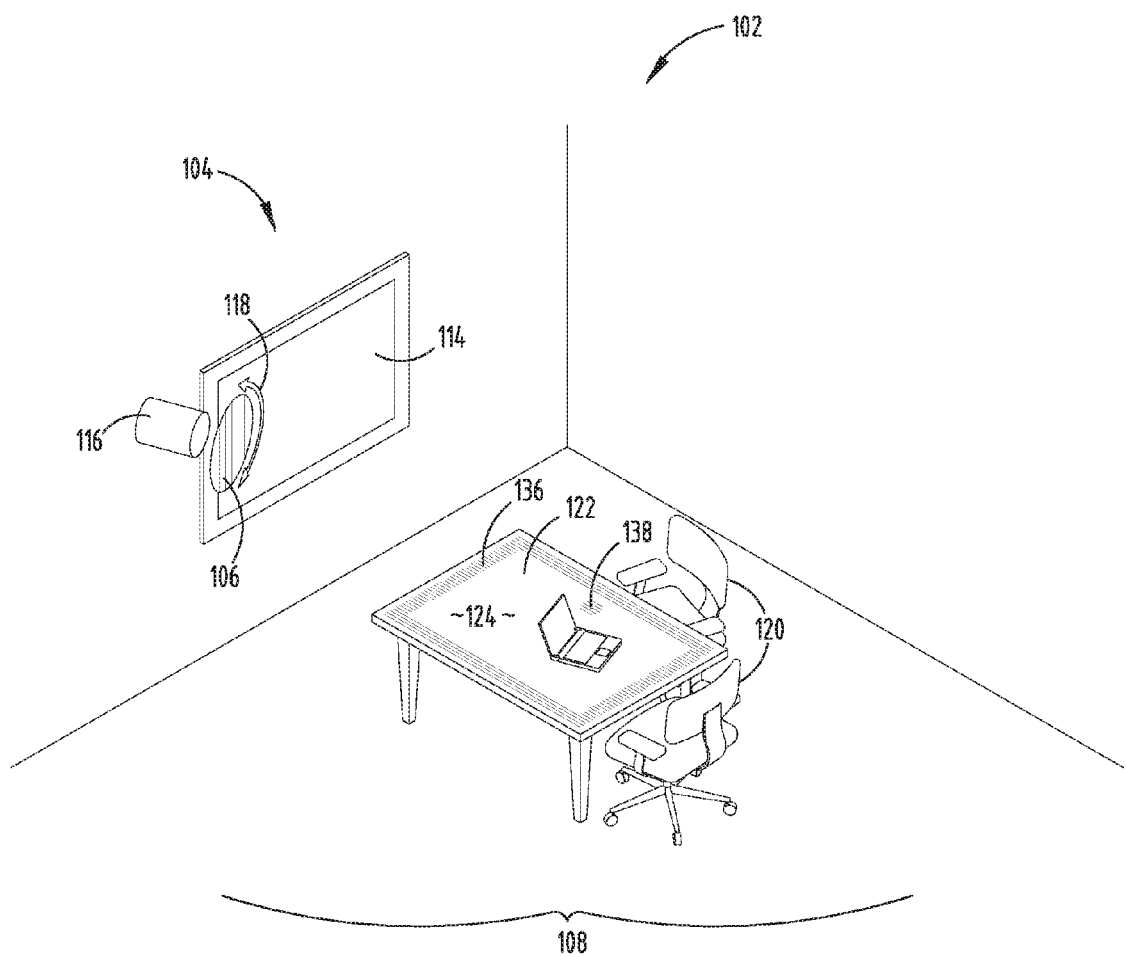
Figure 28A:
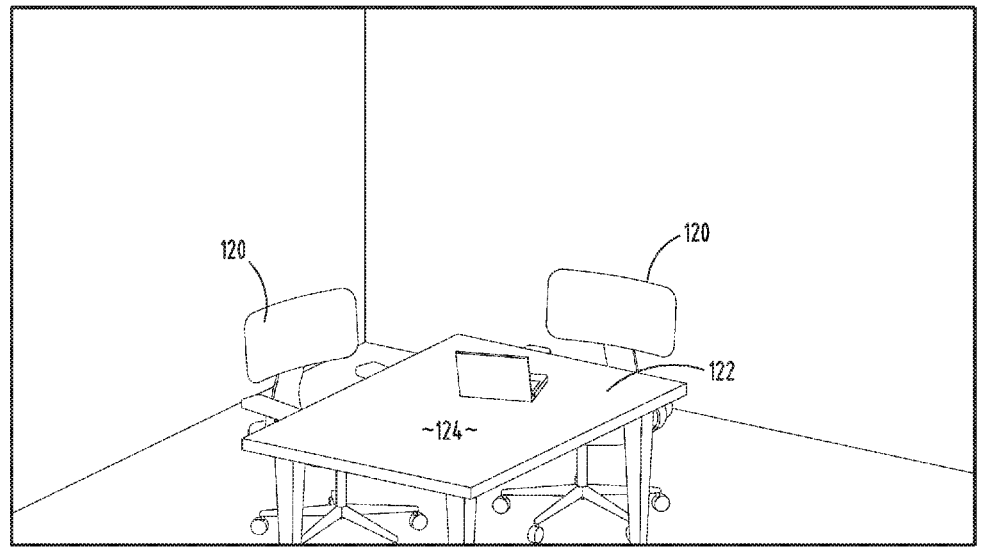
Figure 28B:
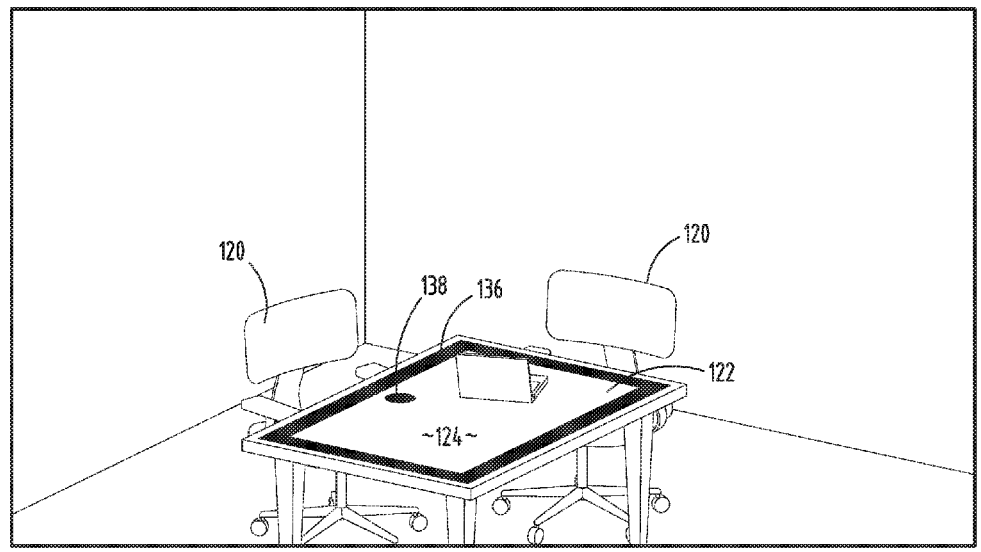
Figure 29:
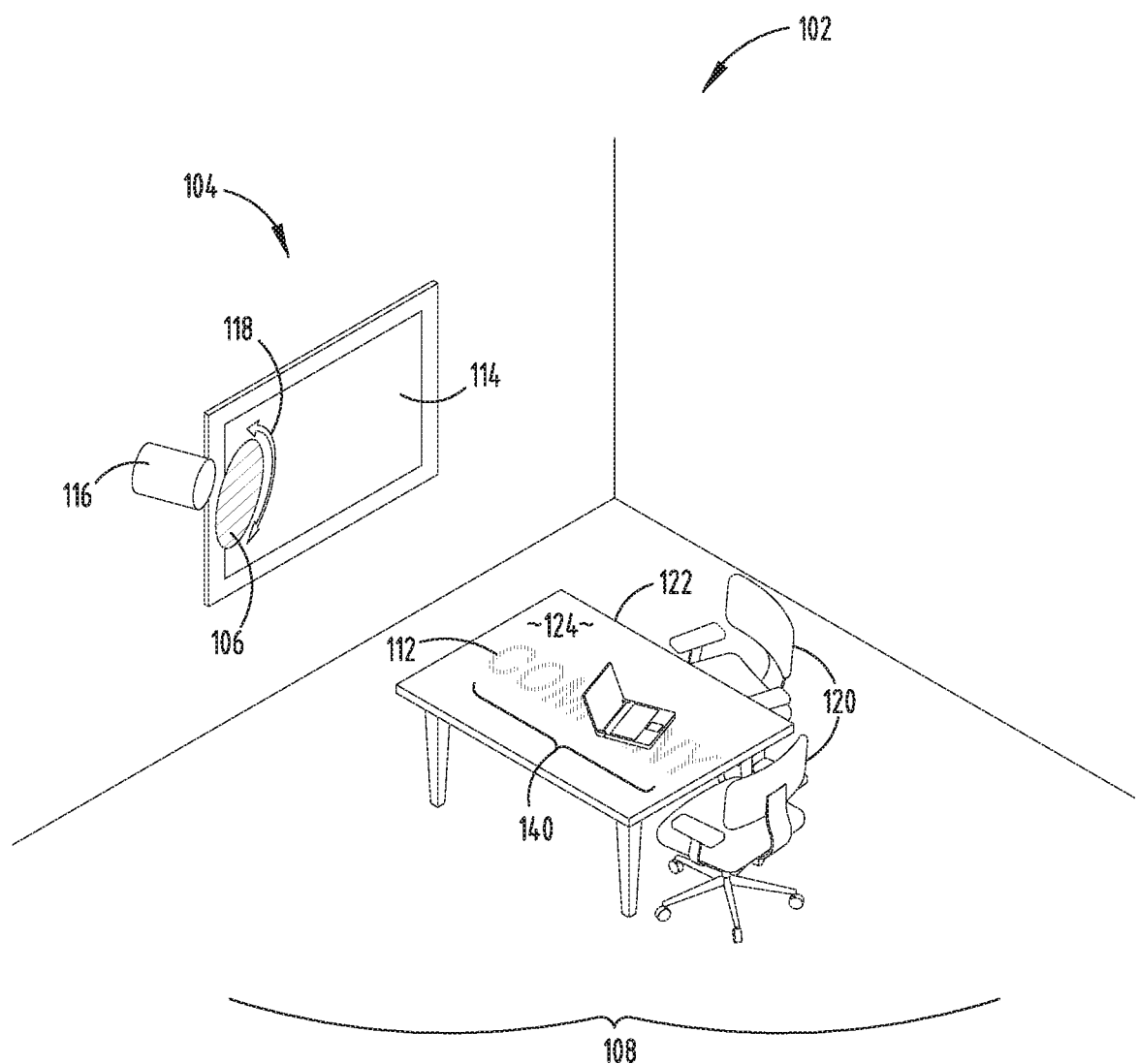
Figure 29A:
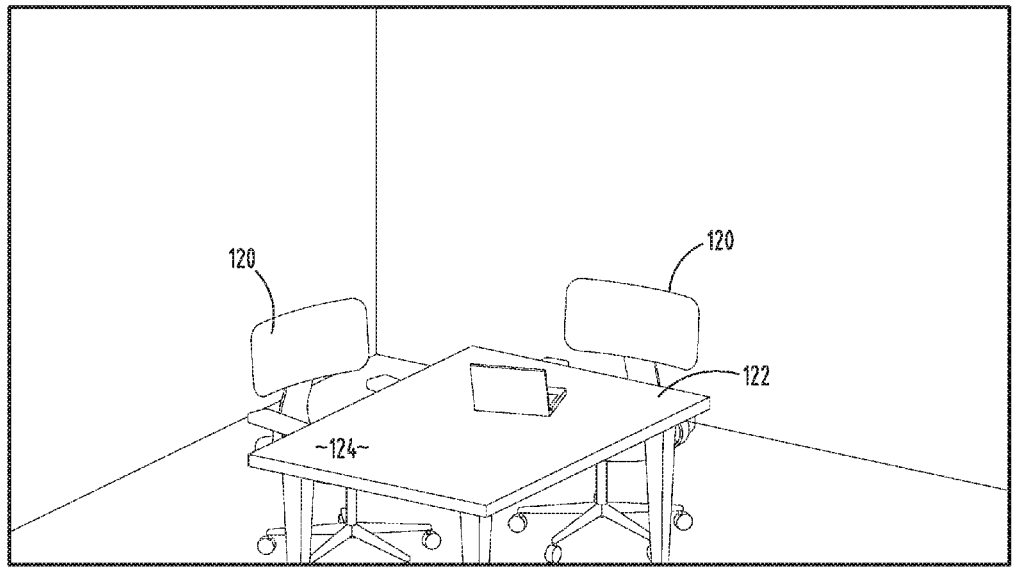
Figure 29B:
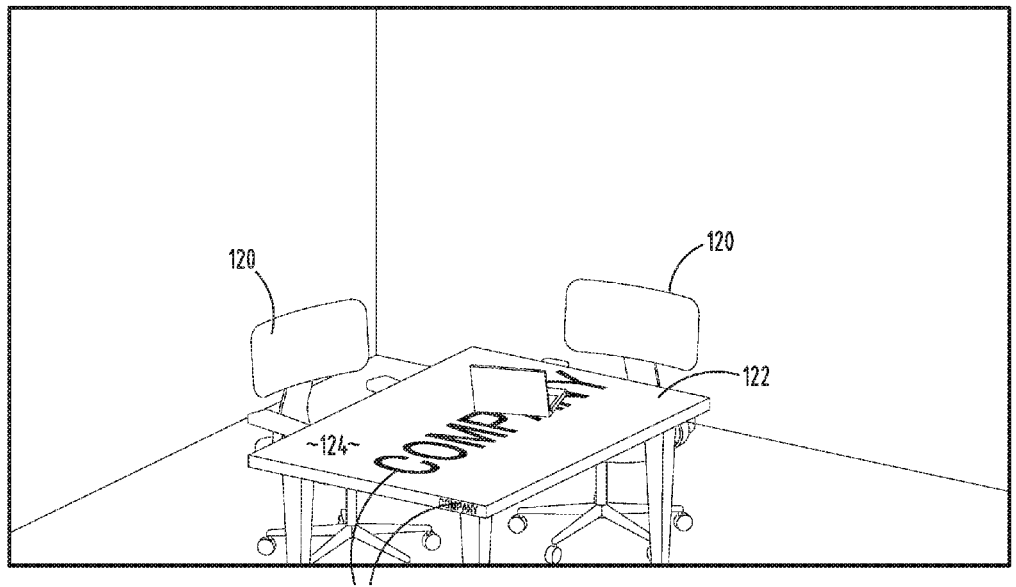
Figure 30:
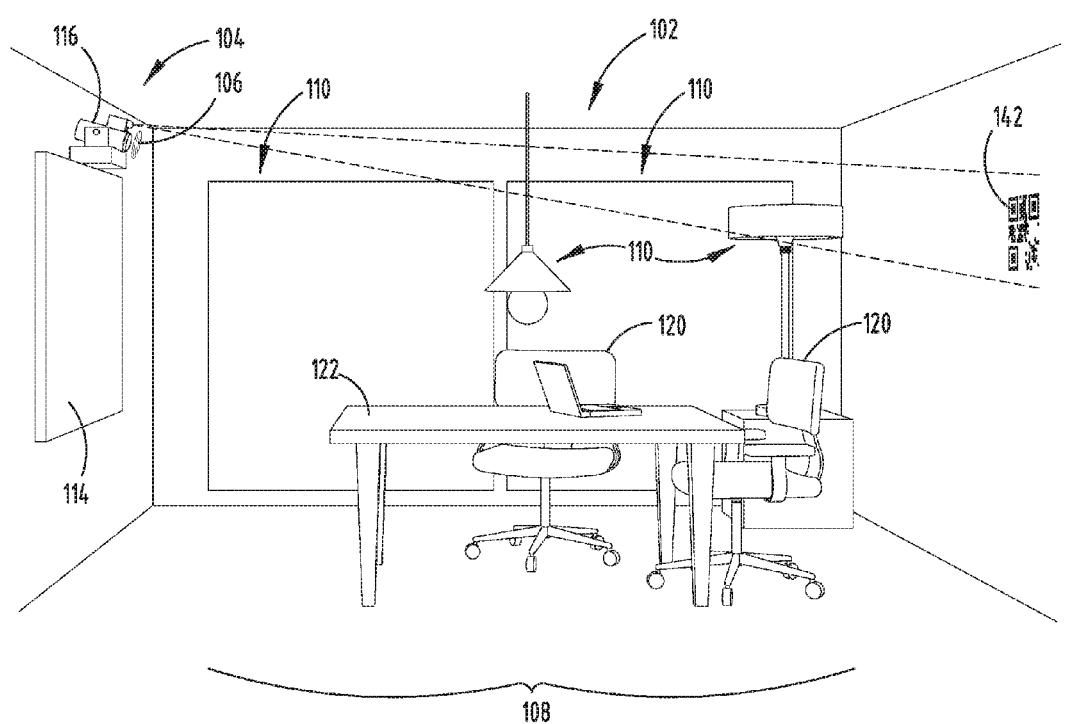
Figure 30A:
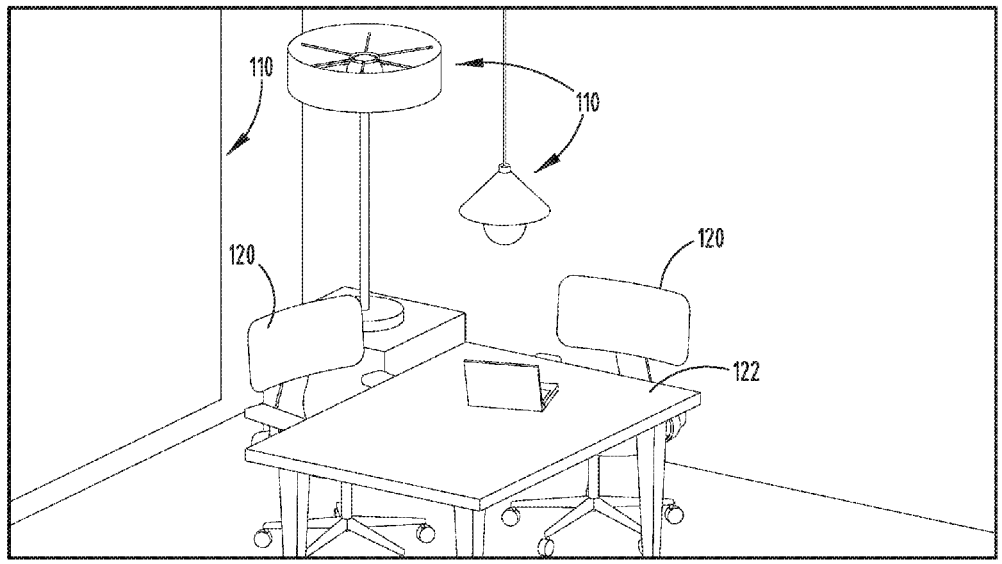
Figure 30B:
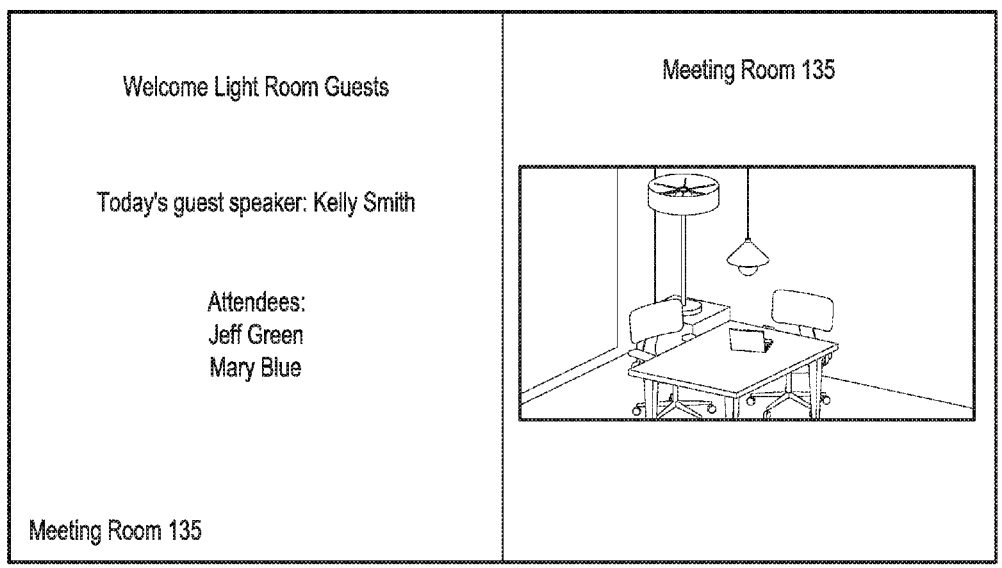
Figure 31:
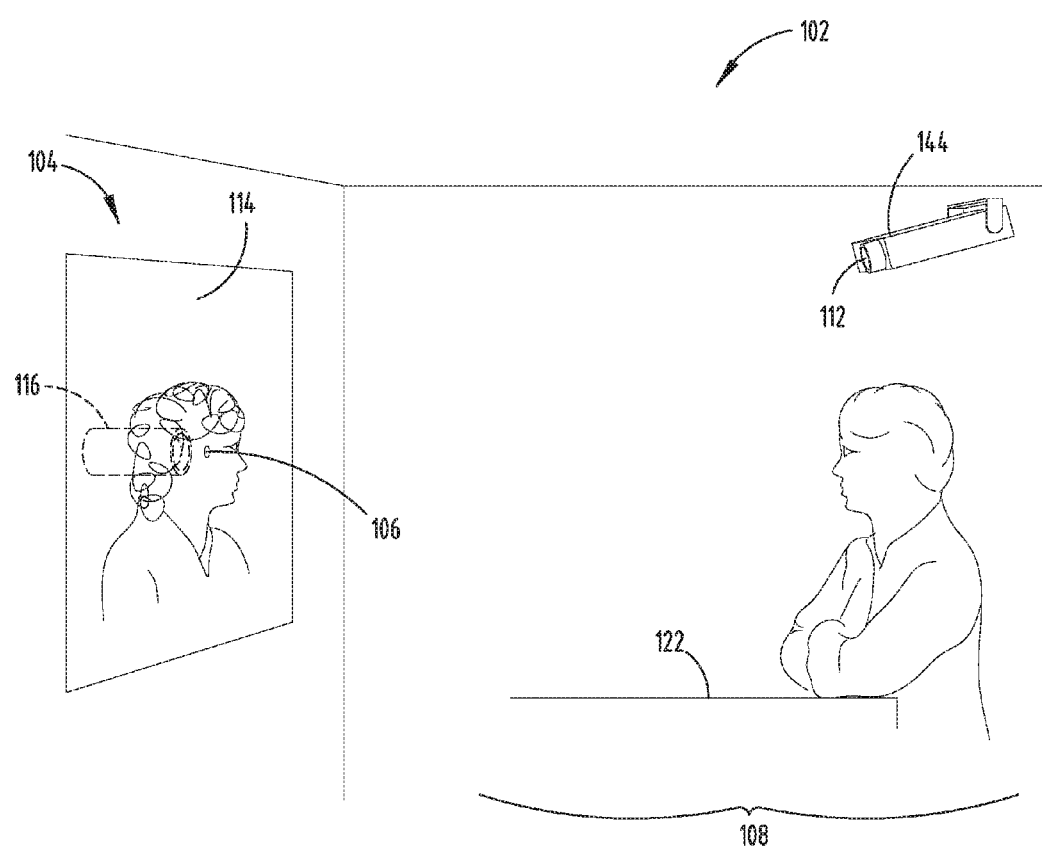
Figure 31A:
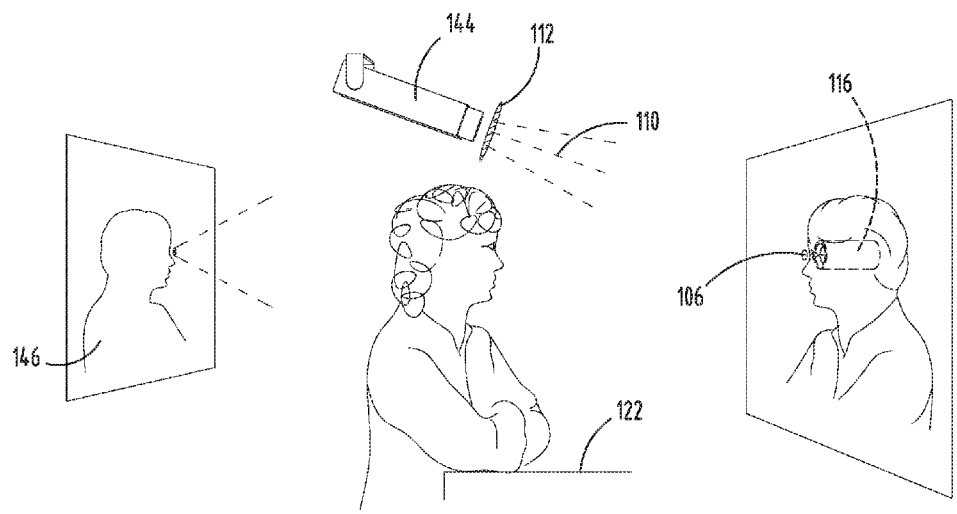
Figure 31B:
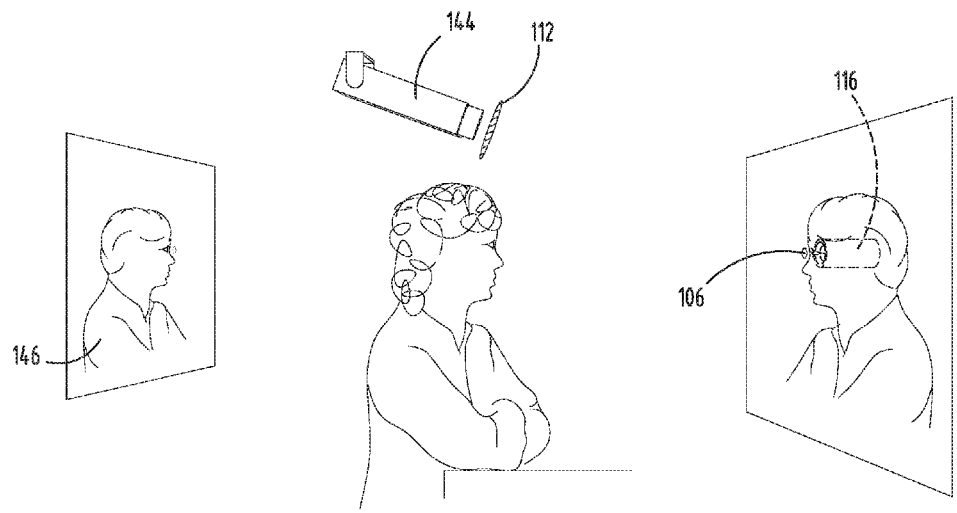
Figure 32:
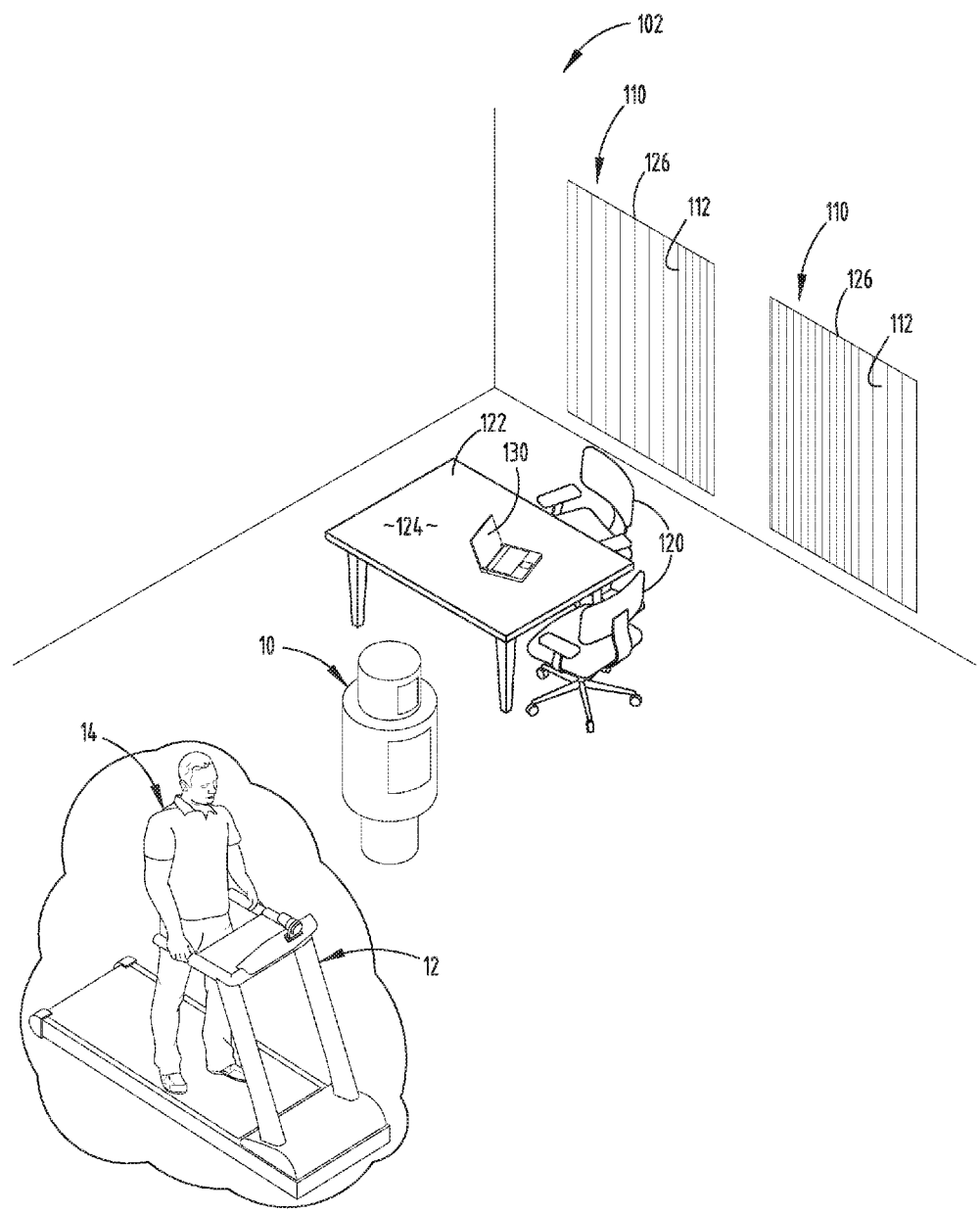
Figure 33:
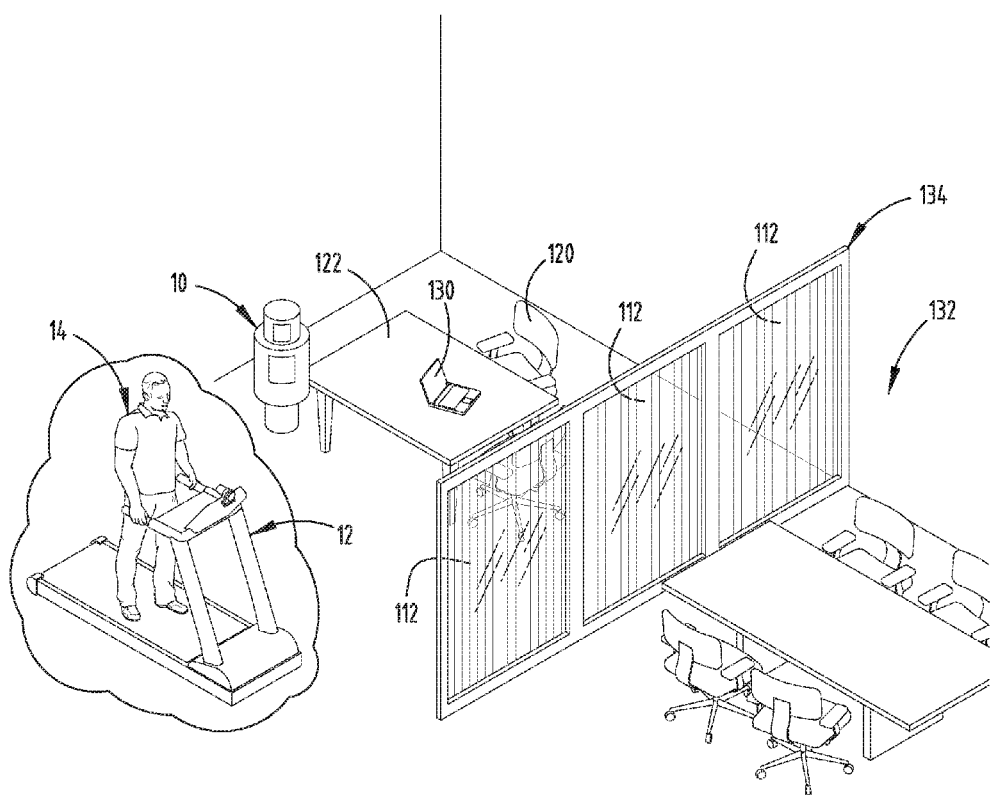
Figure 34:
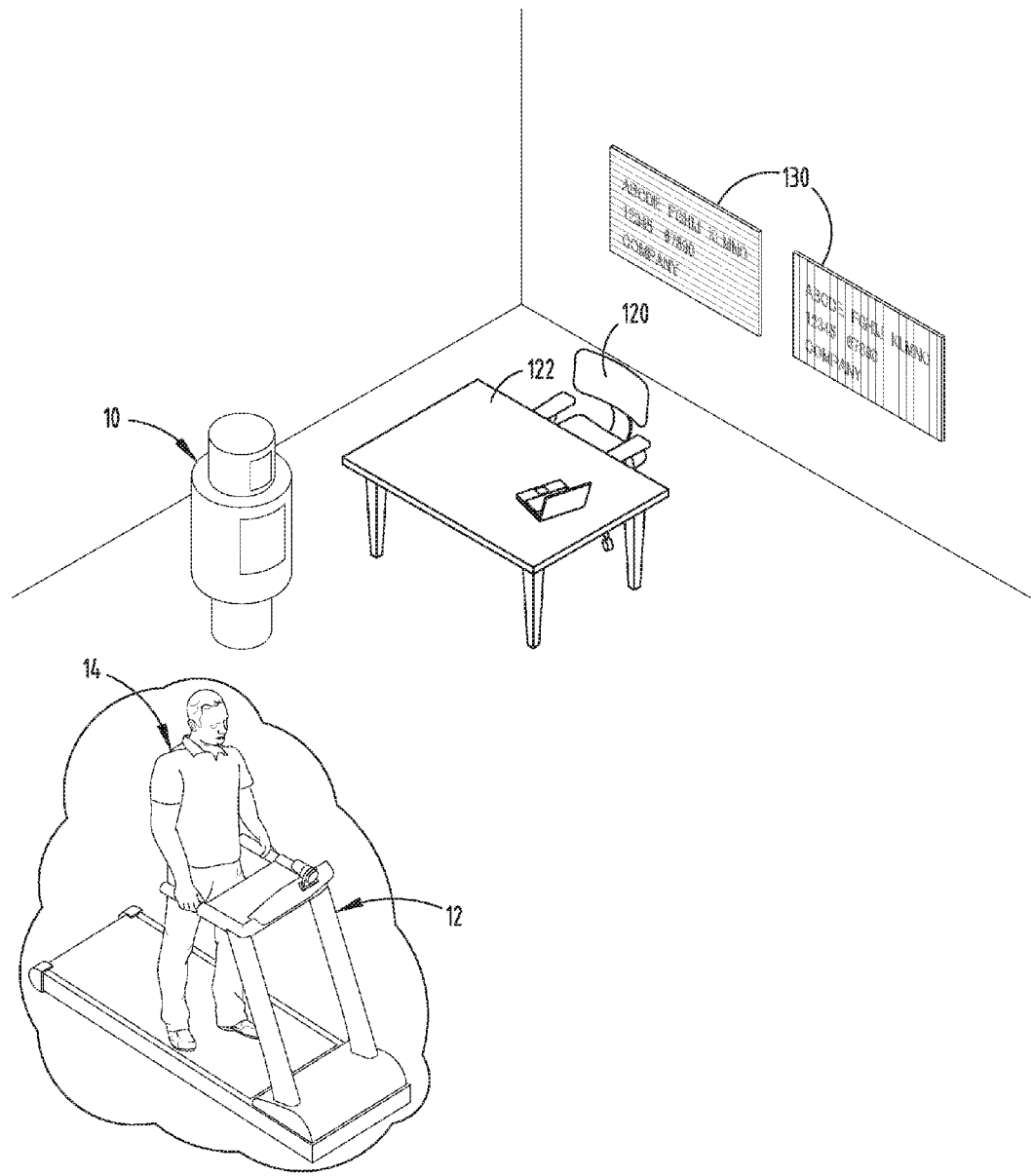

22, where a relative angle between the molecular orientation of two polarizing filters is between zero and forty-five degrees;

FIG. 22C is a side perspective view of a portion of the video conferencing environment or meeting room of FIG. 22, where a relative angle between the molecular orientation of two polarizing filters is between forty-five and ninety degrees;

FIG. 22D is a side perspective view of a portion of the video conferencing environment or meeting room of FIG. 22, where a relative angle between the molecular orientation of two polarizing filters is ninety degrees;

FIG. 23 is a top perspective view of a video conferencing environment or meeting room according to another exemplary embodiment of the invention;

FIG. 23A is a side perspective view of a portion of the video conferencing environment or meeting room of FIG. 23, where a relative angle between the molecular orientation of two polarizing filters is zero;

FIG. 23B is a side perspective view of a portion of the video conferencing environment or meeting room of FIG. 23, where a relative angle between the molecular orientation of two polarizing filters is ninety degrees;

FIG. 24 is a top perspective view of a video conferencing environment or meeting room according to yet another exemplary embodiment of the invention;

FIG. 24A is a side perspective view of a portion of the video conferencing environment or meeting room of FIG. 24, where a relative angle between the molecular orientation of two polarizing filters is zero;

FIG. 24B is a side perspective view of a portion of the video conferencing environment or meeting room of FIG. 24, where a relative angle between the molecular orientation of two polarizing filters is ninety degrees;

FIG. 25 is a top perspective view of a video conferencing environment or meeting room according to another exemplary embodiment of the invention;

FIG. 25A is a side perspective view of a portion of the video conferencing environment or meeting room of FIG. 25, where a relative angle between the molecular orientation of two polarizing filters is zero;

FIG. 25B is a side perspective view of a portion of the video conferencing environment or meeting room of FIG. 25, where a relative angle between the molecular orientation of two polarizing filters is ninety degrees;

FIG. 26 is a top perspective view of a video conferencing environment or meeting room according to another exemplary embodiment of the invention;

FIG. 26A is a side perspective view of a portion of the video conferencing environment or meeting room of FIG. 26 or 34, where a relative angle between the molecular orientation of a primary polarizing filter and a left side secondary polarizing filter and a laptop secondary polarizing filter is approximately zero and a relative angle between the molecular orientation of the primary polarizing filter and a right side secondary polarizing filter is approximately ninety degrees;

FIG. 26B is a side perspective view of a portion of the video conferencing environment or meeting room of FIG. 26 or 34, where a relative angle between the molecular orientation of a primary polarizing filter and a left side secondary polarizing filter and a laptop secondary polarizing filter is approximately ninety degrees and a relative angle between the molecular orientation of the primary polarizing filter and a right side secondary polarizing filter is approximately ninety degrees;

FIG. 26C is a side perspective view of a portion of the video conferencing environment or meeting room of FIG. 26 or 34, where a relative angle between the molecular orientation of a primary polarizing filter and a left side secondary polarizing filter and a laptop secondary polarizing filter is between forty-five and ninety degrees and a relative angle between the molecular orientation of the primary polarizing filter and a right side secondary polarizing filter is between zero and forty-five degrees;

FIG. 26D is a side perspective view of a portion of the video conferencing environment or meeting room of FIG. 26 or 34, where a relative angle between the molecular orientation of a primary polarizing filter and a left side secondary polarizing filter and a laptop secondary polarizing filter is between zero and forty-five degrees and a relative angle between the molecular orientation of the primary polarizing filter and a right side secondary polarizing filter is between forty-five and ninety degrees;

FIG. 27 is a top perspective view of a video conferencing environment or meeting room according to yet another exemplary embodiment of the invention;

FIG. 27A is a side perspective view of a portion of the video conferencing environment or meeting room of FIG. 27 or 33, where a relative angle between the molecular orientation of two polarizing filters is approximately zero;

FIG. 27B is a side perspective view of a portion of the video conferencing environment or meeting room of FIG. 27 or 33, where a relative angle between the molecular orientations of two polarizing filters is approximately ninety degrees;

FIG. 28 is a top perspective view of a video conferencing environment or meeting room according to another exemplary embodiment of the invention;

FIG. 28A is a side perspective view of a portion of the video conferencing environment or meeting room of FIG. 28, where a relative angle between the molecular orientation of two polarizing filters is zero;

FIG. 28B is a side perspective view of a portion of the video conferencing environment or meeting room of FIG. 28, where a relative angle between the molecular orientation of two polarizing filters is ninety degrees;

FIG. 29 is a top perspective view of a video conferencing environment or meeting room according to another exemplary embodiment of the invention;

FIG. 29A is a side perspective view of a portion of the video conferencing environment or meeting room of FIG. 29, where a relative angle between the molecular orientation of two polarizing filters is zero;

FIG. 29B is a side perspective view of a portion of the video conferencing environment or meeting room of FIG. 29, where a relative angle between the molecular orientation of two polarizing filters is ninety degrees;

FIG. 30 is a top perspective view of a video conferencing environment or meeting room according to another exemplary embodiment of the invention;

FIG. 30A is a side perspective view of a portion of the video conferencing environment or meeting room of FIG. 30, where a relative angle between the molecular orientation of two polarizing filters is zero;

FIG. 30B is a split screen view of an information display provided by an augmentation application after reading a matrix barcode similar to the barcode illustrated in FIG. 30;

FIG. 31 is a side perspective view of a video conferencing environment or meeting room according to another exemplary embodiment of the invention;

FIG. 31A is a side perspective view of the video conferencing environment or meeting room of FIG. 31 as seen by a remote viewer, where a relative angle between the molecular orientation of two polarizing filters is zero;

FIG. 31B is a side perspective view of the video conferencing environment or meeting room of FIG. 31 as seen by a remote viewer, where a relative angle between the molecular orientation of two polarizing filters is ninety degrees;

FIG. 32 is a top perspective view of a robot in a meeting room including polarizing filters;

FIG. 33 is a top perspective view of a meeting room adjacent a separate area in a work environment; and FIG. 34 is a top perspective view of a meeting room including LCD or LED display screens having polarizing filters.

DESCRIPTION

Figure 1:
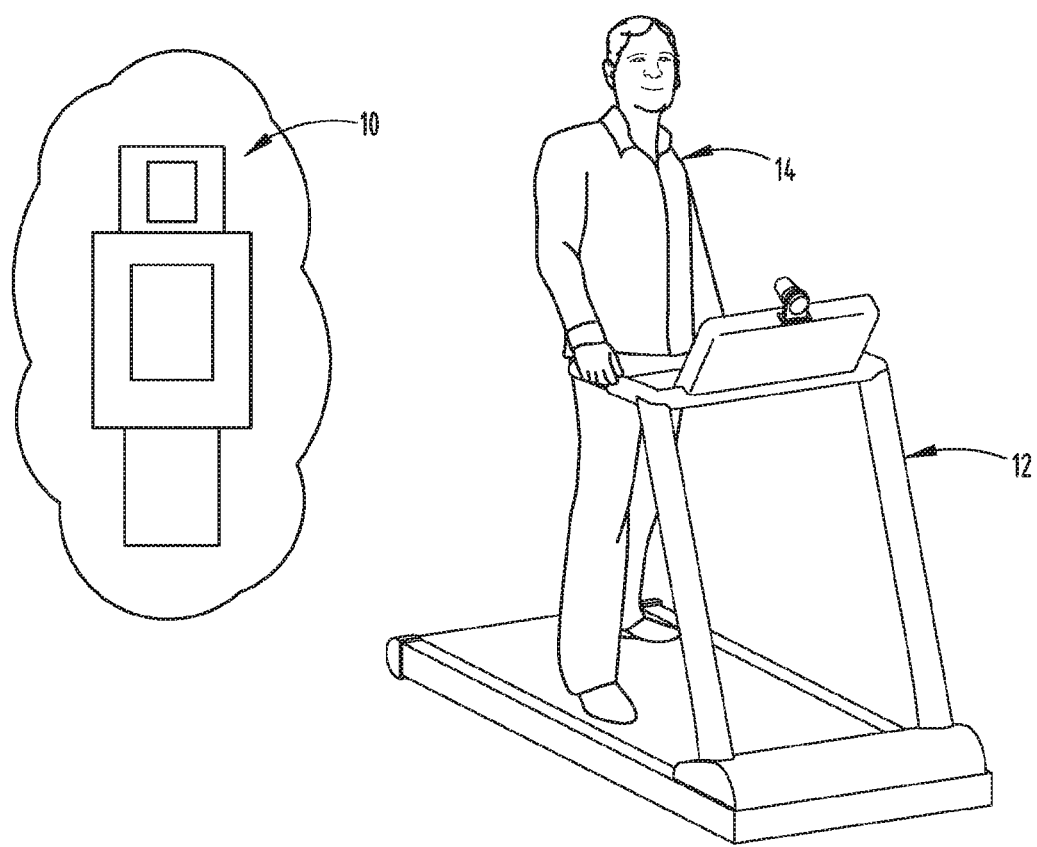
FIG. 1 is a schematic diagram of a robotic telepresence system as described herein.

According to various exemplary embodiments and generally illustrated in FIG. 1, a robotic telepresence system includes a robotic device or robot 10 and a station 12 for an operator or pilot 14. The robot 10 and pilot station 12 are connected over a network or series of networks. The network or series of networks may include the Internet. The robotic telepresence system permits the pilot 14 productive workplace interactions via the robot 10 operating on the network as if the pilot was present in the work environment. The robot 10 is configured to operate in a work environment such as an office building or other facility where people work and interact with each other to transact business and perform tasks. The work environment typically includes one or more spaces, such as offices and meeting rooms, as well as associated hallways, entryways and other areas typically found in an office building or the like. The robot 10 can be configured to operate in any of a wide variety of types of environments, buildings and facilities including, but not limited to, presentation areas, studios, training facilities, schools, education centers, laboratories, test centers, research and development facilities, retail spaces, and show rooms. The pilot station 12 is typically located in a workspace such as a business or home office remote from the work environment, but can be configured for use in a wide variety of spaces. The pilot station 12 is occupied and used by a person who functions as the pilot 14 in remote operation of the robot. As discussed further herein, the pilot station 12 can be used by successive persons 16.

Figure 2:
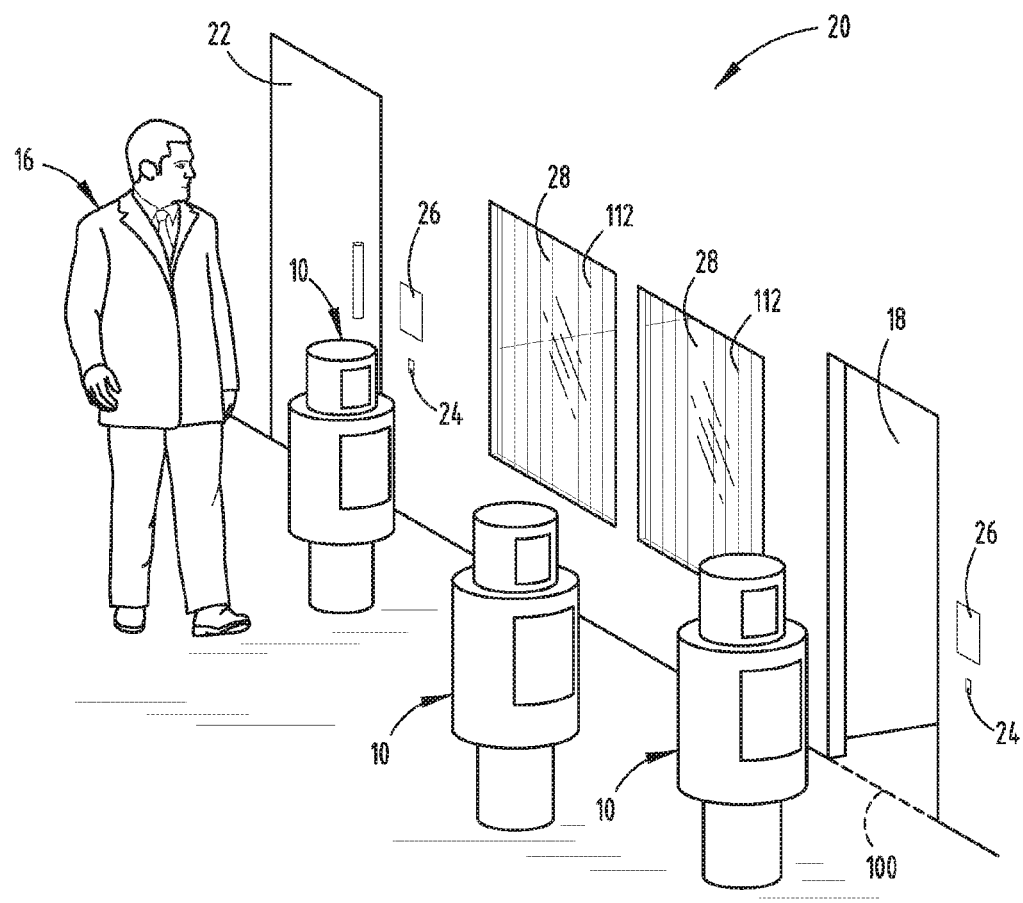
FIG. 2 is a schematic perspective view of a work environment including robotic devices for a robotic telepresence system.

The robot 10 is connected to the network and configured to operate and interact in the work environment either autonomously or at the direction of the pilot 14. Referring to FIG. 2, the robot 10 in the work environment interacts with people 16 about to enter one of several meeting rooms 18. A hallway 20 in the work environment has a number of doorways 22 with security access panels 24. Each security access panel 24 controls entry into a meeting room 18. Information about the meeting or meeting room 18 is displayed outside of the doorway 22 on a display panel 26. The meeting room 18 may or may not have windows 28. The window 28 may provide visibility to the outside or to an adjacent room 30 or hallway 20. The window 28 may also include polarized film. A person 16 or robot 10 must present a badge or device at the security access panel 24 to gain entry into the meeting room 18. Each robot 10 is configured to be capable of moving and interacting with people 16 or other robots 10 within the work environment under the direction of a control system and/or at the direction of the pilot 14 located at the pilot station 12.

Figure 3:
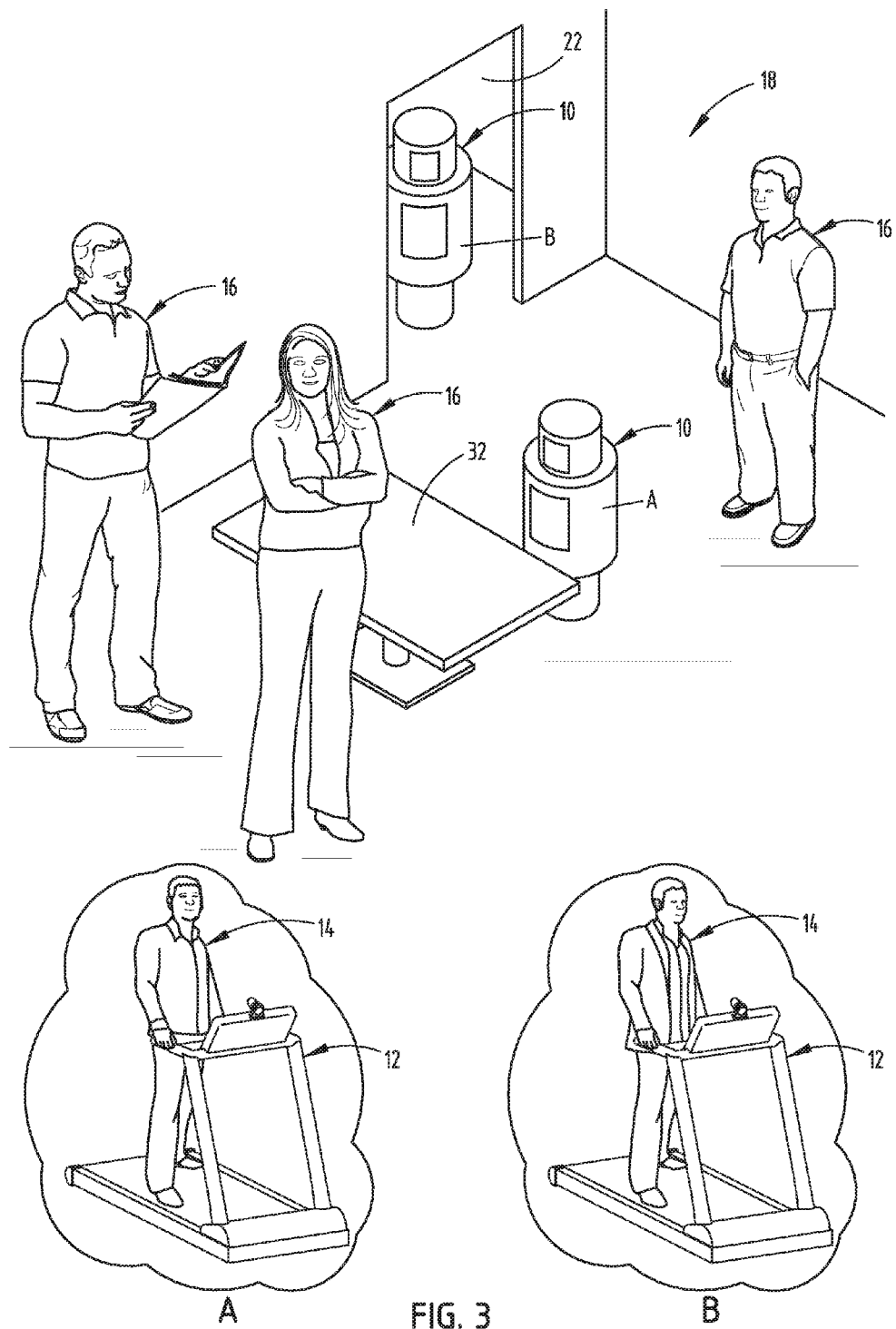
FIG. 3 is a schematic diagram of a robot in a meeting room in a work environment.

Referring to FIG. 3, one or more robots 10 may enter and present themselves into and at a meeting being conducted in a meeting room 18. Along with other persons 16 at the meeting, a robot 10 attending the meeting will assemble around a conference table 32 and be situated. Each robot 10 establishes a position at the table 32 adjacent to or across from persons 16 at the table as do others at the meeting. The robot 10 is a mechanized representative of the pilot 14 at the pilot station 12 remote from the work environment. Each robot 10, as illustrated in FIG. 3, is occupied and under the operation and control of the pilot 14 at a remote pilot station 12. The pilots 14 may be at the same or different remote locations A and B. The meeting room 18 is configured to facilitate interaction and participation by any number of both people 16 and robots 10.

The robot is an electro-mechanical machine capable of using existing, known or future-developed technology as a platform for its core systems. The robot form allows for comfortable and effective operation and representation of the "presence" of the remote pilot at the location of the robot, appropriate and useful interaction by and through the robot, and safe and efficient movement of the robot within the environment or space. The robot may take any of a number of different physical forms. These forms include human-like forms, such as anthropomorphic, android and humanoid forms; vehicle-like forms having wheels or tracks; a hybrid form having combined human and vehicle attributes; or another form, such as a form resembling a four-legged animal or other structure.

Figure 4:
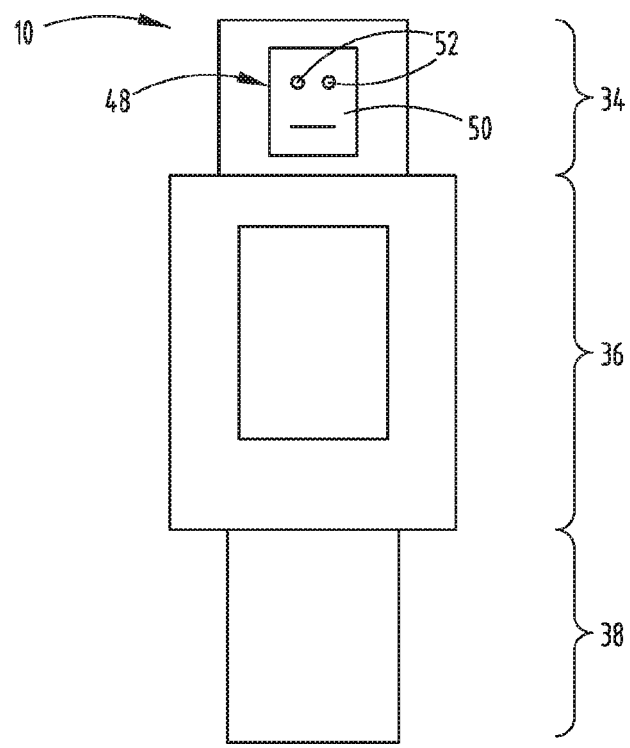
FIG. 4 is a schematic diagram of a robot configuration in an unoccupied state.
Figure 5:
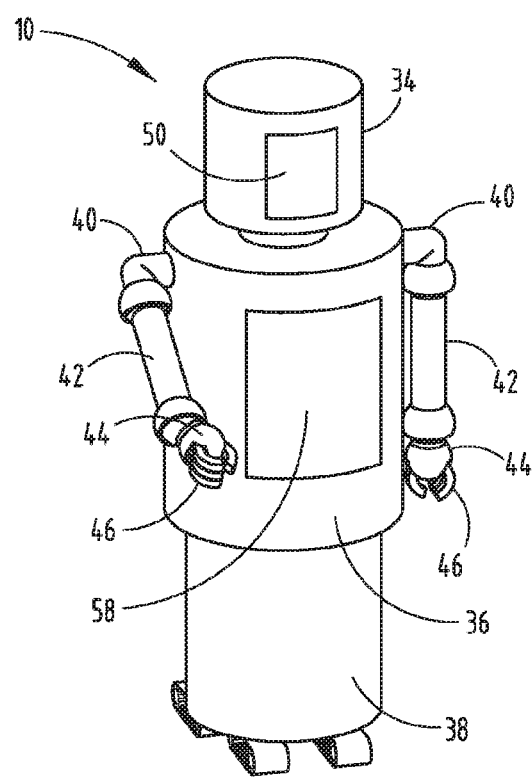
FIG. 5 is a schematic diagram of a robot according to an exemplary embodiment.
Figure 6:
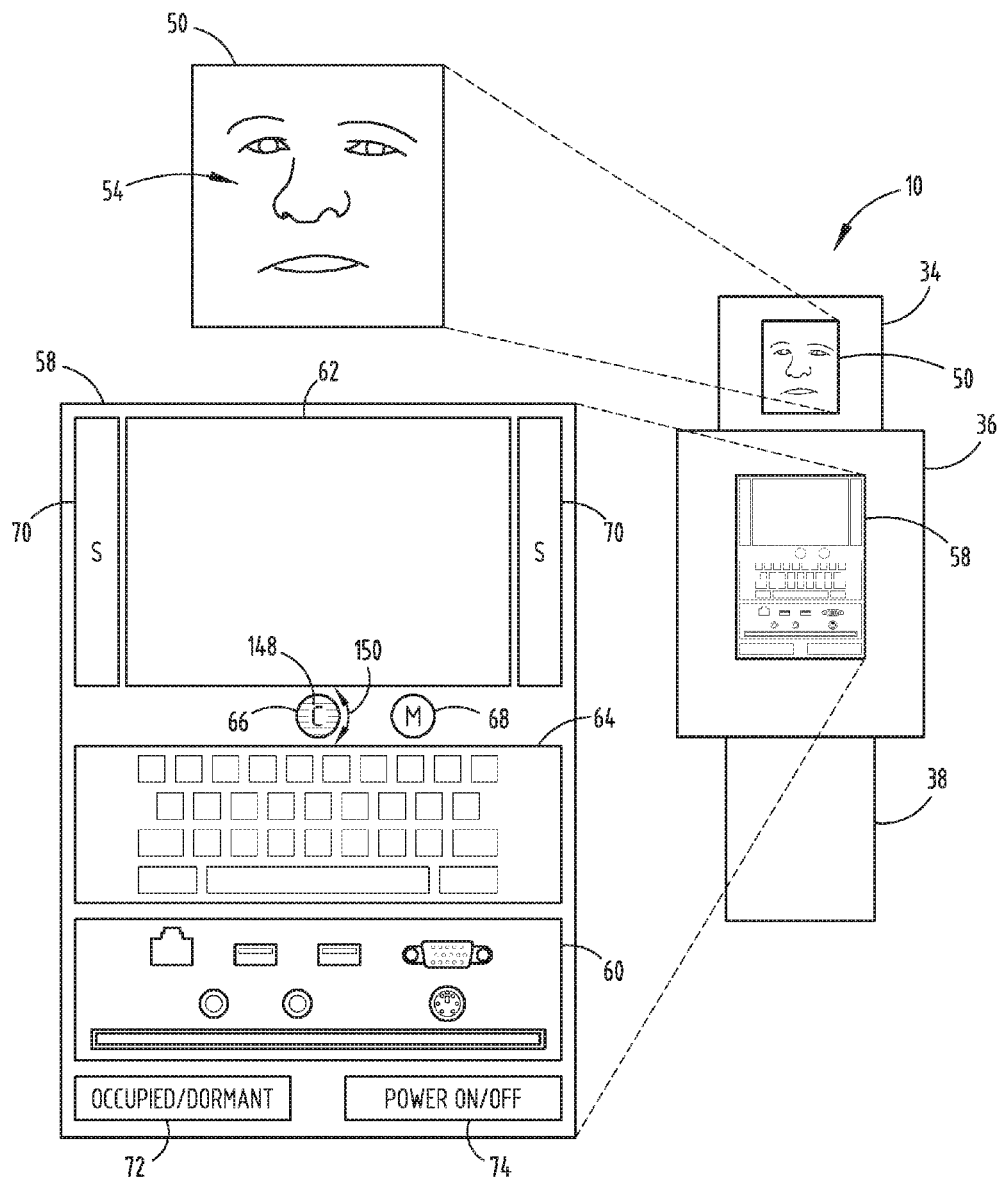
FIG. 6 is a schematic diagram of a robot configuration in an occupied state.

As schematically shown in FIG. 4, the robot 10 typically includes a head portion 34, a torso portion 36 and a base portion 38. Referring specifically to FIG. 5, the torso portion 36 of the robot 10 may include shoulders 40 and arms 42 with "hands" 44 at each end of the arms. The shoulders 40, arms 42 or hands 44 may include devices 46 which can be manipulated. The head portion 34 of the robot 10 is configured to visually indicate whether or not the robot is occupied by a pilot 14. For example, as shown in FIG. 4, when unoccupied the robot 10 may display a standard "robotic face" 48 on a display screen 50 or device on the head portion 34 and as indicated with robotic "eyes" 52, as shown. When occupied by the pilot 14, as indicated in FIG. 6, the head portion 34 of the robot 10 may display the head or face 54 of the pilot. For example, the head portion 34 of the robot 10 can display the pilot's face 54 through a real-time video feed of the pilot 14 at the pilot station 12 or a photographic representation of the pilot from a stored database or as presented by the pilot. The base portion 38 typically includes a chassis supported by legs, wheels, rollers, track, or tread. The form of the robot 10 is adapted to the function or service to be performed. In an alternative embodiment, the robot 10 includes only a torso portion 36 and a base portion 38. The pilot's head can be projected as a holographic image above the torso portion 36. In yet another embodiment, the robot 10 projects the pilot's image as a holographic image at a distance away from the robot.

Figure 7:
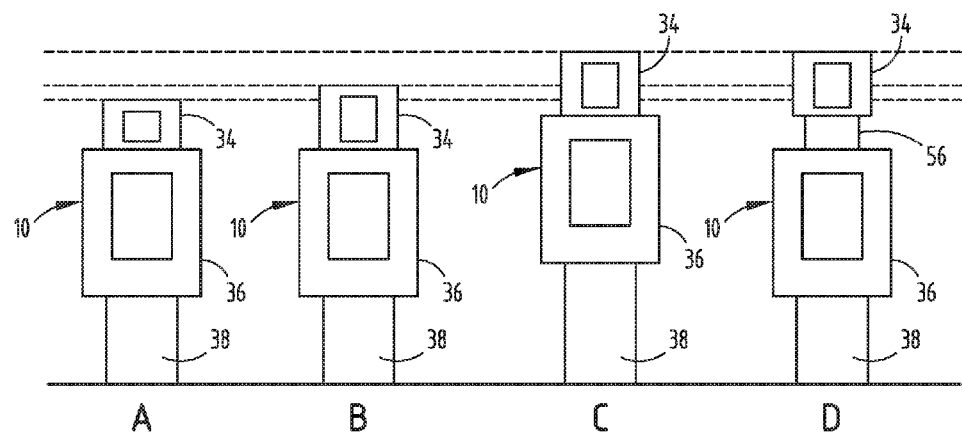
FIG. 7 is a composite schematic diagram of the robot in various states of operation.

As shown in FIG. 7, the robot 10 may alter its physical form or appearance during operation and use. For example, the robot 10 in position A is in a retracted form representing a dormant or out of service state. The robot 10 in position B has an expanded form which represents that the robot is occupied and in service. The robots 10 in positions C and D are shown in a further expanded form with an extended base portion 38 and a neck 56, respectively, which may represent occupancy by different individual pilots. The robot 10 is capable of adjusting its form to indicate its state or status to persons interacting with the robot in the work environment. The indicators are according to protocols to ensure that persons interacting or encountering the robot are accepting of the physical form and not in question as to the state or status of the robot.

The robot 10 includes one or more of the following: a computing system, a control system, power or a power management system, actuators, motors, sensors, detectors and indicators, interfaces for networking and connectivity to devices and systems. The robot may also include other installed or interconnected systems, devices and peripherals. The computing system may include multiple computers including a computer configured to manage the overall operation of the robot and processing of commands, data and information from the pilot station. According to a preferred embodiment, the computing system will include a computer and related systems with interconnections to devices and peripherals and to available networks, including, but not limited to, a local area network (LAN), a virtual private network (VPN), home, public, other external networks, and the Internet. The control system is configured to operate the actuators and motors of the robot as commanded. The power management system typically includes a battery pack or a similar power storage device and a charging system for the battery pack. The power management system may also include a controller. The power management controller manages the state of health, use and charge of the battery pack. The sensors and detectors may include motion detectors, microphones, cameras, switches, infrared detectors, and radio frequency identification (RFID). Suitable indicators include, but are not limited to, information display devices such as display screens, monitors or panels, audio speakers, indicator lights, signals, mechanical devices and switches. The computing system is able to operate installed or connected devices such as a printer, scanner, reader, projector, network interface, storage, additional audio-visual devices, input/output devices or panels, supplemental instrumentation, supplemental detectors, auxiliary power and battery packs. The robot for a given environment may have a standard configuration and then be designed to allow modular interchangeability of components and devices for configuration/reconfiguration for specific and particular purposes.

The robot 10 is connected to a network and is configured to operate and interact in the work environment either autonomously or at the direction of a pilot. The network may include a wireless network by which data and information including command or control instructions and station-keeping are transmitted to and received by the robot in communication with one or more computing or network devices. When operated at the direction of a pilot, the robot is controlled through the pilot station, which is connected to a network and provides a user interface. The user interface includes information and controls which allow the pilot to operate the robot if required or desired. Over a network connection and through robotic telepresence via the robot, the pilot engages in interactions in the work environment as if the pilot is in the work environment.

Referring to FIG. 6, the robot 10 is shown in schematic form having a control panel 58 and an installed device or devices 60. The control panel 58 for the robot may provide a video display 62, an input panel 64, one or more cameras 66, one or more microphones 68 and speakers 70 as well as other indicator lights and the like. Preferably, the camera 66 includes an electronically controlled iris lens and zoom capabilities. At the control panel 58, persons in the work environment are able to interact and obtain information from the robot as to the robot status, loads, scheduling and condition. The robot status 72 is indicated on the control panel 58. The status 72 can include whether the robot is occupied; dormant; available for use; available for scheduling; next and future scheduled uses; past, present, future scheduled pilots; status of monitoring or activity; and tracking or other stored and available data. Other conditions of the robot such as the state of charge of the battery 74 are also indicated at the control panel 58. The control panel provides a convenient means for persons interacting with the robot in the work environment to determine the state and condition of the robot and to obtain information used to assign the robot temporary or other tasks and functions. These control panel functions, displays and output indicators can also be distributed on the robot itself to facilitate information availability and relevance.

Referring still to FIG. 6, the robot 10 may have one or more "onboard" devices 60 that provide enhanced functionality and capability for operation of the robot in the work environment. According to an exemplary embodiment, different robots can be equipped with different functionality within a fleet of robots or may all be the same. Functionality and capabilities for each robot are provided through installation or interchange of devices; modules or components that are removed in a plug-and-play manner or maybe more permanently installed in the robot. Example functionalities and components may include: (a) networking, such as providing an access port for WI-FI®, BLUETOOTH® or other wireless transceiver capability; (b) presenting audio-visual signals through video display or projection and audio speakers; (c) capturing or recording audio-visual signals through a camera, a camera array, a microphone, a microphone array or other sensors; (d) storing and presenting information and data for use in functions, interactions, presentations, postings, and events, as well as local onboard storage of information relating to past, present and future pilot occupants of the robot; (e) document management capabilities such as the ability to print, scan and hold documents; and (f) security monitoring and detection capability, for example, to monitor persons in the workspace or to obtain access into restricted access areas in a workspace. The robot is provided with any of a wide variety of functionalities and capabilities in a particular work environment.

Referring again to FIG. 6, the robot 10 is provided with one or more devices 60 such a printer and scanner for document management as well as document storage or repository functionality. The robot can scan and print a document, or simply print a document accessed from local storage, network storage, cloud computing resources or other sources. The robot can also serve as a repository of the paper document. For example, a robot is assigned the task of obtaining signatures of persons for a particular project or matter by having installed a printer and scanner. The robot is then sent to various persons in the work environment; a document is printed for review; the document is reviewed, signed and then scanned and stored in the robot or transmitted back over the network for storage and use. The robot may also hold a repository for the printed paper copy of documents that are used within the purpose of the robot. The robot then goes from person to person to obtain the necessary signatures and signoffs and returns to a designated final location to upload the documents upon completion of the designated task.

The robot 10 may also include one or more display panels or whiteboards that allow marking and recordation of information. The robot can be configured to capture and record information documented on whiteboards in the workspace or other tools to allow recording and transcription of meeting and special event information. The robot may have audio-visual capabilities including microphones 68 and speakers 70, video cameras 66 and displays 62. The robot 10 may also have installed network storage capability or connectivity to other storage such as cloud-based storage of data and information. A robot is configured to perform tasks and to provide services and capabilities for the pilot and persons in the work environment to improve workplace efficiency and productivity.

A robot 10 can be assigned other tasks of a similar type such as functioning as a messenger or reminder service for persons in a facility to complete a particular task, attend a particular meeting or event. A robot that incidentally encounters a person for whom a message is intended or beneficial may upon detection of the person, pause and interact with the person to relay the message or information and record and download or upload as is required information to be exchanged with the person in the interaction.

The pilot 14 operates the robot 10 from a pilot station 12. The pilot station 12 as described herein is not limited to any particular structure, equipment or location. The pilot station 12 is configured with a set of display monitors and speakers corresponding to an array of cameras and microphones on the robot. The pilot station 12 is also configured with an array of cameras and microphones connected to the computing device and network for recording and transmitting the visual images and sounds of the pilot 14. The pilot station 12 may have one or more other spatial detectors such as monitor detectors or camera detectors operating in a manner similar to a KINECT® device for a MICROSOFT XBOX 360®. According to an alternative embodiment, the pilot station 12 is implemented as an application running on a mobile device such as a portable computer, tablet computer, tablet phone, tablet, smartphone or other computing device. The functionality of the robot 10 when under the operation of the pilot 14 is determined in part by the capabilities of the computing device at the pilot station 12.

Figure 8:
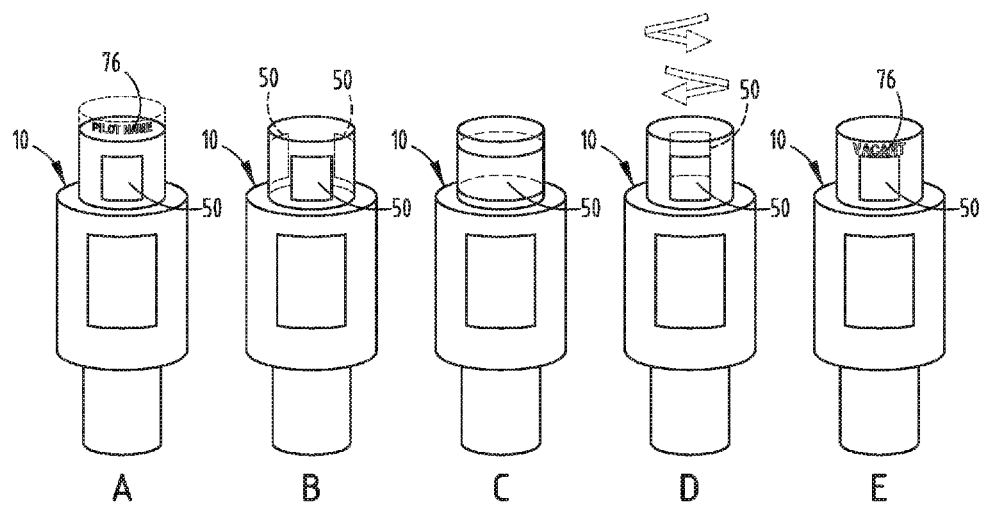
FIG. 8 is a composite schematic diagram of a robot configured in various ways to indicate the telepresence of a pilot by visual representation or display of the pilot or to indicate the absence of a pilot by visual notification or display.

As shown in FIG. 8, a pilot 14 in operation of a robot 10 can be represented visually on one or more display screens or panels 50 on the robot. Alternatively, the pilot 14 can be visually represented on a transparent display. To facilitate effective interactions between persons in the work environment and the pilot 14 through the robot 10, the robot can indicate the identity of the pilot. The visual indication of the pilot 14 occupying the robot 10 should be perceptible to persons in the work environment co-located with the robot within a substantially wide field of view. In particular, the visual indication of the pilot 14 should be visually perceptible within a 270 to 360 degree field of view. For example, the robot 10 shown in Position A has a flat display panel 50 for the pilot face with signage 76 that is visible from a broad range of positions. The signage 76 can be physical or holographic. A set of multiple flat display panels 50 (Position B) or a cylindrical or curved display screen 50 (Position C) can give visibility of the pilot 14 or robotic face 48 display to a broader range of viewing. Alternatively, a rotating flat panel display 50 (Position D) can be used to sweep in one direction or the other for similar visibility. Visual representation of an "unoccupied" state when the robot 10 is not under the operation of a pilot can be presented by a robot in a variety of different forms, such as shown in Position E, for example.

At the user interface within the pilot station, video cameras may obtain images of the pilot which correspond to the display screens 50 presented on the robot 10. However, the pilot 14 can control the number and vantage point of the video cameras in the pilot station 12. The number of cameras used at the pilot station may correspond to the number of display screens presented on the robot so that the field of view of the pilot 14 (e.g. viewed in real time) is transmitted to the robot in the work environment in a corresponding manner. The pilot can be displayed as a combination of real time video transmission and photographic images or other stored display data. The robot is able to readily display the identity of the pilot when in the "occupied" state and can use a projected "robotic face" 48 as shown in FIG. 4 or project the word "vacant" or other symbol to readily indicate by display that the robot is in the "unoccupied" state.

Figure 9:
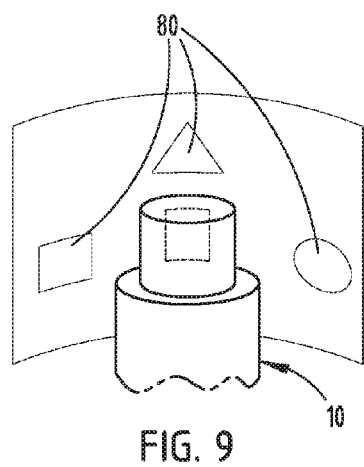
FIGS. 9 and 10 are schematic diagrams showing audio-video correspondence between a robot in a work environment and a pilot at a pilot station.
Figure 10:
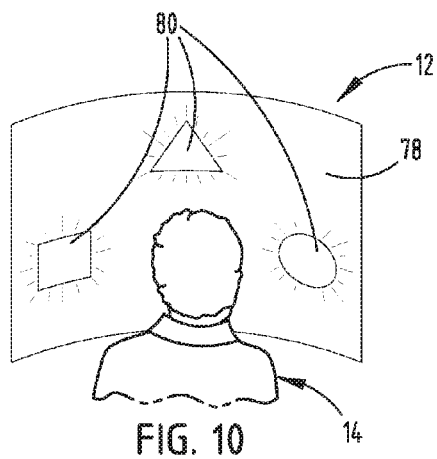
Figure 11:
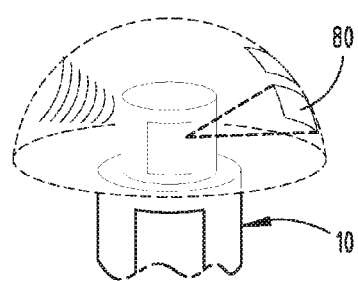
FIGS. 11 and 12 are schematic diagrams showing directional audio-video correspondence between a robot in a work environment and a pilot at a pilot station.
Figure 12:
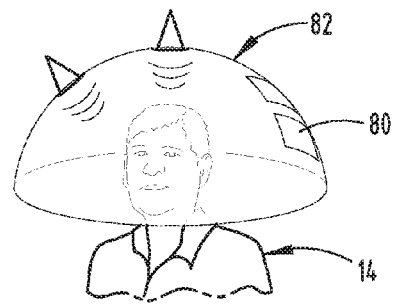

The pilot station 12 is configured to present audio-visual information generally as perceived by the robot. See, for example, FIGS. 9 (robot view) and 10 (pilot view). According to a preferred embodiment, the interaction includes a display 78 for the pilot 14 at the pilot station 12 of information 80 obtained through the robot 10 in real time in the work environment. The pilot station 12 is configured to provide augmented information in audio form as well. As shown in FIGS. 11 and 12, a pilot station may include a cockpit 82 which is configured for an "immersive" experience for the pilot 14 when combined with a robot 10 configured to provide an "immersive" experience using directional video and directional audio. The cockpit 82 conveys a life-like experience of presence in the work environment to the pilot through the robot. The cockpit need not include a physical structure and may instead include systems which provide surround sound and video surround.

The pilot station may include multiple display monitors, video screens and multiple speakers which correspond to an arrangement of video cameras and microphones on the robot such that the pilot perceives co-location with the robot transmitting the audio-visual information to the pilot station. As the robot 10 interacts with persons, the pilot is able to look around in a wide field of view and to perceive sounds in a wide range, approaching 360 degree scope. The communication in the pilot station provides an indication of direction from the robot in the work environment. The display and speakers in the cockpit are generally representative of the configuration of cameras, microphones and other sensors and detectors of the robot.

The robotic telepresence system is configured to transmit audio-visual data that can be presented on the robot to other devices and systems in the work environment, such as video conferencing equipment, display screens, computers, computing devices, tablets, and smart phones. In this manner, telepresence of the pilot in the work environment may continue to some extent in a manner similar to a conventional video and/or audio conference call even if the robot is disabled or redeployed for other use in the work environment and no longer can be used by the pilot.

Figure 13:
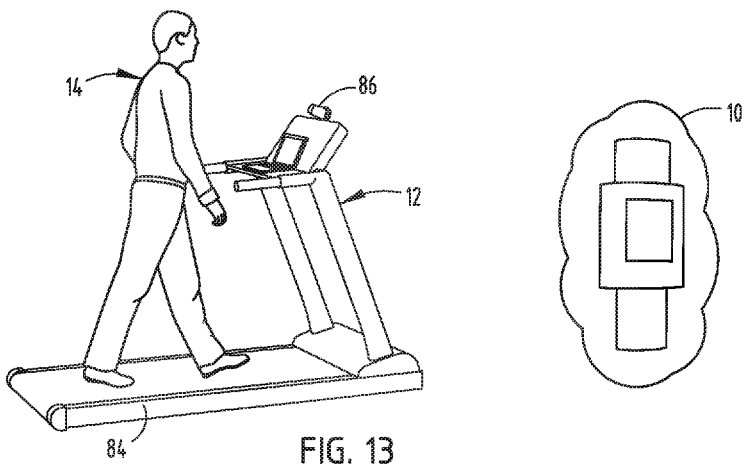
FIGS. 13-17 are schematic diagrams showing correspondence between operation of a robot in a work environment and actions of a pilot at a pilot station.
Figure 14:
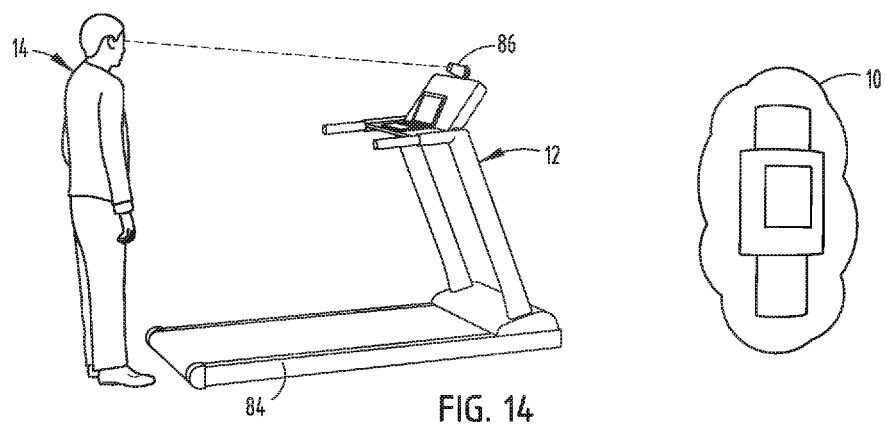
Figure 15:
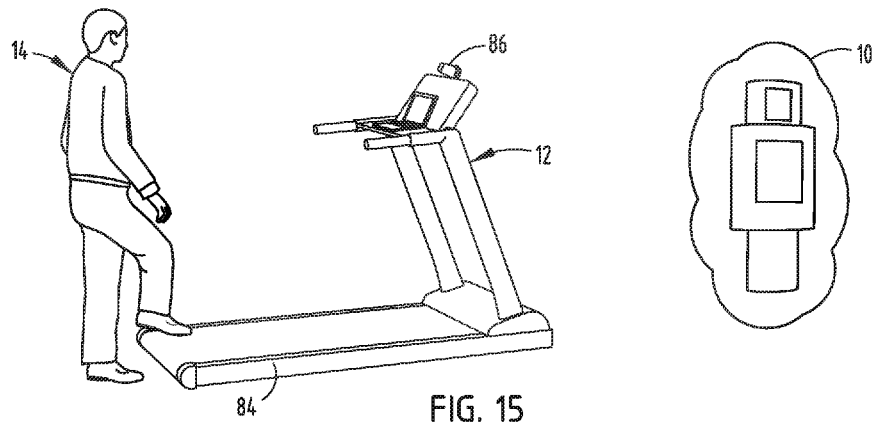
Figure 16:
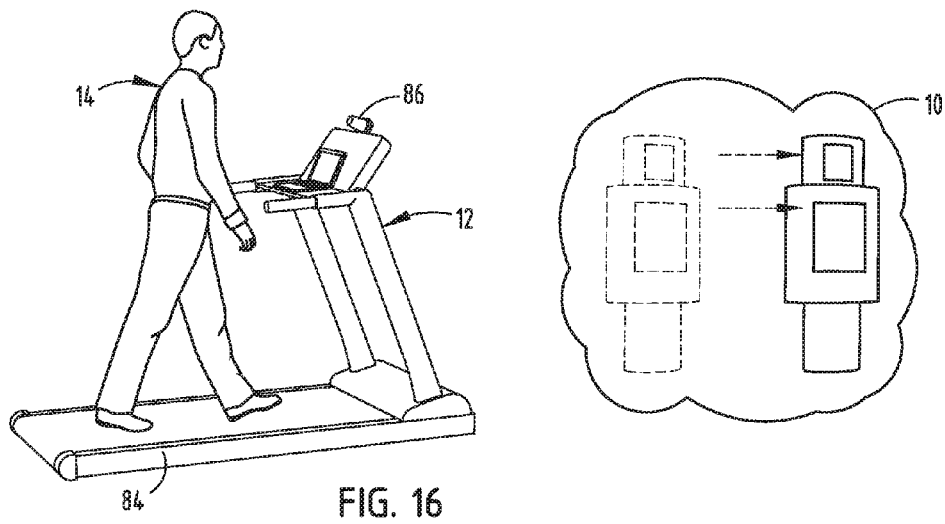
Figure 17:
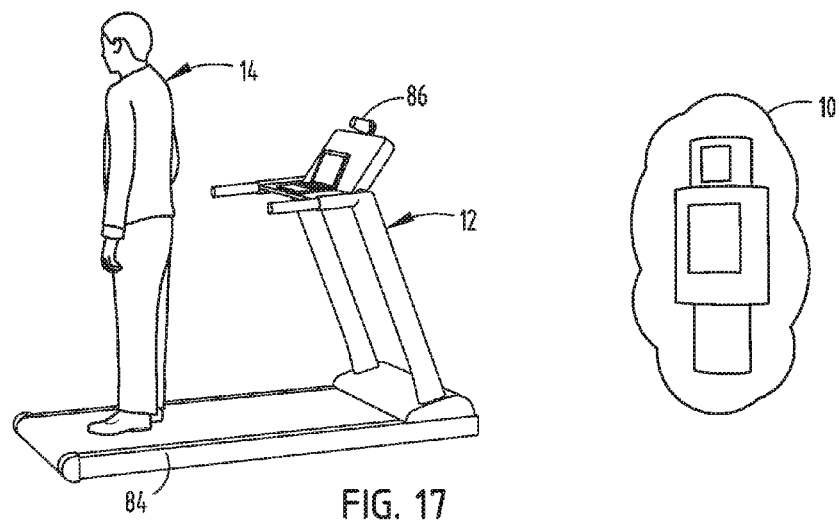

Referring to FIG. 13, the pilot station 12 may also have one or more devices operating as a remote controller for the robot. Suitable remote controller devices include, but are not limited to, a joystick, a multi-function console controller similar to those used for conventional gaming or for robot control, an actuator, and a treadmill-operated controller 84. In an exemplary embodiment, the remote controller device includes a treadmill-operated controller 84 where the faster the pilot 14 walks, the faster the robot 10 moves. Suitable treadmills include the WALKSTATION™ sold by Steelcase Inc. or an omnidirectional treadmill.

When the robot is occupied by the pilot, the robot can express and mimic emotions, gestures and movements of the pilot as detected at the pilot station. The robot may use the actual voice of the pilot, project the real-time image of the pilot on a display monitor, track physical movements of the pilot, and exhibit gestures and facial expressions of the pilot. The physical form of the robot, with a torso portion having arms and a head portion having a face can be configured with the capability to move and express a set of gestures and actions as modeled by the pilot in real time. A robot having a more human-like form is able to express human-like gestures, such as nodding head portion, shaking torso portion, shrugging shoulders, turned up palms, and pointing fingers, which can be utilized to generate accepted physical cues to improve communication and thereby enhance the quality and comfort of interactions between persons and the robot. The robot may have a set of behaviors which conform to local customs, culture or practices and are tuned to social reference data for the particular environment.

For example, as illustrated in FIGS. 13-17, the robot 10 may express a set of movements, gestures, and expressions based on the movements, gestures and expressions of the pilot 14 at the pilot station 12. The pilot's movement, gestures and expressions are correlated generally, if not correlated exactly. For example, under the direction of a pilot 14 at a pilot station 12 including a treadmill-operated controller 84 and a camera 86 or detector (see FIG. 13), a robot 10 in a work environment is in one of multiple corresponding states as the pilot directs: when the pilot is not operating the robot, the robot is dormant (see FIG. 14); when the pilot takes operation and occupancy of the robot, the robot activates (see FIG. 15); as the pilot walks on the treadmill 84, the robot navigates around the work environment (see FIG. 16); and as the pilot turns to one side, the robot turns to one side (see FIG. 17). The robot will exhibit human-like behaviors on behalf of the pilot that enhance the sense of "presence" of the pilot in the work environment.

The robot can also be configured to present non-verbal communications to persons in the work environment. In particular, the robot is configured to demonstrate facial expressions of a pilot. The robot may have a "face" that can display facial expressions, such as a smile, frown and scowl. Alternatively, the robot may have a video monitor that displays in real time the face 54 of a pilot 14 when occupied (see FIG. 6) or if not occupied, a "generic" face, such as a robotic face 48 (see FIG. 4), intended to indicate the absence of a pilot.

Interactions between a pilot via the robot and persons in a work environment are either: (1) scheduled and formal; (2) incidental and informal; or (3) serendipitous, such as an informal contact made through a formal meeting. Interactions typically involve the interchange of information between the pilot and the work environment. The capability of the pilot to interact with persons through the robot is determined by the capabilities made available to the pilot at the station and user interface. Interactions involve the exchange of information between the pilot and robot and possibly from other sources, such as network-connected devices and storage. The robot is configured to transmit and receive a wide variety of types of information for interactions. At the robot, information is transmitted by audio signal, video display, audio-video message, physical movement, gestures expressed by a robot arm or torso, facial expression such as expressed by a face on the robot or an actual face or representative image display on a monitor, indicator light, display panel, text indication, and printed or projected document. At the robot, information is received by audio signal, video display, audio-video message, text, device input/output, work environment input/output, printed or projected document, scanned document or image, and interpretation of expression or gesture.

A robot or fleet of robots at a work environment preferably is managed by a robot scheduling system. The robot scheduling system may operate in conjunction with and in a manner generally similar to the commercial ROOMWIZARD® systems sold by Steelcase Inc. Preferably, the robotic telepresence system can be integrated with room scheduling systems and can present and provide a similar user interface for persons and prospective pilots or occupants of the robot. The robot scheduling system allows scheduling robots in a fleet for use and operation in a manner that facilitates efficient resource planning and use. For example, only certain categories and classes of persons are given permission to access the scheduling system and the robot over a network from a remote workspace to schedule use of the robot. A display panel on the robot facilitates the exchange of status, use, scheduling or other related information to persons in the work environment as part of the network-based scheduling system. Information made available to persons, in real time or on request, can facilitate the management, use and deployment of robots within the work environment. For example, a display panel on the robot may indicate the daily schedule for the robot. This allows persons in a meeting where the robot is currently present to access the schedules of meeting participants. According to a particularly preferred embodiment of integrated room and robot scheduling systems, a person or pilot is able to use the integrated systems to schedule both a meeting room and robot according to needs for meetings and events.

An augmented data channel may provide enhanced information relating to various subjects for the pilot and other persons having access to the data channel. The user interface for the pilot at the pilot station provides or makes available additional information from the augmented data channel to facilitate the use and function of the robot. The user interface also enhances the ability of the pilot to participate and interact through the robot in the work environment. Information on the augmented digital channel can be regularly and routinely updated automatically and manually and supplemented as needed both for pilots and persons in the work environment. Such information can be stored and shared though a database accessible over the network.

The augmented data channel includes a database which is accessible to the pilot, pilot station and the robot over the network. The data channel may also be available to persons who interact with the robot in the work environment through a video display on the robot or over a network. The data channel facilitates uploading, downloading and supplementation of data to and from the pilot during an interaction of the robot in the work environment. Information on the data channel may include; (1) information about the work environment, such as maps, office locations, directories and staffing; (2) people in the work environment, such as names, spelling and pronunciation, reporting structure, projects, support, and social media; (3) topical information, such as access to research databases; (4) project-based information which is stored and accessible to the network; (5) meeting or event information; and (6) other types of information. A pilot may in advance of a meeting or other interaction obtain and locate information and keep or store the information for use in an anticipated interaction through the robot. The data channel may include information autonomously obtained on behalf of the pilot in advance of an interaction to facilitate an anticipated interaction of the pilot through the robot. The display of information from the augmented data channel available at the pilot station is shown in the form of text or other content appearing on a video display along with an associated person or object. The pilot station is configured to display information from the augmented data channel as an overlay to other displayed information at the station obtained from the robot. See, for example, FIGS. 9 (robot view) and 10 (augmented pilot view).

Operation of the robot 10 by a pilot 14 includes the robot taking on or adopting the "persona" of the pilot by virtue of data and information provided or uploaded to the robot from the network database. The robot is able to express the identity of the pilot and to assume a persona which is representative of the pilot and perceptible to persons in the work environment. The ability of the robot to conduct interactions is partly enabled by preferences and privileges of the pilot that the robot shares with the pilot. The network connects to a database where preferences and privileges of the pilot are stored and can be accessed for downloading to the robot. The privileges include a set of permissions allowing access to space and information in the work environment, the system shares the permissions of the pilot so that the robot can access spaces in the work environment as a representative of the pilot when under the control of the pilot.

Each person who may function as a pilot stores data which can be accessed and used by the robot when occupied by the person as pilot; the robot operates accordingly and differently for each pilot, depending upon the preferences of settings established by the pilot. The robot may also display a different appearance and use different sounds or voice depending upon the pilot. The robot is able to express the identity of the pilot and to assume a persona which is representative of the pilot and perceptible to persons in the work environment.

The robot is configured to present a first set of behaviors when under the control of a first pilot, a second set of behaviors when not occupied by a pilot, and a third set of behaviors when under the control of another pilot. The first and third set of behaviors would be communicated through the occupied robot during interactions in the work environment by the respective pilot. The exhibited behaviors of an occupied robot may include a display of a real-time video transmission from a video camera in the pilot station; audio communications in real-time is transmitted to and through the robot from the pilot. A video transmission would be able to convey facial expressions and to some extent other physical movement and gestures by video display at the robot. The behaviors would be under the control of the pilots and generally constrained by physical limitations of the robot and the controller used by the pilot at the station, such as sensors, detectors, joystick, multi-controller, treadmill and the like. Network connectivity may also reduce response time between the pilot and robot to some extent. The second set of behaviors includes a physical indication that the robot is not occupied by a pilot. The physical indication may include a signal, sign, or a reduced set of gestures including limited motions, limited range of motions, and speed of motion understood to indicate that the robot is operating autonomously and not presently occupied by a pilot. The robot is thus configured to interact productively through a combination of audio and visual communications within the work environment regardless of whether under the control of a pilot.

According to a particularly preferred embodiment, the pilot station is able to detect when a pilot in operation of a robot has temporarily moved away from the station while in operational control of the robot. Detection is made by a video camera or motion detector, an infrared sensor, or some other type of sensor or detector. When the user interface detects that the pilot is present at the station, the robot maintains an active state of operation in the work environment; when the user interface at the station detects that the pilot is not present at the station the robot is put in a suspended state of operation at the work environment. The suspended state of operation may include indicators presented at the robot, for example, a message is transmitted by the robot or indicator lights. Persons encountering the robot in the work environment perceive that the robot is in a suspended state but occupied by a pilot; such persons can conduct limited interactions with the robot and await the return of the pilot to the station and the robot to the active mode of operation or can leave a message with the robot. The behavior that the robot exhibits in the suspended state is autonomous but within a restricted set of behaviors for an unoccupied robot in the work environment. In a particular work environment, a particular protocol of rules and restrictions for unoccupied robot behavior is established consistent with the needs and preferences of the facility and affected persons. For example, at one work environment, the robot is configured to record audio-visual signals on behalf of the pilot when in a suspended state; at another work environment, the robot may play a recorded audio-visual message. According to an alternative embodiment, a robot is more fully disabled when in a suspended state. When the pilot is detected at the user interface in the station the robot resumes an active state.

The robot is configured for operation by two pilots in succession, passing from and operation state with a first pilot to a transition state with no pilot indicated to an operation state with a second pilot. When the first pilot in operation of the robot exits as pilot of the robot at a pilot station, the robot is in a transition state and not occupied by a pilot. The transition state is maintained by the robot for a predetermined period of time before the robot can resume an operation state for the second pilot. When in the transition state, the robot will have a restricted set of movements which are not as expansive or expressive as the movements that a pilot can express through the robot. The robot may indicate entering the transition state of the robot by a pause of movement. The transition state of the robot can be indicated in the work environment by a visual signal, an audio signal, an audio-visual signal, indicator lights, or the like so persons co-located with the robot realize that the robot is not occupied by a pilot and are not made uncomfortable. In the transition state, data can be interchanged by the robot and by the pilot at the station. The data is stored in a network-accessible database for future use. When the second pilot assumes control of the robot, the robot returns to an operation state.

A purpose of the transition state is to prepare co-located persons in the work environment for the passing of a robot from one pilot to another and to allow data interchange to and from the robot for the successive pilots. When the second pilot obtains operational control of the robot, that pilot will operate the robot according to the capabilities of the user interface at the station where that pilot is located. One pilot may have a more full-featured user interface and pilot station than another pilot and may therefore be able to utilize more robot capabilities. When in operational control of the robot, the user interface of the pilot, such as the input/output devices, audio devices, video devices, field of vision, sensors and detectors, dictates the manner in which the pilot will be allowed to conduct interactions through the robot in a particular work environment.

Figure 18:
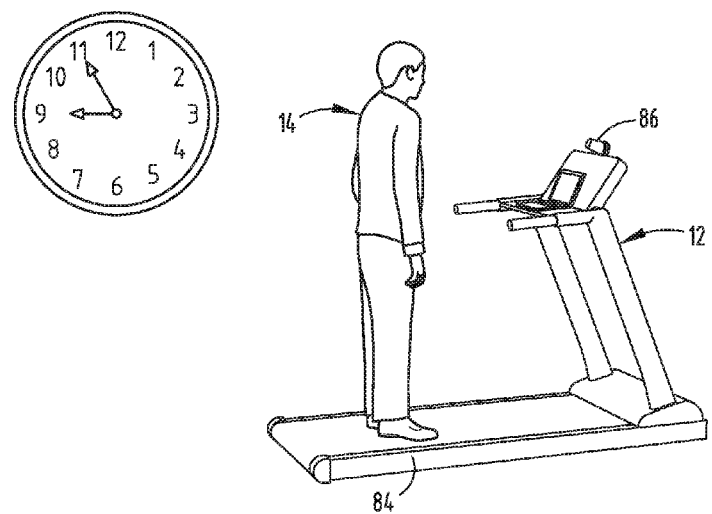
FIG. 18 is a schematic diagram showing a single pilot at a pilot station with robotic telepresence through multiple robots in operation at multiple locations.
Figure 18:
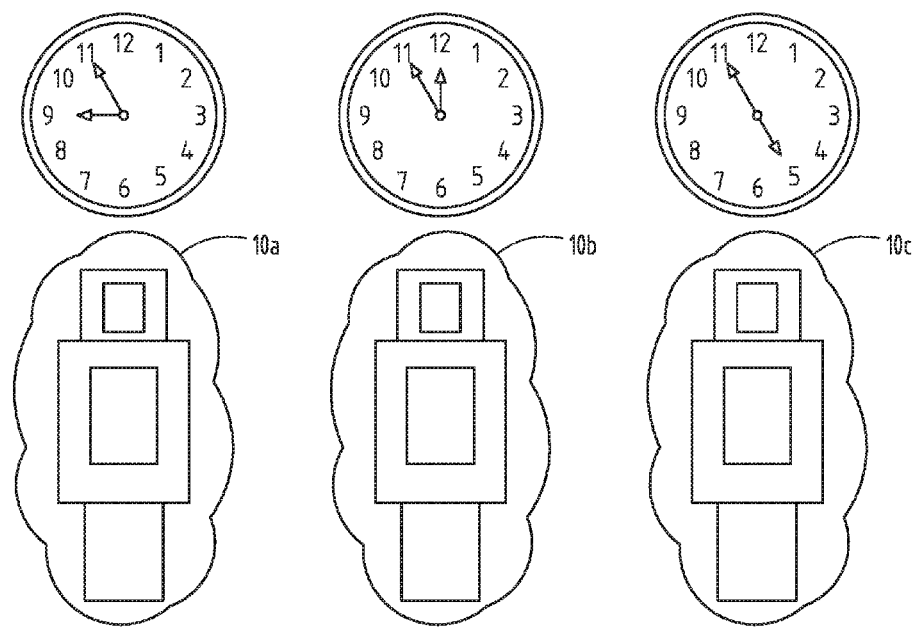

Referring to FIG. 18, according to a particularly preferred embodiment, one pilot 14 can occupy and operate multiple robots 10a, 10b and 10c. For example, a pilot may want to simultaneously provide a single presentation through multiple robots to audiences at multiple locations. The pilot may control the audio-video communications through the robots while a local pilot is available to coordinate local operation of the robot at each work environment.

Figure 19:
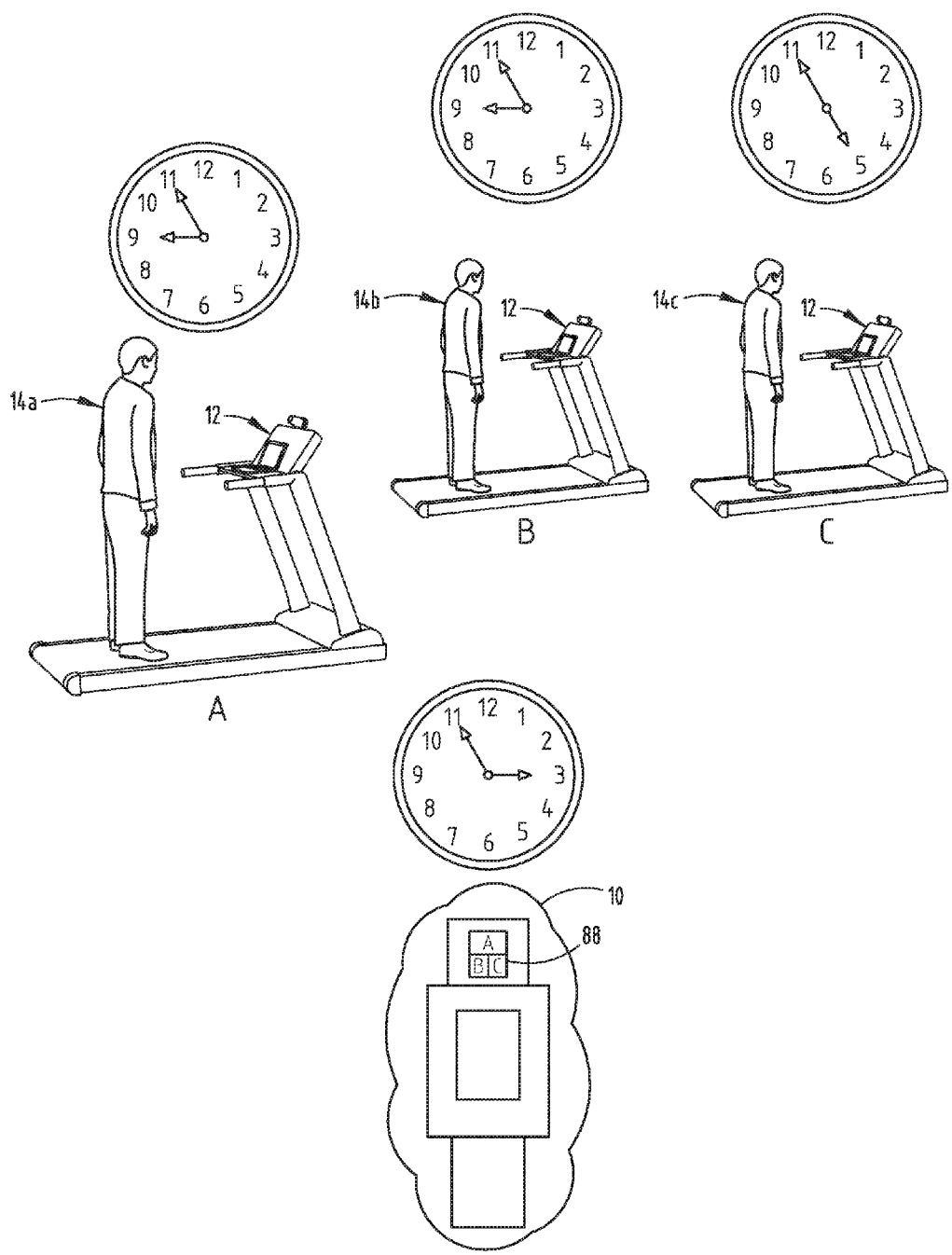
FIG. 19 is a schematic diagram showing multiple pilots at pilot stations with robotic telepresence through a single robot in operation at a single location.

Referring to FIG. 19, multiple pilots 14a, 14b and 14c at one or more locations A, B and C may simultaneously occupy one robot 10. One or more of the pilots may have a different user interface at their pilot station and therefore possess different capabilities to manage and control interactions. Some of the pilots may have minor operational control of the robot while one of the pilots has full control of the robot. One pilot may communicate audio-visual information freely while the remaining pilots are restricted or muted and require permission from the lead pilot to contribute. The robot may display in a multi-segment display 88 each pilot, which may reflect a varied size display area to indicate who is primarily in control of the robot and who has a more limited role. According to any preferred embodiment, the robotic telepresence system can be configured as needed to facilitate a multi-robot/single pilot interaction as illustrated in FIG. 18 or a multi-pilot/single robot interaction as illustrated in FIG. 19 in the work environment.

Figure 20:
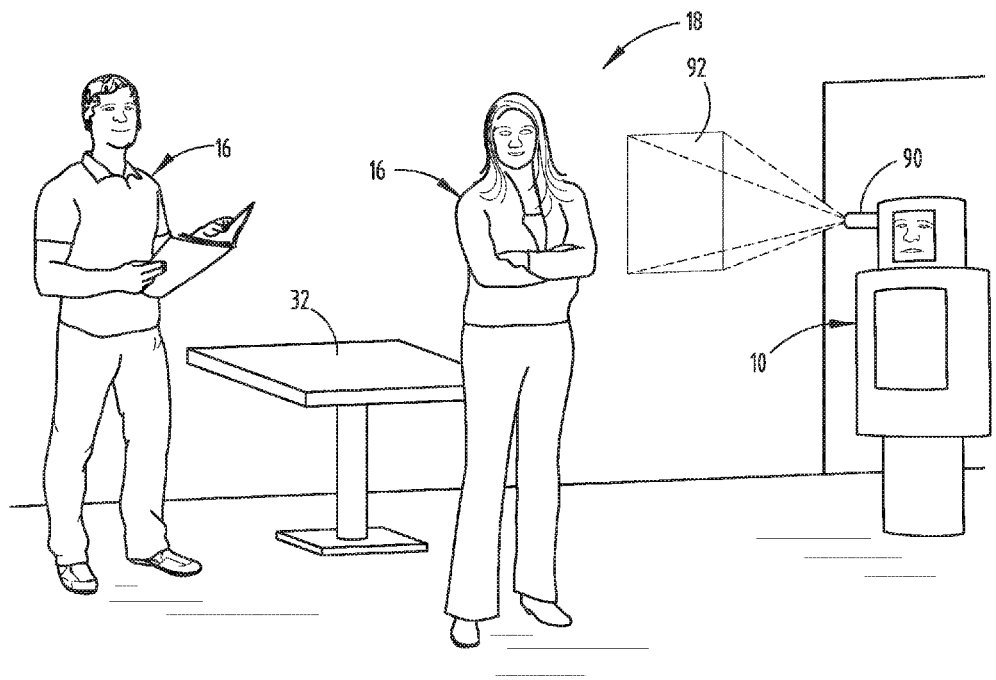
FIG. 20 is a schematic diagram of robot in operation in task of using projection system for information in a work environment.
Figure 20:
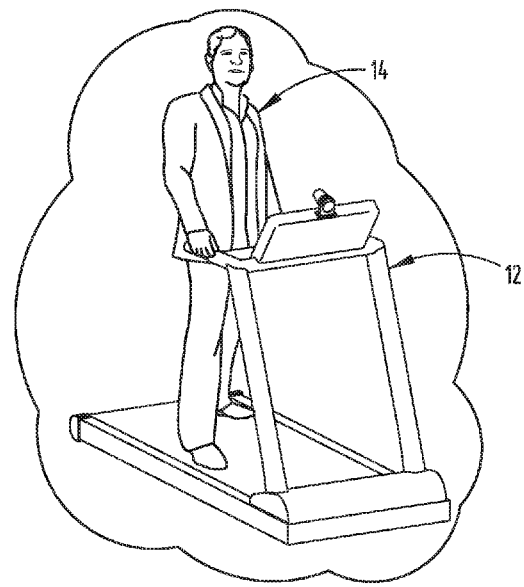

The robot can be provided with peripheral devices which enhance the capabilities and usefulness of the robot 10 in the work environment, including capabilities relating to the exchange of information. Referring to FIG. 20, the robot is provided with a projector 90 for displaying data or information on a large- or small-scale. The robot is capable of both multi-person and individual person interactions where the display by projection of information on a surface 92 would facilitate or enhance the interaction. A robot 10 may include a wireless hub to allow it to transmit and receive as a node or access point. The wireless hub provides wireless access to one or more networks by and on behalf of persons in the proximity of the robot.

The robot is provided with enhanced capabilities to facilitate productivity in the work environment. Enhanced device capability such as holographic projection and augmented data can be implemented in particular robots given higher-level duties within the work environment and deployed on a more selective basis according to special needs and capabilities for meetings and events. Higher capability robots may be given different physical attributes to indicate their differential status within the work environment.

Figure 21:
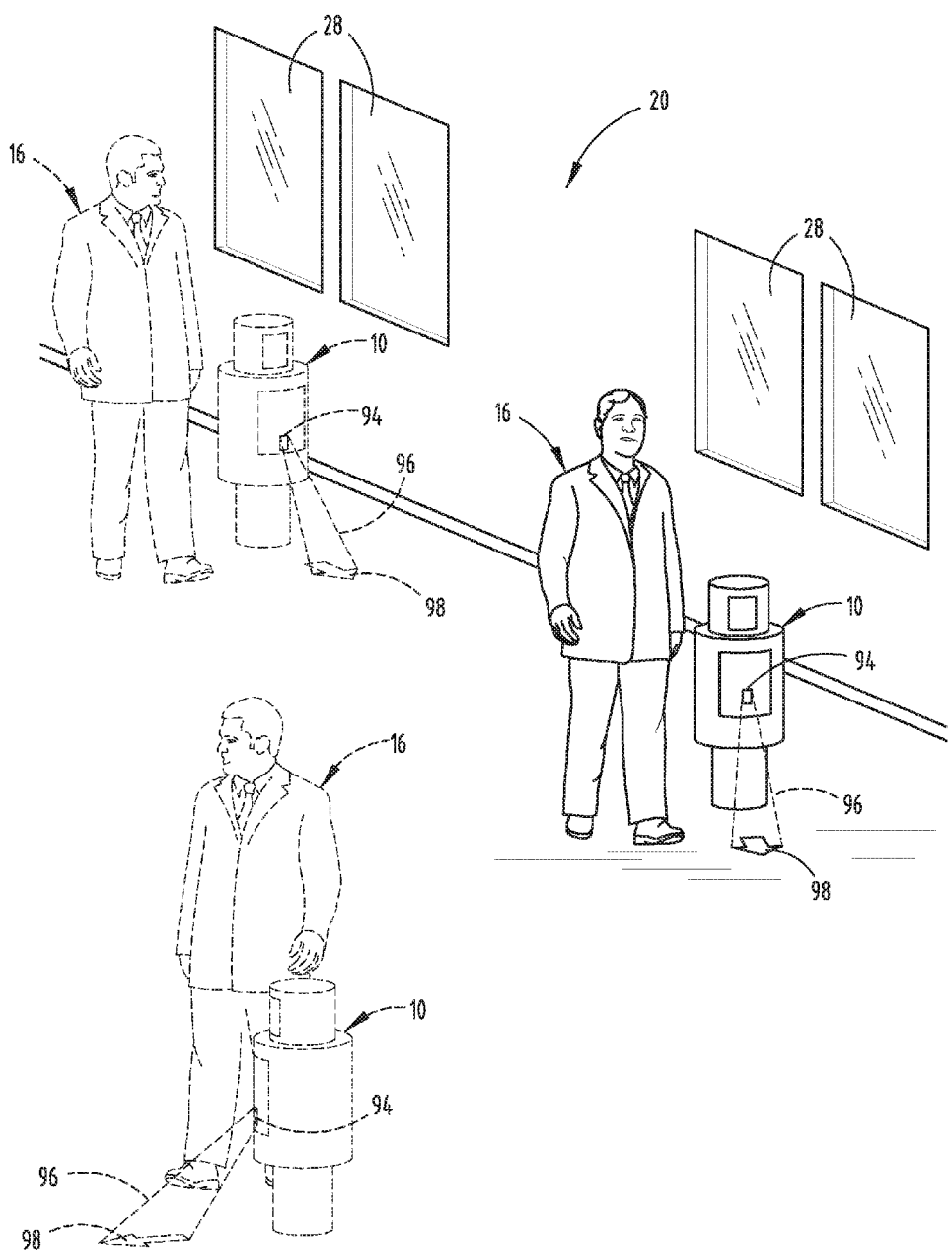
FIG. 21 is a schematic diagram of a robot in navigation through a work environment.

As shown in FIG. 21, the robot may include indicators that serve functional purposes according to a protocol established for the work environment. Such indicators may include indicator lights, speakers, projecting displays or light beams. For example, a robot may have a lamp 94 that projects a light beam 96 on the floor to display a navigational icon 98 to indicate navigational intent to nearby persons 16 and robots 10 as the robot passes through the work environment. Navigational intent may also be communicated by an audio signal that the robot projects to persons in passing. For robots having moveable elements, navigational intent may be indicated by physical indication including, but not limited to, pointing, leaning and turning.

The robotic telepresence system also provides capabilities for performing additional functions through the robot to enhance a meeting and related activity after the meeting. For example, the robot is equipped with a session capture capability so that the audio and video information during the meeting can be recorded by the robot. The robot may provide a data display capability either on a control panel or video display or by projection onto a surface to present data and information or audio-visual content to persons in the meeting either at the direction of the pilot or at the request or direction of persons in the meeting. The robot may operate as a network access point or a convenient means for data transmission that can be used by persons in the meeting room. The robot may through an augmented data channel allow the pilot or meeting participants access to additional information relevant to topics relating to the meeting or the like. At the end of the meeting the robot may perform "clean up" tasks for persons in the meeting by scanning or taking photographs of meeting notes or whiteboard drawings or other articles and objects used during the meeting. Persons in the room or the pilot may alert the robot to the physical location of the meeting notes, whiteboard drawings, or other articles and objects. Alternatively, the physical location may be identified by a barcode, RFID or other electronic trigger affixed to or embedded in equipment or fixtures in the work environment. Data and information recorded by the robot during the meeting is saved and stored as a data file or in a network-stored folder which can be accessed and used by others after the meeting. The robot may also compile a list of tasks or actions assigned to persons during the meeting and may transmit follow-up reminders or the like to the persons who after attending the meeting have further tasks or obligations on behalf of the meeting group. The robot will not only allow the pilot to participate fully in the meeting but will also provide additional functionality of benefit to the pilot and other meeting participants.

Certain robots can be designated for primary use in certain areas of the facility to maintain a balance of the fleet of robots across the entire facility. Special capability robots may also be designated for use and proper utilization. For example, robots with such capabilities as video projection, document printing, audio-visual recording, enhanced audio-visual display and augmented data channel can be designated and deployed efficiently within the fleet to ensure proper utilization of robots matching their capabilities to the needs for a particular meeting, event or purpose. The robotic telepresence system may also provide scheduled time or routines for transitions and data upload/download for pilots between occupancy. Unoccupied robot observers are deployed in the work environment for special purposes such as recording audio-visual information for meetings and special events, inventorying equipment in the work environment and identifying any associated structural or performance issues using RFID technology, and communicating with work environment technology such as motion detectors to collect information and perform diagnostics. Unoccupied robot observers can also be used to process cued serendipitous requests. For example, a first employee, Person A, may need to contact a second employee, Person B. Person A issues a request for all unoccupied robots to search for Person B. When a robot locates Person B, the robot notifies Person A and initiates contact between Person A and B. The cued serendipitous request is then cancelled.

The work environment can be adapted for the presence of robots. For example, workspaces, offices, meeting rooms, hallways, common areas and entryways can be adapted to facilitate interactions and movement of robots in the work environment with efficiency and minimal disruption of persons in the work environment. Dedicated pathways for robots can be designated and demarcated. Pathway demarcation may be accomplished using lines or other markings such as radio frequency or infrared "invisible fence" technology in hallways. Rest areas can be established for robots at various places within the work environment. Buffer zones or no-entry zones for robots can also be established. Charging stations can be provided in designated locations within the work environment. Furniture and work stations can also be adapted for the presence of robots. Hallways and rooms can be provided with projection surfaces to allow robot interactions at various points between and in stations and spaces in the work environment. Room entry, security keypads, access panels and door hardware can be modified for ease of entry and accessibility to robots. To facilitate robot mobility, hallways and other pathways can be provided with ramps rather than stairs or steps. The work environment may also include utility or service entryways and passages or special elevators for robots. In meeting rooms and at conference tables and other office furniture, designated seating or docking and potentially charging areas for robots can be installed. To facilitate management of a fleet of robots, racks or a storage and maintenance area out of the way of persons in the workspace can be established in the work environment.

Referring to FIG. 2, access to a meeting room 18 is gained by a conventional employee access badge system. The meeting room 18 has a scheduling system indicated by a display panel 26, such as used by the known ROOMWIZ-ARD® system commercially available from Steelcase Inc. Restricted access in the work environment, for example, into the meeting room 18, can be established using conventional technology such as "invisible fencing," as shown at the floor in dashed lines 100. According to an exemplary embodiment, the range of access or movement of the robot in the work environment can be controlled using conventional security or access restriction technology. The robot 10 approaches a secured area in the work environment, such as a meeting room 18, and if the robot encounters an electronic barrier or other type of indicator of restricted access, such as a light beam or electrical signal, the robot stops moving and will not enter the space. The restricted access indicators can be configured so that they are detectable primarily only by robots and do not provide any encumbrance to people in the work environment. If the robot is authorized for access into a restricted area, the robot is able to move across the barrier into the space or room and conduct its business.

Preferably, a protocol for robot conduct and right of way in passing other robots and persons in the work environment is established. Personnel in the work environment are trained on best practices for interacting with robots. Personnel may also be trained on procedures for diagnosing problems or performing maintenance on robots. For example, personnel can be trained on how to assist a robot in need of a battery charge, to turn on or off a disabled robot, to locate a robot, and to interact with a robot to determine its destination or current status.

Robots are deployed into service with a duty and maintenance cycle to ensure up-time and reduce maintenance issues for robots in service. Time of day homing instructions can be programmed into the robots as part of a protocol for robot management which is communicated to persons in the work environment. Multi-purpose robots can be deployed into service in the work environment. Multi-purpose robots combine designated interactions on behalf of pilots with other tasks, such as work environment monitoring and security, equipment and facility inspections, light cleaning of floors or other surfaces, and the like. The robot and work environment can be adapted for efficient service of the robots for their designated purposes.

Example Implementation of a Robotic Telepresence System:

A typical day of use of a robot used in the robotic telepresence system can be described to illustrate by example the operation and capabilities of the system. As noted earlier, the robotic telepresence system allows the pilot to participate through a representative robot in an interaction such as a conventional workplace meeting. The robot interacts on behalf of the person in a manner representative of the person as if the person was in attendance at the meeting. The pilot uses the robot to interact and perform general functions with persons directly attending the meeting. In this example implementation, the robot operates in a work environment located in a large office building complex having multiple floors and hundreds of employees.

The robot begins its day in a charging station in a fleet management area of the work environment.

Through a robot scheduling system a person intending to be a pilot is able to review available robots in the fleet and select one robot for use according to availability and capability for the tasks and activities intended on behalf of the pilot in the work environment. The fleet includes over fifty total robots. The majority of the robots have a generally identical base configuration; however, some of the robots have differing capabilities due to differences in their physical form and their installed peripheral devices. A first pilot has selected and scheduled the robot to participate in a full morning meeting as representative of that pilot. A second pilot has scheduled the robot to participate in an early afternoon meeting as representative of that pilot. Two other pilots have jointly scheduled to have the robot present a training session to a group in the late afternoon. Each pilot is located at a station at a remote location from the work environment. The pilot stations each include a user interface through which the pilot can operate and control the robot and can receive audio-visual information and other data from the robot during operation.

The pilot stations used by the four pilots have differing capabilities which alter the capabilities and interactions of the pilot through the robot in the work environment. Each station includes at least a computing device with video conferencing equipment and a controller.

A pilot may perform certain technical checks in anticipation of the meeting and may also upload data to the robot intended for use at the meeting. A few minutes before the meeting begins, the first pilot takes over operation of the robot and becomes the occupant of the robot. When the pilot occupies the robot, data and information relating to the pilot is transmitted from a database over the network to the robot. The robot assumes the identity of the pilot insofar as the robot will communicate in a voice that mimics the voice of the pilot and will assume a height which generally matches the pilot. The robot also obtains privileges and preferences that are associated with the pilot, including access rights to secure areas of the work environment. The integrated access device on a hand of the robot is programmed to match the access badge of the pilot.

The display monitors on the robot display a selectable combination of real-time video of the pilot as in a video conference on a front screen and photographs of the pilot from other vantage points on the other display screens. The content set of the display screens can be adjusted depending upon the number of cameras in the station where the pilot is located.

The robot begins its travel from the fleet management area to the first floor meeting room to attend the morning meeting. The pilot could manually navigate the robot to the meeting. However, the first pilot directs the robot to navigate itself to the meeting room autonomously while the pilot prepares for the meeting. The robot enters a "dumbwaiter" elevator that is configured for robot-only use. However, the robot could also have used a conventional passenger elevator. In the elevator, the robot joins other robots which are also beginning their day in the work environment. Sensors on the robots prevent the robots from colliding in the elevator. At the required floor, the robot exits the elevator and begins to move to the meeting room.

On the way to the meeting, the robot through its video camera perceives a co-worker of the first pilot located at the work environment. The robot identifies the co-worker as someone with whom the pilot has an open task related to a shared project to address. Using the augmented data channel, a message appears for the first pilot at the user interface. The message informs the pilot that a co-worker with an open shared task is in the proximity of the robot. The robot provides augmented information relating to the open shared task to the pilot, who takes over command and uses the robot for an interaction with the co-worker. The robot uses a speaker to call out the co-worker's name while moving to a distance within five feet of the co-worker. In the first pilot's voice, the robot expresses a greeting and asks the co-worker if the co-worker has time for a short interaction. The nature of the desired interaction for the shared project is that the pilot needs to obtain a written approval from the co-worker. The co-worker agrees to the interaction and the robot first projects the document onto a wall in the work environment hallway so that the co-worker can conduct a preliminary review. When the co-worker indicates that she can sign the document, the robot prints the document using its onboard printer or creates a PDF document. The co-worker reviews and physically signs the printed document or electronically signs the PDF document. If the co-worker has chosen to sign a physical copy, the co-worker then provides the signed document to the robot through an onboard scanner. The onboard scanner scans and then stores the document both in electronic form and in paper form onboard the robot. The pilot prints a signed copy of the document for the co-worker and thanks the co-worker for the cooperation and then navigates the robot to the meeting room.

Information available on the augmented data channel may include data on navigation and direction and pathways in a work environment; data on events and calendaring for the facility; maps, floor plans, passages and available rooms and offices in the workspace; and equipment availability and locations in the work environment. Available information may also include names of visitors present in the facility on a particular day; locations and offices of particular people in the work environment; proper names including spelling, titles and reporting structure for people in the work environment; employee work history and other background information; social media connections and other data made available on the data channel to facilitate interpersonal interactions including by and through robots with pilots; topical databases such as WIKIPEDIA® sites and online business forums. Further, available information on the augmented data channel may include project-based information such as timelines, access to data files and directories, status, and other materials of interest on a project or matter; meeting and event-related information such as attendees, attendee availability, prior meeting history and related information.

The pilot navigates the robot to arrive at the meeting room and into a place within the meeting room. The robot arrives at the meeting room and according to a protocol enters in a manner not to disrupt or cause unintended interaction with persons attending the meeting. Upon arrival, the robot uses the augmented data channel to identify other attendees by name, title, affiliation and department. Augmented data from the database also allows the pilot to obtain information regarding locations, work history, job titles and social media information. On the display screen at the user interface of the pilot, the pilot can have augmented information for a person displayed upon request or whenever a person is in the primary field of view of the robot. The robot is "seated" at the table in the meeting room with other persons and robots. The robot reduces its height to a seated height by lowering the position of its head and torso portions relative to its base portion. The ability of the robot to express and mimic gestures and facial expressions of the pilot within a range allows the pilot to interact productively with the meeting attendees. The first pilot also has tasked the robot to record audio-visual information from the meeting. During the meeting, augmented data and information on topical issues and project-based information are made available to the pilot within the user interface of the pilot. Through its computing device, the robot can also provide a real-time transcription of the audio portion of the meeting. The transcription is made available to authorized persons in the meeting room and other robot pilots over the network. Following the end of the meeting, a data file, an audio file and the audio-visual recording from the meeting are uploaded to a database on the network by the robot at the command of the pilot. The pilot is also informed of the names and attendees and contact information so that further communications relating to the meeting can be conducted as needed by the pilot. In attendance at the meeting was another robot represented by another off site pilot. The two pilots used a local wireless connection to transmit their contact information to each other.

The meeting lasted until just before the lunch hour and the first pilot navigates the robot to a common area adjacent the cafeteria to conduct an informal meeting with other persons co-located with the robot. At one point during the lunch hour, the first pilot takes a short personal break and temporarily leaves the user interface and pilot station, at which point the robot indicates by an indicator light and a display panel that the pilot is temporarily unavailable. While the first pilot is away, the robot does not conduct any affirmative interactions with persons in the workspace. However, the robot records audio-visual information during the absence of the pilot; a co-worker encounters the robot and interacts with the robot by stating a reminder that the pilot is late with the completion of a promised document. When the pilot returns to the user interface at the pilot station, the reminder is given to the pilot who then adds a note to his calendar.

The robot possesses special functions for special purpose meetings to record and transcribe meeting information. Such capability includes real-time recording and transcription of audio and video and other information which is shared with other persons participating in the meeting or event. The robot is configured to function as video-conferencing equipment, whereas another robot in the meeting is simply a representative of the pilot-participant. The robot is also configured for "clean up" of information after a meeting including recording the contents of whiteboards, erasing the whiteboards for information security purposes, scanning documents and meeting notes recorded by key people in the meeting, and distributing information packets which document meeting contents after the meeting has been completed. At the end of the day, the robot returns to the fleet management area and drops off or downloads the information collected during the day. Archival records of meetings attended by the robot or other robots in the fleet area stored on a network-connected database and made accessible through conventional file access systems for the work environment or enterprise.

The robot is also configured as a wireless network access point and provides that functionality for nearby persons during the lunch period. After the informal meeting, the first pilot exits the robot. The robot is unoccupied and in a suspended state for a period of time pending the occupancy by the second pilot. During the time the robot is unoccupied, persons will have an indication of the status of the robot as "vacant" or unoccupied and such persons may use the robot for device-like functional purposes. For example, a group of people who want to review a playback of audio-visual information from the morning meeting can use display screens and speakers on the robot for that purpose. Control of the robot functionality can be achieved locally at the robot through a control panel or keypad or by a remote device, such as a smart phone, tablet and computer. After a period of time, the robot notifies the persons that an occupant pilot will be joining in a few minutes. This notification allows the persons to conclude their use of the unoccupied robot in time to avoid a delay. The robot navigates itself to a nearby charging station before the meeting. While the robot is recharging, data from the first pilot is uploaded to shared network storage for use and access by the pilot and other persons authorized by the pilot.

The second pilot enters as occupant of the robot as scheduled shortly before the early afternoon meeting. At that time, the pilot uploads information intended for use by the pilot in subsequent interactions and meetings. The robot indicates that it is in transition and then assumes the identity of the next pilot. The pilot has an "immersive" user interface and WALKSTATION™ treadmill with detectors to record movements and gestures; the robot is able to transmit and receive enhanced information with the pilot from the station in real time. The pilot is displayed from each of four vantage points on each of the display monitors of the robot. The pilot is also able to receive directional video and directional audio signals in the cockpit of the station.

As the robot leaves the lunch room, it has display screens which project a 360 degree view of the second pilot. A person in the hallway where the robot is passing notices the robot is occupied by a pilot who the person wishes to have an interaction with regarding project status. The person calls out to the robot and second pilot occupant to ask whether the robot has time to interact. The directional audio and directional video presented at the cockpit of the pilot station allows the pilot to become aware of the person and their location relative to the robot and to control the robot to allow the interaction. The second pilot is surprised by the requested interaction with the person and expresses through the robot the emotion of surprise by facial expression.

During the impromptu meeting, the second pilot is asked a question that the pilot is unable to answer. As the pilot expresses an "I don't know" gesture with a shrug and upturned palms and accompanying open facial expression in real time, the robot mimics and displays the same gestures and facial expressions. The person in the interaction with the robot expresses a sentiment of good humor and invites the pilot to relax in response to the robot-expressed gestures of the pilot. The pilot sees the person smile through the video display from the robot camera and in reply, smiles and relaxes. The pilot then expresses the emotion of relief and happiness through the robot.

The second pilot then realizes that the impromptu interaction with the person has made him late for the scheduled meeting. The second pilot briefly expresses shock and surprise, expresses a quick parting smile through the robot, thanks the person and ends the interaction. To get to the meeting room quickly along a crowded hallway, the robot enters a designated robot lane in the intended direction. In the crowded hallway, the robot indicates navigational intent using signaling lights as well as following a path of travel for the robot designated in the hallway. Persons in the robot's path perceive a visual and audible signal from the robot and step out of the robot path. The robot is also programmed to avoid collisions and unintended contact with persons while moving along the crowded hallway.

The second pilot of the robot is on a WALKSTATION™ treadmill which is calibrated to the robot so that the robot is able to walk at the speed indicated by the person. At this point, the pilot is walking quickly because he is late for the meeting. In the pilot station, the pilot's body movements, such as turning slightly one way or the other, are perceived and mimicked by the robot. At the meeting room doorway, the robot uses the access device on its hand as a badge to activate a security panel to allow the robot to gain access to the meeting room. Meeting room access is the same as would be allowed the pilot if the pilot were physically present in the work environment.

Upon obtaining access to the meeting room, the robot navigates to a special position at the conference table. The special position allows the robot to dock and charge during the meeting and also access a direct data connection to the network. The robot is also able to connect to ancillary local devices including interactive technology devices such as Media:Scape®, available from Steelcase Inc.

With a facial expression and upturned palms, the second pilot expresses via the robot his regret at being late for the meeting. Through the robot, the pilot then participates in the meeting. After the meeting, the second pilot exits the robot which is then unoccupied and indicates a vacant or transition state. When the pilot exited the robot, the robot was still in a secured area. The robot shuts off audio and visual recording and autonomously moves itself out of the secured access area into a common hallway.

In the hallway, the robot experiences a wheel malfunction on its base portion. An indicator light on the robot begins to flash and is noted by a passing co-worker who stops for an interaction with the robot. Upon reading a signal displayed on a display panel on the robot, the co-worker attempts to diagnose and determine whether the robot can be repaired without requiring a return to the fleet management area. Noting that the robot will require a mechanical repair, the co-located worker uses the control panel on the robot to send the robot to the fleet management area for repair.

The robot had been scheduled for another meeting in the form of a training presentation later in the day. The robot scheduling system and fleet management system deploys a different robot in the fleet to serve on behalf of the two pilots in the late afternoon meeting.

The robot is unoccupied and moves autonomously through the work environment to the meeting room for the scheduled training presentation. The training presentation is to be given by three persons. Two of the persons are pilots who each co-occupy the robot from a different station at different locations. The third person is at yet another location, but will only participate by video-conferencing technology and will not be a pilot of a robot. One pilot is given precedent for physical movement of the robot and the other pilot is given a secondary status for command of the robot in the event of conflicting commands. At one point in the training session, the first pilot turns command over to the second pilot, who navigates the robot into the aisle of the training room to observe more closely those being trained. Each of the pilots is able to collaboratively present audio-visual information to the group attending the training session; the other person is able to interchange audio-visual information with the group. All of the persons giving the training are able to interact in real-time.

During the meeting, the robot takes attendance of attendees and uploads the attendance information to a database. As attendees ask questions during the training session, the pilots can use an augmented data channel facilitated by the robotic telepresence system to obtain topical information to help them answer the questions. After the questions have been answered, the pilots are able to store and upload into a data file the question and answer content recorded through the robot as part of a frequently asked question database. The training session is also recorded under the control of the robot for future reuse and rebroadcast.

At the close of the training session, each of the pilots completes their data interchange through the robot and then exits the robot. The robot has ended its workday. The fleet management system then commands the robot over the wireless network to return autonomously to the fleet management area for overnight charging and a routine inspection by fleet management staff. Each robot in the fleet is also scheduled for periodic maintenance to ensure maximum uptime for the fleet at the work environment. The robot enters the elevator and makes its way back to the fleet management area into a racking system for the overnight period; documents or materials stowed with the robot are removed and placed for proper keeping. The fleet management system makes note of robots that are damaged and unavailable for service. A repair team will fix robots that need repair. Updates and upgrades may also be implemented or installed for the robots. The robot scheduling system can conduct verifications and modifications to ensure proper deployment of the robot fleet during the next day of service.

The next morning, each available robot is ready for another day of service. Each day of operation of a robot in the robotic telepresence system may present different uses and demands.

Referring to FIG. 22, a system includes a video conferencing environment 102 which is electronically coupled over a network connection to a second video conferencing environment having a substantially similar configuration to permit transmission of images and sound between environments. Alternatively, more than two video conferencing environments can be mutually electronically coupled. Although the system is disclosed in terms of two video conferencing environments in a point to point communication, it is to be understood that the concepts and features discussed herein may also apply to more than multiple environments engaged in a multi-point conference. Each environment 102 includes a viewing device 104, a primary polarizing filter 106, a viewing area 108, at least one light source 110, and one or more secondary polarizing filters 112 between the at least one light source and the viewing device.

The viewing device 104 includes a screen 114 and a camera 116. The screen 114 is typically positioned at the front of the video conferencing environment 102, however it can be positioned anywhere in the room. The screen 114 can be fixed or movable and can be any type of screen including, but not limited to, a flat screen, a widescreen, a plasma or LCD display, a projection screen including a projector, and a television. The screen 114 may be any size or geometry and any technique known in the art for projecting an image onto the screen may be used.

The camera 116 can be fixed relative to the environment 102 or movable. When fixed, the camera 116 is typically positioned above or in close proximity to the screen 114 and positioned at a fixed angle and distance from a meeting participant in the viewing area 108 which allows acceptable levels of eye contact between the meeting participant and a remote viewer. However, the camera 116 may be positioned anywhere in the environment 10. Further, the environment may include more than one camera 116 positioned at various locations within the viewing area 108. Preferably, the camera 116 includes an electronically controlled iris lens and zoom capabilities.

The environment 102 also includes a primary polarizing filter 106 and at least one secondary polarizing filter 112. Although the primary polarizing filter 106 and secondary polarizing filter 112 are shown as vertically or horizontally polarized, these filters may have any orientation. Also, circular and elliptical polarized filters may be used. The primary polarizing filter 106 is typically adjustably attached to the camera 116. Where the environment 102 includes more than one camera 116, each camera may include a primary polarizing filter 106. As illustrated in FIG. 22, the primary polarizing filter 106 is rotatably adjustable through 90 degrees as indicated by arrow 118. The primary polarizing filter 106 can be adjusted to reduce the intensity of a light source 110 as seen by the remote viewer. The at least one secondary polarizing filter 112 is positioned between the light source 110 and the viewing device 104. One or more of the polarizing filters can be adjusted to vary the light source 110 visible to a remote viewer as seen by the camera 116. Specifically, it is contemplated that the primary polarizing filter 106, the secondary polarizing filter 112, or both filters can be rotated. At least one of the polarizing filters can be adjusted remotely.

The viewing area 108 may be an enclosed room or dedicated area such as a meeting room 18. Although FIGS. 22-33 illustrate a video conferencing environment 102 in an office setting, it is contemplated that the inventive concepts disclosed herein can also be used in other settings including but not limited to: consumer environments, education settings, medical consultation settings and generally any setting where at least one participant is remote. Typically, the viewing area 108 includes a primary seating area with one or more chairs 120 and a table 122 having a horizontal surface 124. The number of chairs 120 positioned around the table 122 depends on the size of the horizontal table surface 124, but typically more than one chair is positioned around the table. The video conferencing environment 102 may also include secondary seating (not shown) positioned at the rear of the environment behind the primary seating area to allow for additional meeting participants. The secondary seating may include, but is not limited to, chairs, a bench or a couch.

The light source 110 is remote from the viewing device 104 and may be visible or invisible to remote participants in a video conferencing system. Visible light sources 110 include natural light, glare, reflected light, and electrically generated light including, but not limited to, a light bulb or a display screen. Light sources not visible to the human eye include far-infrared, mid-infrared and near-infrared radiation. An example of a suitable infrared lighting system used in a video conferencing environment 102 is disclosed in U.S. Pat. No. 7,893,953 (Ser. No. 11/424,967), entitled "Video Conferencing Lighting System," the disclosure of which is herein incorporated by reference in its entirety. The light source 110 may be located anywhere in the video conferencing environment 102.

As illustrated in FIGS. 22 and 22A-D, the light source 110 can be light energy radiating through a window 126 from natural outside exposure. In this embodiment, the secondary polarizing filter 112 is adjacent to the window 126. The secondary polarizing filter 112 may be a thin film such as, but not limited to, a sheet of polarizing laminated film adhered to an inside surface of the window 126. Referring to FIG. 22A, when the relative angle between the molecular orientation of the primary polarizing filter 106 and the secondary polarizing filter 112 is zero, maximum transmission of the outside light energy radiates through the window 126. The light coming through the window can interfere with the auto iris lens of the camera resulting in participants appearing washed out or overly dark. Likewise, buildings, trees, passing motorists visible through the window can be distracting to remote participants. Now referring to FIGS. 22B and 22C, as the primary polarizing filter 106 is rotated from a relative angle of 0 degrees towards 90 degrees, glare caused by light radiating through window 126 and the visibility of outside objects are decreased. As illustrated in FIG. 22D, when the relative angle is 90 degrees, minimum transmission of the light energy occurs, the window 126 appears opaque and outside objects are no longer visible to the remote viewer.

FIG. 23 illustrates an alternative embodiment of the video conference environment 102 where the light source 110 is a light bulb. A secondary polarizing filter 112 includes a polarizing glaze or material positioned proximate to or around the light bulb. Referring to FIG. 23A, when the relative angle between the molecular orientation of the primary polarizing filter 106 and the secondary polarizing filter 112 is zero, maximum transmission of the light energy from the light bulb radiates through the polarizing material proximate to or surrounding the bulb. When the primary polarizing filter 106 is rotated from a relative angle of 0 degrees towards 90 degrees, the light intensity emanating from the bulb decreases. As illustrated in FIG. 23B, when the relative angle is 90 degrees, minimum transmission of the light energy occurs and light can no longer be seen by the remote viewer.

FIG. 24 illustrates yet another alternative embodiment of the video conference environment 102. In this embodiment, the light source 110 is glare from natural or electrically generated light reflecting off a horizontal surface, such as the horizontal surface 124 of a table 112 in the viewing area 104. Glare is especially problematic when the horizontal surface 124 is white or very light colored. The secondary polarizing filter 112 can include, but is not limited to; a polarized film adhered to the horizontal surface 124, variable texture on the horizontal surface, and polarized surface materials such as carbon filter and mica.

Referring to FIG. 24A, when the relative angle between the molecular orientation of the primary polarizing filter 106 and the secondary polarizing filter 112 is zero, maximum transmission of the glare or reflection off the horizontal surface 124 occurs. When the primary polarizing filter 106 is rotated towards 90 degrees, the glare or reflected light decreases. As illustrated in FIG. 24B, when the relative angle is 90 degrees, minimum transmission of the light energy occurs and the horizontal surface appears darkened.

The light source 110 can also be glare from natural or electrically generated light reflecting off a vertical surface 128, such as illustrated in FIG. 25. The vertical surface 128 can include, but is not limited to, a white or very light colored wall or display and a white board. Similarly to a horizontal surface, the secondary polarizing filter 112 can include polarized film, variable texture on the vertical surface 128, and polarized surface materials such as carbon filter and mica.

Referring to FIG. 25A, when the relative angle between the molecular orientation of the primary polarizing filter 106 and the secondary polarizing filter 112 is zero, there is maximum transmission of the glare or reflection off the vertical surface 128. When the primary polarizing filter 106 is rotated towards 90 degrees, the glare or reflected light decreases. As illustrated in FIG. 25B, when the relative angle is 90 degrees, minimum transmission of the light energy occurs and the vertical surface appears darkened.

FIGS. 26 and 26A-D illustrate yet another embodiment of the video conferencing environment 102. In this embodiment, the polarizing filters allow a remote viewer to filter unwanted images from retransmission. Similar to the embodiment illustrated in FIGS. 25, 25A and 25B, light source 110 emanates from a vertical surface. However, in FIGS. 26 and 26A-D the vertical surface is an LCD or LED display 130. LCD displays generally include two sheets of polarized glass plates with a thin layer of liquid crystal solution sandwiched between them. Polarized LED displays are also available. In this embodiment, the LCD or LED display 130 includes the secondary polarizing filter 112 and a separate filter is not needed. As shown in FIG. 26, the LCD or LED display 130 on the left includes a horizontally polarized secondary filter 112, while the display on the right includes a vertically polarized secondary filter. The primary filter 106 is initially in a horizontal orientation. When the relative angle between the molecular orientation of the primary polarizing filter 106 and the secondary polarizing filter 112 in the left side LCD or LED display 130 is zero, maximum transmission of light energy occurs as illustrated in FIG. 26A. When the primary polarizing filter 106 is rotated towards 90 degrees, images on the left side display are dimmed. As illustrated in FIG. 26B, when the relative angle is 90 degrees, minimum transmission of the light energy from the left side LCD or LED display 130 occurs and the images on the left side display disappear. Visibility of images on the right side LCD or LED display 130 are opposite those on the left side display because the orientation of secondary polarizing filters 112 are perpendicular relative to each other.

The secondary polarizing filters 112 allow LCD and LED displays 130 to be positioned directly in view of the camera 116 without compromising the performance of the camera auto iris and maintaining high video quality. For example, in FIG. 26C, images on an LCD or LED display 130 are overly bright and appear distorted. Referring to FIG. 26D, as the primary polarizing filter 106 is rotated from a relative angle of 0 degrees towards 90 degrees, distortion of the images is decreased.

In some applications, a video conferencing environment 102 could be located such that the local participants do not want the remote participants to be able to view materials or people outside the viewing area 108 of the video conferencing environment 102 or meeting room 18. For example, the video conferencing environment could be located with the product development area of a company and the participants may be conducting a video conference about a particular item in development with an outside party. It is important to maintain confidentiality and therefore to ensure the outside participant cannot see people or artifacts outside the video conferencing environment 102 or meeting room 18. If the video conferencing environment or meeting room had windows into the confidential spaces, these windows could be covered with the secondary polarizing filters 112 and the primary polarizing filter 106 could be rotated so the molecular structure of the primary filter 106 and the secondary filter 112 are at 90 degrees. In this manner, the outside participant in the video conference would be prohibited from viewing confidential materials that might be outside the video conferencing environment 102 or meeting room 18. This is illustrated in FIGS. 27, 27A and 27B showing another embodiment of the video conferencing environment 102 using a secondary polarizing filter 112 adjacent a vertical light source 110. In FIG. 27, the video conferencing environment 102 shares a wall with an adjoining room 132. The adjoining room 132 can be used as a conference room, a hallway, or a second video conferencing environment. As illustrated in FIG. 27, the video conferencing environment 102 is separated from the adjoining room 132 by a wall, screen, partition or other divider 134 including translucent panels, such as glass. Referring to FIG. 27A, when the relative angle between the molecular orientation of the primary polarizing filter 106 and the secondary polarizing filter 112 adjacent the divider 134 is zero, maximum transmission of the light energy is emitted through the divider from the adjoining room 132. When the primary polarizing filter 106 is rotated towards 90 degrees, the translucent panel in divider 134 becomes opaque. As illustrated in FIG. 27B, when the relative angle is 90 degrees, minimum transmission of the light energy emitting through the translucent panel in divider 134 from the adjoining room 132 occurs and objects in the adjoining room are no longer visible to a remote viewer.

A secondary polarizing filter 112 can also be applied in patterns to provide branding or watermarking opportunities in the video conferencing environment 102. For example, in FIG. 28, the secondary polarizing filter 112 is positioned in a pattern including a band 136 around a periphery of the table 122 horizontal surface 124 and a circle 138 adjacent the band 136. When the relative angle between the molecular orientation of the primary polarizing filter 106 and the secondary polarizing filter 112 having a band 136 and circle 138 pattern is zero, maximum transmission of the light energy reflecting off the horizontal surface 124 occurs and the pattern is not visible, as illustrated in FIG. 28A. When the primary polarizing filter 106 is rotated towards 90 degrees, the band 136 and circle 138 pattern becomes visible. As illustrated in FIG. 28B, when the relative angle is 90 degrees, minimum transmission of the light energy reflecting off the horizontal surface 124 occurs and the band 136 and circle 138 pattern is clearly visible to a remote viewer.

Another example is illustrated in FIGS. 29, 29A and 29B. First referring to FIG. 29, the secondary polarizing filter 112 is positioned on the horizontal surface 124 in a recognizable or addressable pattern, such as a word 140. When the relative angle between the molecular orientation of the primary polarizing filter 106 and the secondary polarizing filter 112 having in a recognized or addressable pattern is zero, maximum transmission of the light energy reflecting off the horizontal surface 124 occurs and the pattern is not visible, as illustrated in FIG. 29A. When the primary polarizing filter 106 is rotated towards 90 degrees, the pattern becomes visible. Now referring to FIG. 29B, when the relative angle is 90 degrees, minimum transmission of the light energy reflecting off the horizontal surface 124 occurs and the pattern 140 is clearly visible to the remote viewer. As illustrated in FIG. 29B, the secondary polarizing filter 112 can be positioned on a horizontal or vertical surface.

Yet another embodiment of the video conferencing environment 102 is illustrated in FIG. 30. In this embodiment, the secondary polarizing filter 112 is in the pattern of a matrix barcode 142 and is positioned somewhere within the video conferencing environment 102 or meeting room 18 in view of the camera 116. Referring to FIG. 30A, when the relative angle between the molecular orientation of the primary polarizing filter 106 and the secondary polarizing filter 112 in the form of a matrix barcode 142 is zero, maximum transmission of the light energy occurs and the barcode is not visible. When the primary polarizing filter 106 is rotated towards 90 degrees, the barcode 142 becomes visible to a remote viewer. The viewing device 12 in the remote location can read the matrix barcode 142 and convert it to a URL directing a browser associated with the viewing device 12 to an augmentation application. For example, as illustrated in FIG. 30B, the augmentation application provides an information display identifying the room, the guest speaker and attendees.

As discussed above, the camera 116 may be positioned anywhere in the video conferencing environment 102. As illustrated in FIG. 31, the camera 116 can be embedded in the screen 114, which allows improved eye contact between participants. The camera 116 can be separate from the screen 114 or incorporated into pixels in the screen. However, light 110 projected from a projector 144 in the video conferencing environment 102 would interfere with the camera 116. Referring to FIGS. 31A and 31B, to prevent interference, a secondary polarizing filter 112 can be positioned adjacent the projector 144. When the relative angle between the molecular orientation of the primary polarizing filter 106 and the secondary polarizing filter 112 is zero, maximum transmission of the light energy emanating from the projector 144 occurs and the automatic iris adjusts for the bright light making it difficult for the remote viewer to see the conference, as illustrated in FIG. 31A. Now referring to FIG. 31B, when the relative angle is 90 degrees, minimum transmission of the light energy emanating from the projector 144 occurs and a remote viewer 146 can see the other participant clearly.

The robotic telepresence system described herein may also use polarizing filters to provide selective control over the visibility of information and artifacts accessible to a robot in the work environment. In this embodiment, the camera location is not fixed but rather is mobile. Specifically the camera is attached to a robot or other transitory artifact or person. Referring to FIG. 32, a meeting room 18 includes at least one light source 110 and one or more secondary polarizing filters 112. The robot 10 includes a camera 66 having an electronically controlled iris lens and zoom capabilities. As illustrated in FIG. 6, the camera 66 also includes a primary polarizing filter 148. Although the primary polarizing filter 148 in FIG. 6 and the secondary polarizing filter 112 in FIG. 32 are shown as horizontally and vertically polarized, respectively, these filters may have any orientation. Also, circular and elliptical polarized filters may be used. The primary polarizing filter 148 is typically adjustably attached to the camera 66. The primary polarizing filter 148 is typically rotatably adjustable about a horizontal or vertical axis. In one embodiment, the primary polarizing filter 148 is rotatably adjustable about a horizontal axis through 90 degrees as indicated by arrow 150. The at least one secondary polarizing filter 112 is positioned between the light source 110 and the camera 66 on the robot 10. The secondary polarizing filter 112 may be a thin film such a sheet of polarizing laminated film adhered to a side of a window 28 or 126. One or more of the polarizing filters 148, 112 can be adjusted to vary the light source 110 visible to the pilot 14 as seen by the camera 66. Specifically, it is contemplated that the primary polarizing filter 148, the secondary polarizing filter 112, or both filters can be rotated. At least one of the polarizing filters can be adjusted remotely.

The light source 110 is remote from the camera 66 and may be visible or invisible to the pilot 14 or other persons 16 in the meeting room 18. Visible light sources include natural light, glare and reflected light. For example, the light source 110 can be light energy radiating through a window from natural outside exposure, as illustrated in FIG. 32, or through an inside window as illustrated in FIGS. 2 and 33. Visible light sources also include electrically generated light such as a light bulb or a display screen. The light source 110 can also be glare from natural or electrically generated light reflecting off a vertical surface. The vertical surface can include, but is not limited to, a white or very light colored wall or display and a white board. The secondary polarizing filter 112 can include polarized film, variable texture on the vertical surface, and polarized surface materials such as carbon filter and mica. The light source 112 may be located anywhere in the meeting room 18.

As noted above, polarizing filters 148, 112 allow the system and persons 16 co-located with the robot 10 to filter unwanted images from retransmission. As illustrated in FIG. 34, the light source 110 emanates from a vertical surface. Specifically, the vertical surface is an LCD or LED display 130 including the secondary polarizing filter 112. As shown in FIG. 34, the LCD or LED display 130 on the left includes a horizontally polarized secondary filter 112, while the display on the right includes a vertically polarized secondary filter. The primary filter 148 is initially in a horizontal orientation. When the relative angle between the molecular orientation of the primary polarizing filter 148 and the secondary polarizing filter 112 in the left side LCD or LED display 130 is zero, maximum transmission of light energy occurs as illustrated in FIG. 26A. When the primary polarizing filter 148 is rotated towards 90 degrees, images on the left side display 130 are dimmed. As illustrated in FIG. 26B, when the relative angle is 90 degrees, minimum transmission of the light energy from the left side LCD or LED display 130 occurs and the images on the left side display disappear. Visibility of images on the right side LCD or LED display 130 are opposite those on the left side display because the orientation of secondary polarizing filters 112 are perpendicular relative to each other.

The primary polarizing filter 148 may be manually adjusted by a person 16 co-located with a robot 10 to reduce the intensity of a light source 110 as seen by the pilot 14. The pilot 14 may also be capable of adjusting the primary polarizing filter 148 to a limited degree to improve visibility of an image. The secondary polarizing filters 112 allow LCD and LED displays 130 to be positioned directly in view of the camera 66 without compromising the performance of the camera auto iris while still maintaining high video quality. For example, in FIG. 26C, images on the right side LCD or LED display 130 are overly bright and appear distorted. Referring to FIG. 26D, as the primary polarizing filter 148 is rotated from a relative angle of 0 degrees towards 90 degrees, distortion of the images on the right side LCD or LED display 130 is decreased.

For confidentiality reasons, the system or persons 16 co-located with the robot 10 may not want the pilot 14 to view certain information or artifacts outside the meeting room 18. Likewise, the system may not want a pilot 14 to see into meeting rooms 18 as the robot 10 it occupies travels through a hallway 20. This maintains confidentiality and therefore ensures that the pilot 14 cannot see information or artifacts inside or outside the meeting rooms 18 that the pilot does not have permissions to see. If a meeting room has one or more windows 28 into a hallway 20 or other confidential spaces, these windows could be covered with the secondary polarizing filters 112 and the primary polarizing filter 148 could be rotated so the molecular structure of the primary polarizing filter and the secondary polarizing filter are at 90 degrees. In this manner, the pilot 14 would be prohibited from viewing confidential materials that might be inside meeting rooms 18 it passes in the hallway 20 or in adjoining meeting rooms 132. This is illustrated in FIG. 33. In FIG. 33, the meeting room 18 shares a wall 134 with an adjoining room 132. The adjoining room 132 can be used as a conference room, a hallway, or a second robotic telepresence environment. As illustrated in FIG. 33, the meeting room 18 is separated from the adjoining room 132 by a wall, screen, partition or other divider 134 including translucent panels, such as glass. Referring to FIG. 27A, when the relative angle between the molecular orientation of the primary polarizing filter 148 and the secondary polarizing filter 112 adjacent the divider 134 is zero, maximum transmission of the light energy is emitted through the divider from the adjoining room 132. When the primary polarizing filter 148 is rotated towards 90 degrees, the translucent panel in the divider 134 becomes opaque. As illustrated in FIG. 27B, when the relative angle is 90 degrees, minimum transmission of the light energy emitting through the translucent panel in the divider 134 from the adjoining room 132 occurs and objects in the adjoining room are no longer visible to the pilot 14.

Selective control over a robot's visibility of information and artifacts in a work environment is preferably managed by the robotic telepresence system operating in conjunction with a room-specific scheduling system such as the commercial ROOMWIZARD® systems sold by Steelcase Inc. Preferably, the robotic telepresence system is integrated with the scheduling system and is aware of the physical location of whiteboards, display screens, window, other light sources, artifacts or objects. Physical locations may be identified by barcode, RFID or other electronic trigger affixed or embedded in equipment or fixtures in the work environment. Depending on the permissions of the pilot, the system rotates the primary polarizing filter 148 to selectively block out whiteboards, display screens, window, other light sources, artifacts or objects as the robot 10 moves the camera 66 or moves around the meeting room 18 or video conferencing environment 102.

It is important to note that the construction and arrangement of the elements of the inventions as described in system and method and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Other substitutions, modifications, changes and omissions are made in the design, variations in the arrangement or sequence of process or method steps, operating conditions and arrangement of the preferred and other exemplary embodiments are also possible without departing from the spirit of the present inventions. Accordingly, all such modifications are intended to be included within the scope of the present inventions.

The invention claimed is:

1. A system for controlling visibility of information in a work environment, the system comprising:
one or more polarized emissive screens, a table, and one or more chairs located within the work environment, the one or more polarized emissive screens comprising a first direction of polarization and having information displayed which is visible from inside the work environment;
wherein the work environment includes at least one transparent window which allows viewing from within the work environment including a view of the one or more polarized emissive screens from outside of the work environment; and a polarizing filter positioned proximate to and extending across the at least one transparent window, the polarizing filter comprising a second direction of polarization and wherein the second direction of polarization is arranged at an angle perpendicular to the first direction of polarization;

wherein viewing from outside of the work environment is allowed through the at least one transparent window, but viewing information on the one or more polarized emissive screens from outside of the work environment is not allowed.

2. The system of claim 1, the work environment further comprising a wall and wherein the one or more polarized emissive screens are positioned proximate the wall.

3. The system of claim 2, wherein the one or more polarized emissive screens comprise a display screen.

4. The system of claim 3, wherein the display screen comprises an LCD or LED display.

5. The system of claim 2 farther comprising a network connected to the display screen.

6. The system of claim 3, wherein the work environment comprises a conference room.

7. A system for preventing visibility of information in an enclosed space, the system comprising:

at least one polarized electronic display screen, a table, and one or more chairs located within the enclosed space, the at least one polarized electronic display screen comprising a first direction of polarization; the enclosed space further comprising at least one transparent window for viewing the at least one polarized electronic display screen from outside of the enclosed space; and a polarizing filter positioned proximate to and extending across the at least one transparent window, the polarizing filter comprising a second direction of polarization arranged at an angle perpendicular to the first direction of polarization;

wherein viewing of information on the at least one polarized electronic display screen from outside of the enclosed space is prevented.

8. The system of claim 7, wherein information displayed on the at least one polarized electronic display screen is visible from inside the enclosed space.

9. The system of claim 8, wherein the display screen comprises an LCD or LED display.

10. The system of claim 9 further comprising a network connected to the LCD or LED display.

11. The system of claim 9, the enclosed space further comprising a wall and wherein the one or more polarized electronic display screens are positioned proximate the wall.

12. The system of claim 11, wherein the wall comprises a full-height wall.

13. The system of claim 8 further comprising at least one polarized non-electronic whiteboard located within the enclosed space, wherein the at least one polarized non-electronic whiteboard includes a direction of polarization aligned with the first direction of polarization of the one or more polarized electronic display screens.

14. The system of claim 13, wherein the information displayed on the at least one polarized non-electronic whiteboard is visible from inside the enclosed space.

15. The system of claim 8, wherein the polarizing filter completely covers the at least one transparent window.

16. The system of claim 15, the enclosed space further comprising a wall and wherein the one or more polarized electronic display screens are positioned proximate the wall.

17. The system of claim 16 further comprising a network connected to the polarized electronic display screen.

18. The system of claim 8, wherein the polarizing filter partially covers the at least one transparent window.

19. The system of claim 18, the enclosed space further comprising a full-height wall and wherein the one or more polarized electronic display screens are positioned proximate the full-height wall.

20. A method of controlling visibility in an enclosed space, the method comprising:

providing at least one polarized electronic display screen, a table, and one or more chairs located within the enclosed space, the at least one polarized electronic display screen comprising a first direction of polarization;

providing at least one transparent window for viewing the at least one polarized electronic display screen from outside of the enclosed space; and providing a polarizing filter comprising a second direction of polarization arranged at an angle perpendicular to the first direction of polarization; and positioning the polarizing filter proximate to and extending across the at least one transparent window;

wherein viewing of information on the at least one polarized electronic display screen through the transparent window from outside of the enclosed space is prevented.

* * * * *